(12) United States Patent
Sudbrink et al.

(10) Patent No.: US 10,299,423 B2
(45) Date of Patent: May 28, 2019

(54) COMPUTER CONTROLLED HYDRAULIC BLEED SEQUENCE

(71) Applicant: CNH Industrial Canada, Ltd., Saskatoon (CA)

(72) Inventors: Matthew R. Sudbrink, Metamora, IL (US); Kena Shah, Woodridge, IL (US); Dean A. Knobloch, Tucson, AZ (US); James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 317 days.

(21) Appl. No.: 15/400,778

(22) Filed: Jan. 6, 2017

(65) Prior Publication Data

US 2017/0112046 A1 Apr. 27, 2017

Related U.S. Application Data

(63) Continuation-in-part of application No. 15/087,057, filed on Mar. 31, 2016, now Pat. No. 10,028,423,
(Continued)

(51) Int. Cl.
| | |
|---|---|
| *A01B 73/02* | (2006.01) |
| *A01B 59/00* | (2006.01) |
| *A01B 73/06* | (2006.01) |
| *A01B 73/04* | (2006.01) |
| *F01B 1/01* | (2006.01) |
| *F01B 25/02* | (2006.01) |

(Continued)

(52) U.S. Cl.
CPC ............ *A01B 73/02* (2013.01); *A01B 59/002* (2013.01); *A01B 63/32* (2013.01); *A01B 73/048* (2013.01); *A01B 73/065* (2013.01); *F01B 1/01* (2013.01); *F01B 25/02* (2013.01); *F01B 31/28* (2013.01); *A01B 49/027* (2013.01)

(58) Field of Classification Search
CPC ....................................... A01B 73/00–73/067
See application file for complete search history.

(56) References Cited

U.S. PATENT DOCUMENTS

| | | |
|---|---|---|
| 2,713,296 A | 7/1955 | Silver et al. |
| 2,755,722 A | 7/1956 | Fraga |

(Continued)

FOREIGN PATENT DOCUMENTS

| | | |
|---|---|---|
| DE | 32 46 569 A1 | 6/1984 |
| GB | 1 269 041 | 3/1972 |
| GB | 1 500 179 | 2/1978 |

*Primary Examiner* — Matthew Troutman
(74) *Attorney, Agent, or Firm* — Rebecca L. Henkel; Rickard K. DeMille

(57) ABSTRACT

An agricultural machine or implement has a main frame section and at least one wing section, each having lift cylinders. A main shank frame may be pivotally attached to the main frame section and may have hydraulically adjustable gauge wheels. Wing shank frames may be pivotally attached to the wing sections and may also have hydraulically adjustable gauge wheels. Bypass circuits may be used to individually adjust the lift cylinders and gauge wheel cylinders. A controller or controllers is used to purge air from the lift cylinders, gauge wheel cylinders, cylinders used to raise the shank frames for transport, and from the bypass circuits. The purge routine may be selectable as individual steps, hydraulic subsystem purges, or as one automatic purge routine.

20 Claims, 13 Drawing Sheets

Related U.S. Application Data which is a continuation-in-part of application No. 14/528,345, filed on Oct. 30, 2014, now Pat. No. 9,516,798, said application No. 15/087,057 is a continuation-in-part of application No. 14/528,356, filed on Oct. 30, 2014, now Pat. No. 9,554,497, said application No. 15/087,057 is a continuation-in-part of application No. 14/528,236, filed on Oct. 30, 2014, now Pat. No. 9,706,699, said application No. 15/087,057 is a continuation-in-part of application No. 14/528,535, filed on Oct. 30, 2014, now Pat. No. 9,596,799, application No. 15/400,778, which is a continuation-in-part of application No. 15/086,797, filed on Mar. 31, 2016, now Pat. No. 9,986,674, which is a continuation-in-part of application No. 14/528,345, said application No. 15/086,797 is a continuation-in-part of application No. 14/528,356, said application No. 15/086,797 is a continuation-in-part of application No. 14/528,236, said application No. 15/086,797 is a continuation-in-part of application No. 14/528,535, said application No. 15/086,797 is a continuation-in-part of application No. 14/558,498, filed on Dec. 2, 2014, now Pat. No. 9,609,799.

(60) Provisional application No. 61/914,502, filed on Dec. 11, 2013, provisional application No. 61/914,594, filed on Dec. 11, 2013, provisional application No. 61/914,686, filed on Dec. 11, 2013.

(51) Int. Cl.
*F01B 31/28* (2006.01)
*A01B 63/32* (2006.01)
*A01B 49/02* (2006.01)

(56) References Cited

U.S. PATENT DOCUMENTS

| | | |
|---|---|---|
| 2,828,680 A | 4/1958 | Johnson |
| 3,333,645 A | 8/1967 | Gustafson |
| 3,588,139 A | 6/1971 | Bayne |
| 3,750,757 A | 8/1973 | Saetti |
| 3,880,241 A | 4/1975 | Vincent |
| 4,126,187 A | 11/1978 | Schreiner |
| 4,265,464 A | 5/1981 | Lange |
| 4,320,805 A | 3/1982 | Winter |
| 4,339,139 A | 7/1982 | Swanson |
| 4,354,688 A | 10/1982 | Swanson |
| 4,355,688 A | 10/1982 | Hamm et al. |
| 4,418,762 A | 12/1983 | Page |
| 4,492,272 A | 1/1985 | Jensen |
| 4,564,073 A | 1/1986 | Ide et al. |
| 4,646,620 A | 3/1987 | Buchl |
| 4,700,784 A | 10/1987 | Wiebe et al. |
| 4,703,810 A | 11/1987 | Meiners |
| 4,778,194 A | 10/1988 | Koch et al. |
| 4,821,806 A | 4/1989 | Winter |
| 4,913,070 A | 4/1990 | Morrison, Jr. |
| 4,967,851 A | 11/1990 | Barber |
| 5,251,704 A | 10/1993 | Bourgault |
| 5,427,182 A | 6/1995 | Winter |
| 5,462,123 A | 10/1995 | Harlan et al. |
| 5,488,996 A | 2/1996 | Barry et al. |
| 5,524,712 A | 6/1996 | Balmer |
| 5,590,721 A | 1/1997 | Van Mill |
| 5,641,026 A | 6/1997 | Balmer |
| 5,748,466 A | 5/1998 | McGivern et al. |
| 5,839,516 A | 11/1998 | Arnold et al. |
| 5,957,218 A | 9/1999 | Noonan et al. |
| 6,076,611 A | 6/2000 | Rozendaal et al. |
| 6,076,613 A | 6/2000 | Frasier |
| 6,129,157 A | 10/2000 | Noonan et al. |
| 6,141,612 A | 10/2000 | Flamme |
| 6,164,385 A | 12/2000 | Buchl |
| 6,263,977 B1 | 7/2001 | Mayerle et al. |
| 6,269,887 B1 | 8/2001 | Friggstad |
| 6,374,923 B1 | 4/2002 | Friggstad |
| 6,415,873 B1 | 7/2002 | Hudgins |
| 6,443,474 B1 | 9/2002 | Kay |
| 6,550,543 B1 | 4/2003 | Friggstad |
| 6,557,646 B1 | 5/2003 | Hurtis et al. |
| 6,609,575 B1 | 8/2003 | Crabb |
| 6,612,381 B2 | 9/2003 | Powell et al. |
| 6,640,163 B1 | 10/2003 | Pfaff et al. |
| 6,681,868 B2 | 1/2004 | Kovach et al. |
| 6,698,523 B2 | 3/2004 | Barber |
| 6,701,857 B1 | 3/2004 | Jensen et al. |
| 6,708,775 B2 | 3/2004 | Beaujot |
| 6,830,083 B1 | 12/2004 | Hollub et al. |
| 7,048,071 B1 | 5/2006 | Huenink et al. |
| 7,478,683 B2 | 1/2009 | Peck et al. |
| 7,581,597 B2 | 9/2009 | Neudorf |
| 7,604,068 B1 | 10/2009 | Friesen |
| 7,926,247 B2 | 4/2011 | Van Den Engel |
| 8,020,629 B1 | 9/2011 | McFarlane et al. |
| 8,047,299 B2 | 11/2011 | Hurtis et al. |
| 8,118,110 B2 | 2/2012 | Tamm et al. |
| 8,141,653 B2 | 3/2012 | Ryder |
| 8,176,992 B2 | 5/2012 | Yuen |
| 8,235,130 B2 | 8/2012 | Henry et al. |
| 8,235,133 B2 | 8/2012 | Friggstad |
| 8,235,410 B2 | 8/2012 | Weber et al. |
| 8,275,525 B2 | 9/2012 | Kowalchuk et al. |
| 8,336,639 B2 | 12/2012 | Palen |
| 8,342,256 B2 | 1/2013 | Adams et al. |
| 8,408,326 B2 | 4/2013 | Yuen et al. |
| 8,439,065 B2 | 5/2013 | Dirkin et al. |
| 8,567,517 B2 | 10/2013 | Friggstad et al. |
| 8,606,373 B2 | 12/2013 | Lozier et al. |
| 8,657,023 B2 | 2/2014 | Casper et al. |
| 8,746,361 B2 | 6/2014 | Hake et al. |
| 8,794,344 B2 | 8/2014 | Blunier |
| 9,192,110 B2 | 11/2015 | Standerfer et al. |
| 9,243,753 B2 | 1/2016 | Wonders |
| 2003/0150626 A1 | 8/2003 | Domries |
| 2005/0087350 A1 | 4/2005 | Bauer |
| 2007/0095422 A1 | 5/2007 | Petty |
| 2007/0240889 A1 | 10/2007 | Neudorf |
| 2008/0110649 A1 | 5/2008 | Connell et al. |
| 2009/0271043 A1 | 10/2009 | Roman |
| 2010/0025056 A1 | 2/2010 | Friggstad |
| 2011/0284252 A1 | 11/2011 | Friggstad |
| 2011/0290513 A1 | 12/2011 | Yuen |
| 2011/0315411 A1 | 12/2011 | Adams |
| 2012/0048160 A1 | 3/2012 | Adams et al. |
| 2013/0068489 A1 | 3/2013 | Blunier et al. |
| 2013/0173070 A1 | 7/2013 | Tennyson et al. |
| 2014/0034342 A1 | 2/2014 | Friggstad |
| 2014/0069670 A1 | 3/2014 | Friesen |

COMPUTER CONTROLLED HYDRAULIC BLEED SEQUENCE

CROSS REFERENCE TO RELATED APPLICATIONS

This is a continuation-in-part application based upon U.S. Non-Provisional patent application Ser. No. 15/087,057, entitled, "TILLAGE ELECTRO HYDRAULIC DESIGN AND LAYOUT ON FOLD SEQUENCE ON FRONT FOLD MACHINE", filed Mar. 31, 2016, which is a continuation-in-part based on U.S. Non-Provisional patent application Ser. No. 14/528,345, entitled "FOLDING SEQUENCE OF ENTIRE AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,356, entitled "FRONT FOLDING ARRANGEMENT FOR AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,236, entitled "DRAFT LINKAGE CONFIGURATION", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed on Dec. 11, 2013 which is incorporated herein by reference; and U.S. Non-Provisional patent application Ser. No. 14/528,535, entitled "DRAFT TUBE SEQUENCING FOR AN AGRICULTURAL TILLAGE IMPLEMENT", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed Dec. 11, 2013 which is incorporated herein by reference.

This is also a continuation-in-part based upon U.S. Non-Provisional patent application Ser. No. 15/086,797, entitled, "TILLAGE ELECTRO HYDRAULIC DESIGN AND LAYOUT ON RAISE AND LOWER SYSTEM ON FRONT FOLD MACHINE", filed Mar. 31, 2016, which is a continuation-in-part application based upon U.S. Non-Provisional patent application Ser. No. 14/528,345, entitled "FOLDING SEQUENCE OF ENTIRE AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,356, entitled "FRONT FOLDING ARRANGEMENT FOR AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,236, entitled "DRAFT LINKAGE CONFIGURATION", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed on Dec. 11, 2013 which is incorporated herein by reference; U.S. Non-Provisional patent application Ser. No. 14/528,535, entitled "DRAFT TUBE SEQUENCING FOR AN AGRICULTURAL TILLAGE IMPLEMENT", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed Dec. 11, 2013 which is incorporated herein by reference; and U.S. patent application Ser. No. 14/558,498, entitled "REMOTE LEVELING OF TILLAGE IMPLEMENTS USING THREE WAY VALVES", filed on Dec. 2, 2014, which is a non-provisional of U.S. Provisional Application Ser. No. 61/914,686, entitled "REMOTE LEVELING OF TILLAGE IMPLEMENTS USING THREE WAY VALVES, filed on Dec. 11, 2013 which is incorporated herein by reference.

BACKGROUND OF THE INVENTION

1. Field of the Invention

The present invention relates to agricultural tillage implements or machines, and, more particularly, to hydraulic control systems of agricultural field cultivators.

2. Description of the Related Art

Farmers utilize a wide variety of agricultural implements or machines to prepare soil for planting, for the task of planting itself, for harvesting, and for other miscellaneous agricultural functions. Some such agricultural implements or machines may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement or machine subsequently passing through the seedbed. A field cultivator as described above may also include optional rear auxiliary implements for finishing the seedbed for seeding. For example, such rear auxiliary implements may include spike tooth harrows, spring tooth harrows, rolling (aka. crumbler) baskets, drag tines, etc., or any combination thereof.

As illustrated by the example of a field cultivator, agricultural tillage implements or machines have become increasingly multi-functional, complex, and physically larger machines. As a result, the hydraulic systems that are used to operate them, as well as to fold and unfold them for road transport, have also become increasingly complex. Often, these system include dozens of hydraulic cylinders, motors, valves, flow dividers, and other hydraulic devices. In order to function properly, such hydraulic systems must have any and all entrained air removed from them in a process commonly referred to as bleeding. Traditionally, this has involved simply opening or cycling valves in a certain order to allow the air to escape. However, with the increasingly complicated hydraulic systems used in agricultural implements or machines, often the traditional method of manually opening or cycling valves has become overly burdensome, time consuming, confusing, and unreliable. The problem of effectively bleeding air from the hydraulic systems of these agricultural implements or machines is further exacerbated by the fact that certain hydraulic circuits are not routinely used by the operated, such as bypasses and relief circuits.

What is needed in the art, therefore is a way to effectively, quickly, and efficiently bleed the hydraulic systems of agricultural implements or machines.

SUMMARY OF THE INVENTION

The present invention provides a system and method for purging air from a hydraulic system for an agricultural machine or implement with multiple hydraulically actuated functions.

As a non-limiting example, an agricultural tillage implement is illustrated having a main section and wing sections that may be foldable to a compact transport configuration using main fold hydraulic cylinders. The main section and wing sections may be raised and lowered on hydraulically actuated lift wheels. A main shank frame may be foldable up and over a main frame section when in the transport configuration using at least one main shank frame hydraulic cylinder, and may be foldable down and forward of the main frame section when in the operating configuration using the at least one main shank frame hydraulic cylinder. Wing front shank frames may fold upwards against each wing section when in the transport configuration using wing front shank frame hydraulic cylinders, and may fold down and forward of the wing sections when in the operating configuration using the wing front shank frame hydraulic cylinders. Wing section rear auxiliary implements may also fold upward against each wing section when in the transport configuration using wing section rear auxiliary implement hydraulic cylinders, and may fold down and rearward of the wing sections when in the operating configuration using the wing section rear auxiliary implement hydraulic cylinders. The main shank frame and the wing front shank frames may have gauge wheels that are hydraulically raised and lowered in order to control the depth of tools attached thereto. The front of the main section may be raised and lowered using a pull hitch hydraulic cylinder. The agricultural tillage implement may further include a hitch lock that unlocks when transitioning from the operating configuration to the transport configuration, and vice versa, using a hitch lock hydraulic cylinder. The agricultural tillage implement may further include draft linkage assemblies with pivoting swing arms that pivot inwards when in the transport configuration, and that pivot outwards when in the operating configuration, using pivoting swing arm hydraulic cylinders.

This non-limiting example of the agricultural tillage implement is illustrated with multiple valves, hydraulic circuits, and bypasses, in several alternative arrangements, to demonstrate the inventive technique of purging air from a complex agricultural machine or implement, utilizing the valves, hydraulic circuits, and bypasses that are otherwise used to operate and adjust the machine or implement. One or more controllers configured with controlling software allow an operator to select certain air purge routines, subroutines, or individual purge routine steps. This may be accomplished using buttons on an in-cab screen that steps the operator through the bleed sequence. When the operator presses the appropriate button, the implement controller or controllers cause the hydraulic valves to turn on and off in the most effective and efficient sequence. This prevents the operator from selecting the wrong valves during the bleeding process, and ensures a consistent bleed sequence every time the system or method is used. The selectable routines, subroutines, or individual steps may be arranged step by step, as groupings of steps by hydraulic subsystem, or by way of a single automated purge routine using one "purge" button.

The invention in one form is directed to an agricultural machine or implement. The agricultural machine or implement has a main frame section and at least one wing section. At least one first hydraulic subsystem includes at least one main frame lift hydraulic cylinder for raising and lowering the main frame section, at least one wing section lift hydraulic cylinder for raising and lowering the wing sections, and at least one first bypass circuit bypassing at least one of the main frame lift hydraulic cylinders and/or the wing section lift hydraulic cylinders. At least one controller is operably connected to valves controlling hydraulic pressure and flow to at least one of the main frame lift hydraulic cylinders, the wing section lift hydraulic cylinders, and the at least one first bypass circuit. The controller or controllers are configured to bleed air from the at least one first hydraulic subsystem using several steps. The first step is extending the main frame lift hydraulic cylinders and the wing section lift hydraulic cylinders. The second step is retracting the main frame lift hydraulic cylinders and the wing section lift hydraulic cylinders. The third step is bypassing at least one of the main frame lift hydraulic cylinders and/or wing section lift hydraulic cylinders while extending at least one of the main frame lift hydraulic cylinders and/or the wing section lift hydraulic cylinders. The fourth step is again extending the main frame lift hydraulic cylinders and the wing section lift hydraulic cylinders.

The invention in another form is directed to a hydraulic system of an agricultural machine or implement having a main frame section, at least one wing section, at least one main structure pivotally connected to the main frame section, and at least one wing structure pivotally connected to the at least one wing section. The hydraulic system includes at least one first hydraulic subsystem including at least one main frame lift hydraulic cylinder for raising and lowering the main frame section, at least one wing section lift hydraulic cylinder for raising and lowering the at least one wing section, and at least one first bypass circuit bypassing at least one of the main frame lift hydraulic cylinders and/or the wing section lift hydraulic cylinders. At least one controller is operably connected to valves controlling hydraulic pressure and flow to at least one of the main frame lift hydraulic cylinders, the wing section lift hydraulic cylinders, and the at least one first bypass circuit. The controller or controllers are configured to bleed air from the at least one first hydraulic subsystem using several steps. The first step is extending the main frame lift hydraulic cylinders and the wing section lift hydraulic cylinders. The second step is retracting the main frame lift hydraulic cylinders and the wing section lift hydraulic cylinders. The third step is bypassing at least one of the main frame lift hydraulic cylinders and/or the wing section lift hydraulic cylinders while extending at least one of the main frame lift hydraulic cylinders and/or the wing section lift hydraulic cylinders. The fourth step is extending the main frame lift hydraulic cylinders and the wing section lift hydraulic cylinders.

The invention in yet another form is directed to a method of bleeding air from a hydraulic system of an agricultural machine or implement having a main frame section, at least one wing section, at least one main structure pivotally connected to the main frame section, and at least one wing structure pivotally connected to the at least one wing section. The method includes several steps. The first step is providing at least one first hydraulic subsystem including at least one main frame lift hydraulic cylinder for raising and lowering the main frame section, at least one wing section lift hydraulic cylinder for raising and lowering the at least one wing section, and at least one first bypass circuit bypassing at least one of the main frame lift hydraulic cylinders and/or the wing section lift hydraulic cylinders. The second step is providing each of the main frame lift hydraulic cylinders and the wing section lift hydraulic cylinders with at least one re-phasing port. The third step is operably connecting at least one controller to at least one valve controlling hydraulic pressure and flow to at least one of the main frame lift hydraulic cylinders, the wing section lift hydraulic cylinders, and the at least one first bypass circuit. The fourth step is configuring the controller or controllers to bleed air from the at least one first hydraulic subsystem using several sub-steps. The first sub-step is extending the main frame lift hydraulic cylinders and the wing section lift hydraulic cylinders until each re-phasing port of each main frame lift hydraulic cylinder and of each wing section lift hydraulic cylinder releases hydraulic pressure. The second sub-step is retracting the main frame lift hydraulic cylinders and wing section lift hydraulic cylinders. The third sub-step is bypassing at least one of the main frame lift hydraulic cylinders and/or the wing section lift hydraulic cylinders while extending at least one of the main frame lift hydraulic cylinders and/or the wing section lift hydraulic cylinders. The fourth sub-step is again extending the main frame lift hydraulic cylinders and the wing section lift hydraulic cylinders until each re-phasing port of each main frame lift hydraulic cylinder and of each wing section lift hydraulic cylinder releases hydraulic pressure.

An advantage of the present invention is that it allows an operator to quickly, effectively, and efficiently purge air from an agricultural machine or implement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
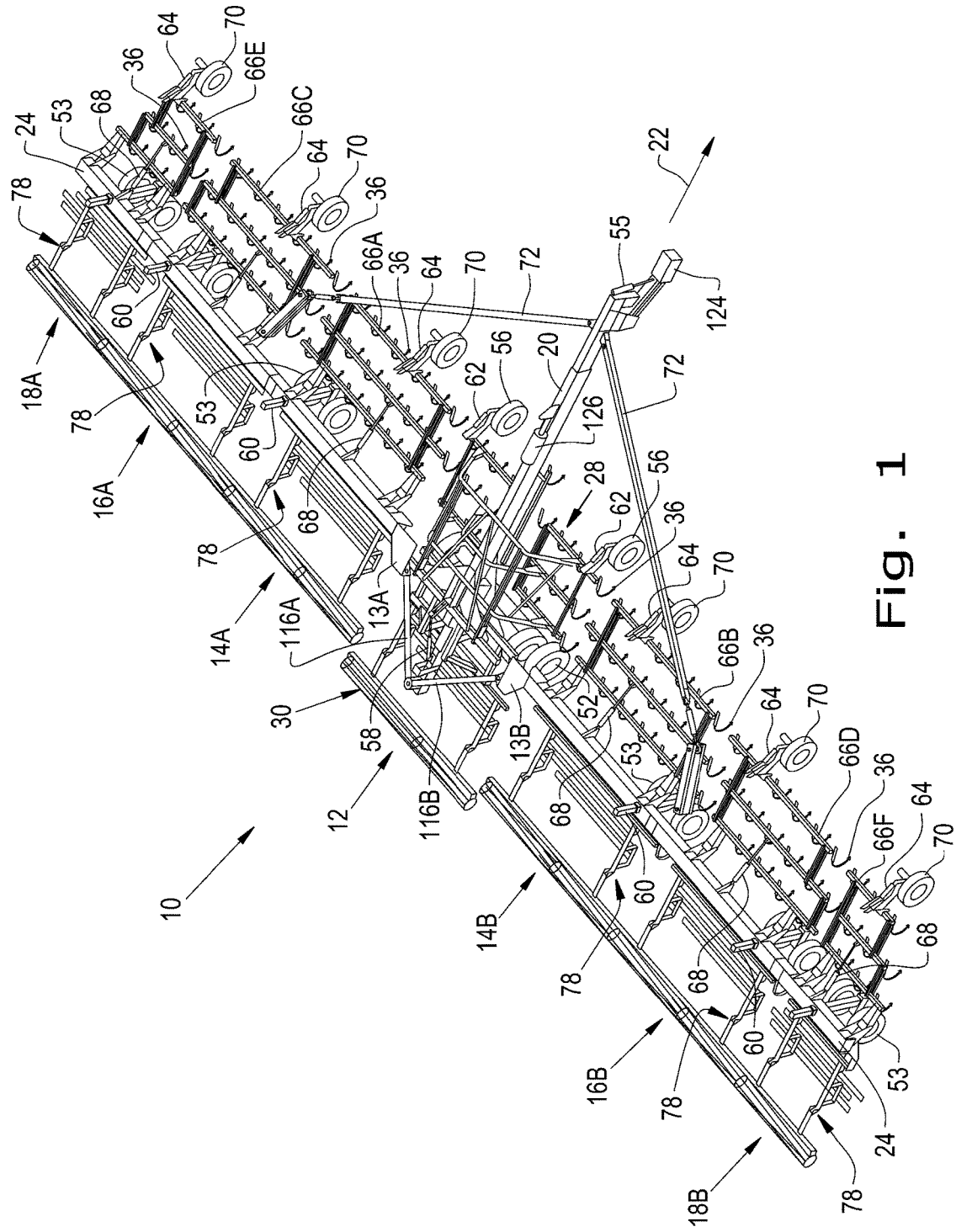
FIG. 1 is a top perspective view of an embodiment of an agricultural tillage implement within which an embodiment of the present invention may be utilized, in the form of a field cultivator.

Referring now to the drawings, and more particularly to FIGS. 1 through 6, there is shown an exemplary embodiment of an agricultural tillage implement upon which an embodiment the present invention may be utilized. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Intermediate wings 13A and 13B may be attached to main frame section 12, and may provide generally vertical axes 86 and 88 about which the plurality of wing sections 14A, 14B, 16A, 16B, 18A, and 18B pivot.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Main frame section 12 generally functions to carry a main shank frame 28 for tilling the soil, and a main rear auxiliary implement 30 for finishing the soil. Main shank frame 28 generally functions to carry cultivator shanks 36 for tilling the soil. Main shank frame 28 is pivotally coupled with tool bar 24, so that main shank frame 28 is positioned in front of the tool bar 24 when in an operating configuration (FIG. 1), and is foldable up and over the tool bar 24 when in a transport configuration (FIGS. 2-5). The main frame section 12 may be raised and lowered using rear lift wheels 52 using hydraulic cylinder 54 and using hydraulic cylinder 55 connected to pull hitch 124. Main shank frame 28 also includes one or more gauge wheel assemblies 56 which function to level main shank frames 28. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby cooperate with hydraulic cylinders 62 actuating gauge wheel assemblies 56 to set the operating depth at the front edge of main shank frame 28.

Similarly, wing sections 14A, 14B, 16A, 16B, 18A, and 18B are provided with left inner wing front shank frame 66A, right inner wing front shank frame 66B, left middle wing front shank frame 66C, right middle wing front shank frame 66D, left outer wing front shank frame 66E, and right outer wing front shank frame 66F, respectively, which each function to carry cultivator shanks 36 for tilling the soil. Each of the left inner wing front shank frame 66A, right inner wing front shank frame 66B, left middle wing front shank frame 66C, right middle wing front shank frame 66D, left outer wing front shank frame 66E, and right outer wing front shank frame 66F is provided with at least one gauge wheel assembly 70 which function to level the wing front shank frames 66A, 66B, 66C, 66D, 66E, and 66F using hydraulic cylinders 64, and to control the depth of the cultivator shanks. Hydraulic cylinders 68, which serve to fold the wing front shank frames 66A, 66B, 66C, 66D, 66E, and 66F upwards as will be described, may optionally be placed in a "float mode" such that the gauge wheel assemblies 70 are operable to float up and down as they traverse across a field and thereby cooperate with hydraulic cylinders 64 actuating gauge wheel assemblies 70 to set the operating depth at the front edges of wing front shank frames 66A, 66B, 66C, 66D, 66E, and 66F.

Left and right wing sections 14A, 14B, 16A, 16B, 18A, and 18B may be braced by a draft linkage assembly 200 including diagonally angled draft tubes 72. Main fold hydraulic cylinders 116A and 116B are shown in a rear mounted configuration, so that for example right main fold hydraulic cylinder 116B acts on intermediate wing 13B of wing sections 14B, 16B, and 18B directly. It may be that main fold hydraulic cylinder is instead be mounted longitudinally on telescoping pull hitch tube 20, causing extending telescoping pull hitch tube 20 to pull wing sections 14B, 16B, and 18B into the transport configuration by action of the diagonally angled draft tubes 72 when the wing sections 14A, 14B, 16A, 16B, 18A, and 18B are folded forward.

Figure 2:
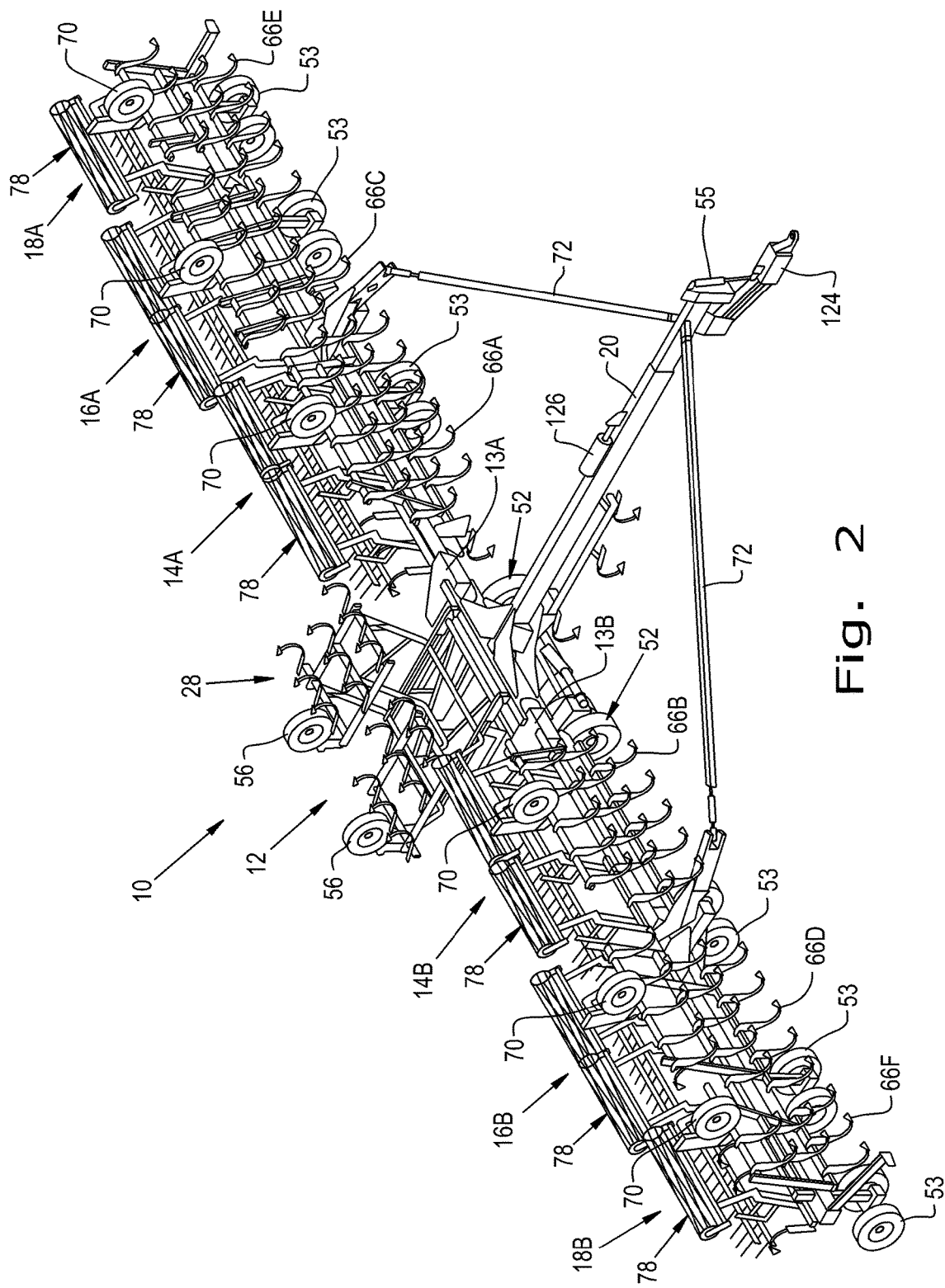
FIG. 2 is a top perspective view of the agricultural tillage implement shown in FIG. 1, with the main shank frame folded to a transport configuration and the wing front shank frames and wing section rear auxiliary implements folded upwards to a transport configuration.
Figure 3:
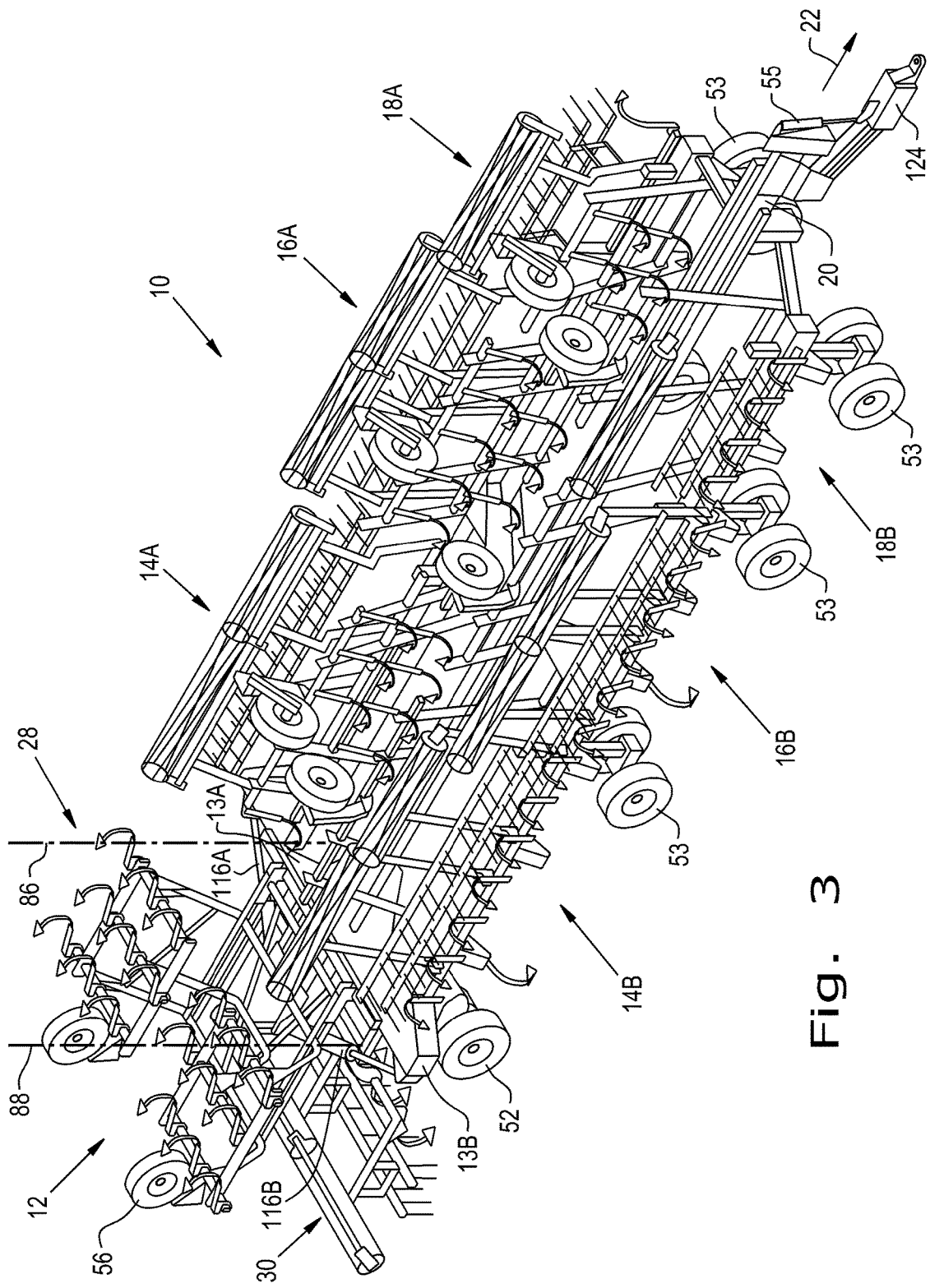
FIG. 3 is a top perspective view of the agricultural tillage implement shown in FIGS. 1-2, with the wing sections folded forward about at least one generally vertical axis to a transport configuration.

During use, it is periodically necessary to move the agricultural tillage implement 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Hydraulic cylinders 60 then actuate toolbar lift wheels 53 to lift wing sections 14A, 14B, 16A, 16B, 18A, and 18B to the raised transport position along with main frame section 12, which toolbar lift wheels 53 are then allowed to caster or pivot. Hydraulic cylinder 58 is then retracted to fold main shank frame 28 up and over tool bar 24 to an inverted position above tool bar 24 (FIG. 2). Main rear auxiliary implement 30 may then also be moved to a raised position. Then the wing front shank frames 66A, 66B, 66C, 66D, 66E, and 66F of the wing sections 14A, 14B, 16A, 16B, 18A, and 18B are folded upwards to a position at or near vertical by retracting hydraulic cylinders 68. Gauge wheel assemblies 56 and 70 may also be retracted at this point using hydraulic cylinders 62 and 64, respectively. Wing section rear auxiliary implements 78 may then also be folded upwards to a position at or near vertical using hydraulic cylinders 90. A telescoping hitch lock cylinder 126 is then retracted, releasing pull hitch tube 20 to telescope. Wing sections 14A, 14B, 16A, 16B, 18A, and 18B are then folded forward by left main fold hydraulic cylinder 116A and right main fold hydraulic cylinder 116B about generally vertical axes which pass through intermediate wings 13A and 13B to a position adjacent to and generally parallel with pull hitch tube 20. For unfolding the agricultural tillage implement 10 to the operating configuration, the reverse folding sequence is carried out.

Figure 6:
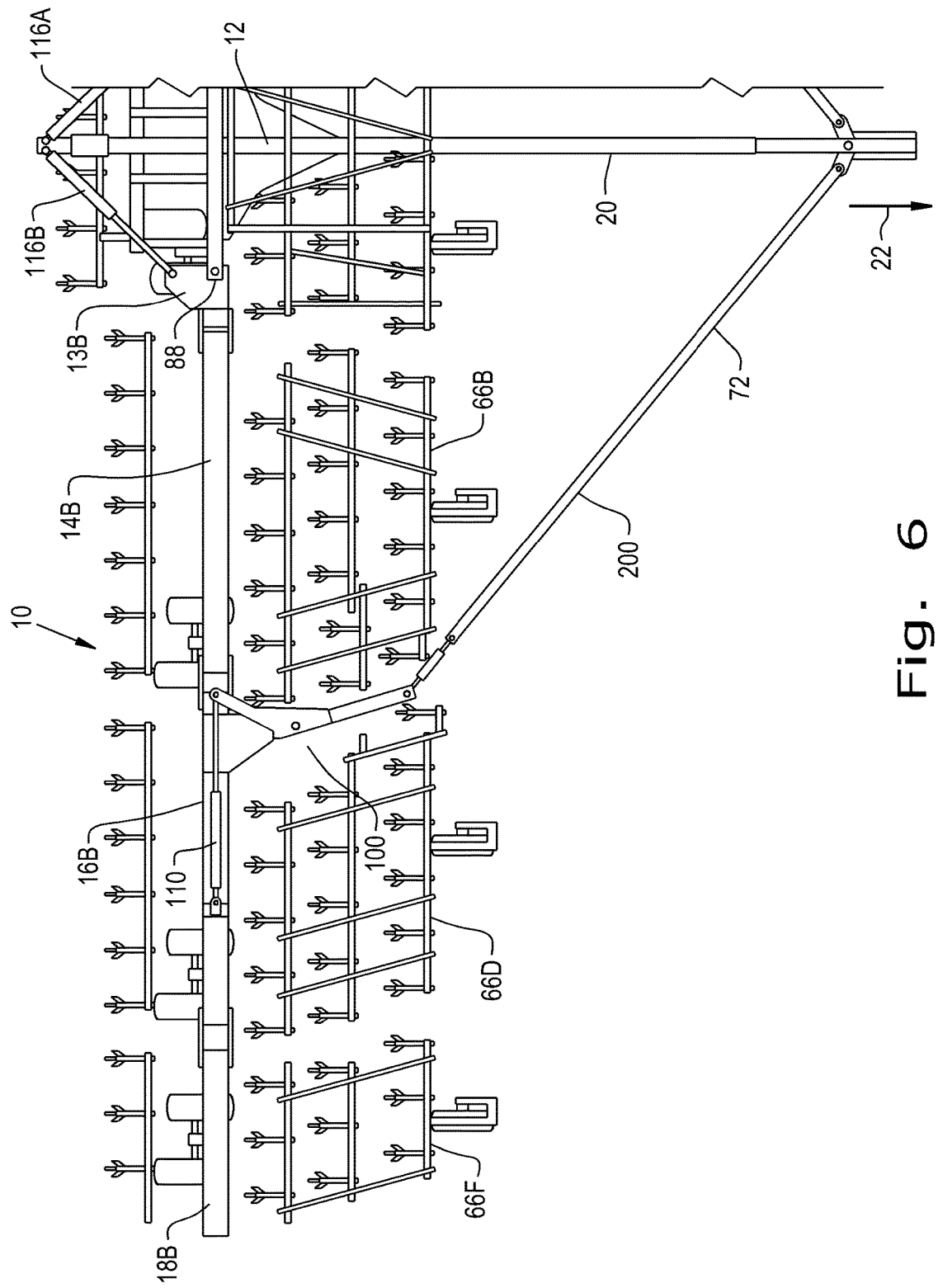
FIG. 6 is a partial top view of the agricultural tillage implement showing additional detail of a draft linkage assembly.

As shown in FIG. 6, the draft linkage assembly 200 may include diagonally angled draft tubes 72 and a pivoting swing arm 98 configured as a bell crank arrangement 100. A hydraulic cylinder 110 serves to rotate pivoting swing arm 98 inwards toward right inner wing section 14B upon contraction, and serves to rotate pivoting swing arm 98 outwards upon extension. Pivoting the pivoting swing arm 98 inwards towards right inner wing section 14B allows wing sections 14B, 16B, and 18B to fold to the transport configuration as diagonally angled draft tube 72 nests with pivoting swing arm 98, whereas pivoting the pivoting swing arm 98 outwards allows wing sections 14B, 16B, and 18B to unfold to the operating configuration while still allowing right inner wing shank frame 66B to pivot to the generally horizontal position. A symmetrically opposite draft linkage assembly 200 is of course provided for left inner wing section 14A, left middle wing section 16A, and left outer wing section 18A.

Figure 7:
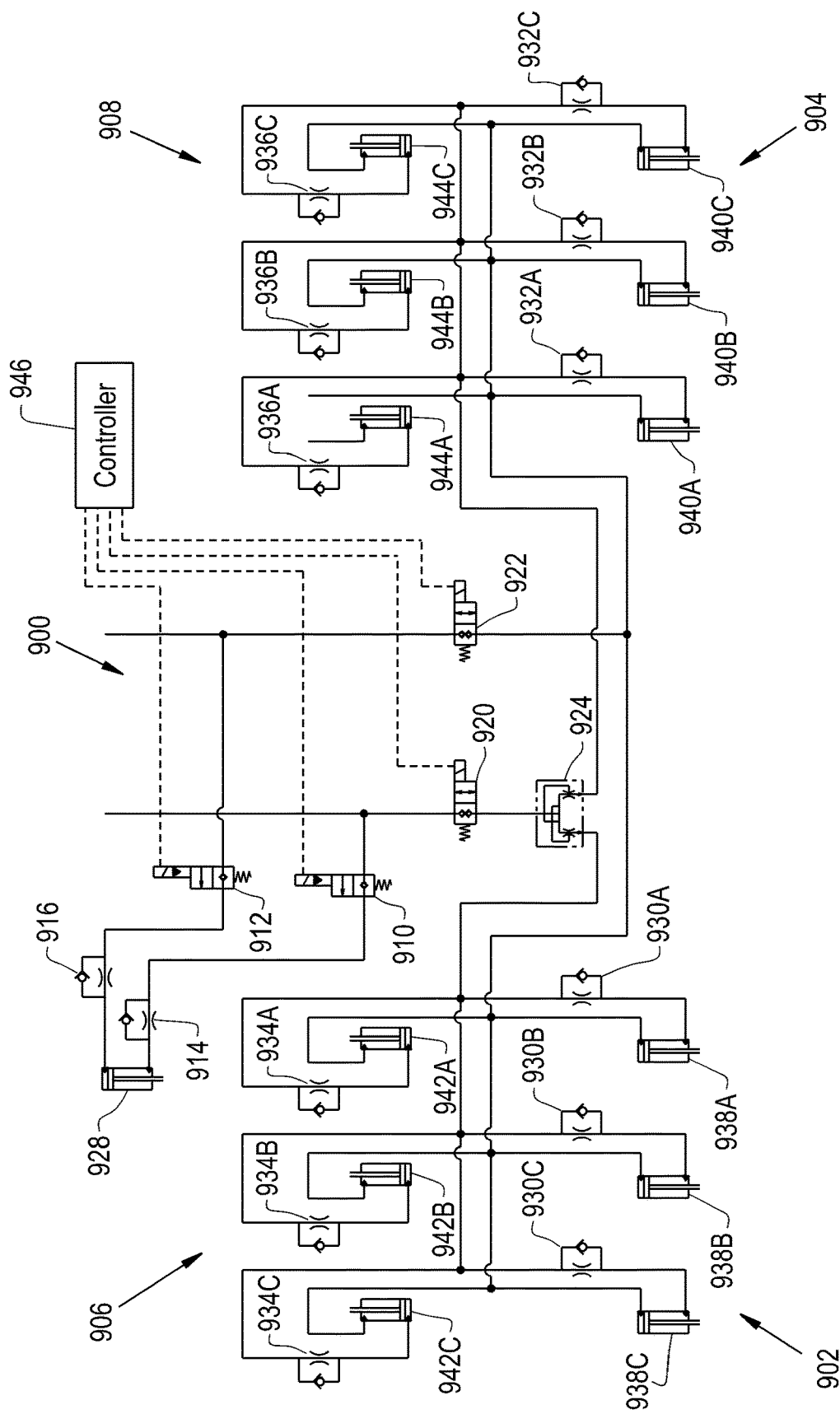
FIG. 7 is a schematic illustration of a tillage implement hydraulic system according to an embodiment of the present invention.

Turning now to FIG. 7, a schematic illustration of an exemplary tillage implement hydraulic system 900 upon which an embodiment of the present invention may be used is shown. The tillage implement hydraulic system 900 includes a right wing front shank frame hydraulic subsystem 902, a left wing front shank frame hydraulic subsystem 904, a right wing rear auxiliary implement hydraulic subsystem 906, and a left wing rear auxiliary implement hydraulic subsystem 908. When transitioning from the operating configuration to the transport configuration, hydraulic pressure and flow is admitted to the tillage implement hydraulic system 900, whereupon part of the hydraulic pressure and flow then proceeds to the to the main shank frame hydraulic cylinder 928 by way of first main shank frame solenoid operated normally closed two position one way valve 910 and first main shank frame hydraulic flow control valve 914. Thereafter, this part of the hydraulic pressure and flow passes through second main shank frame hydraulic flow control valve 916 and second main shank frame solenoid operated normally closed two position one way valve 912.

Another part of the hydraulic pressure and flow then proceeds to 50/50 hydraulic flow divider and combiner 924 by way of first solenoid operated normally closed two way poppet valve 920. Hydraulic flow and pressure proceeding from the hydraulic flow divider and combiner 924, having been divided between hydraulic flow and pressure going to the right wing front shank frame hydraulic subsystem 902 and right wing rear auxiliary implement hydraulic subsystem 906, and that going to the left wing front shank frame hydraulic subsystem 904 and left wing rear auxiliary implement hydraulic subsystem 908, then passes through right wing front shank frame hydraulic flow control valves 930A, 930B, 930C, and right wing rear auxiliary implement hydraulic flow control valves 934A, 934B, 934C, and through left wing front shank frame hydraulic flow control valves 932A, 932B, 932C, and left wing rear auxiliary implement hydraulic flow control valves 936A, 936B, 936C, respectively. The hydraulic flow and pressure is then admitted into right wing front shank frame hydraulic cylinders 938A, 938B, 938C, and right wing rear auxiliary implement hydraulic cylinders 942A, 942B, 942C, and into left wing front shank frame hydraulic cylinders 940A, 940B, 940C, and left wing rear auxiliary implement hydraulic cylinders 944A, 944B, 944C, respectively.

Figure 4:
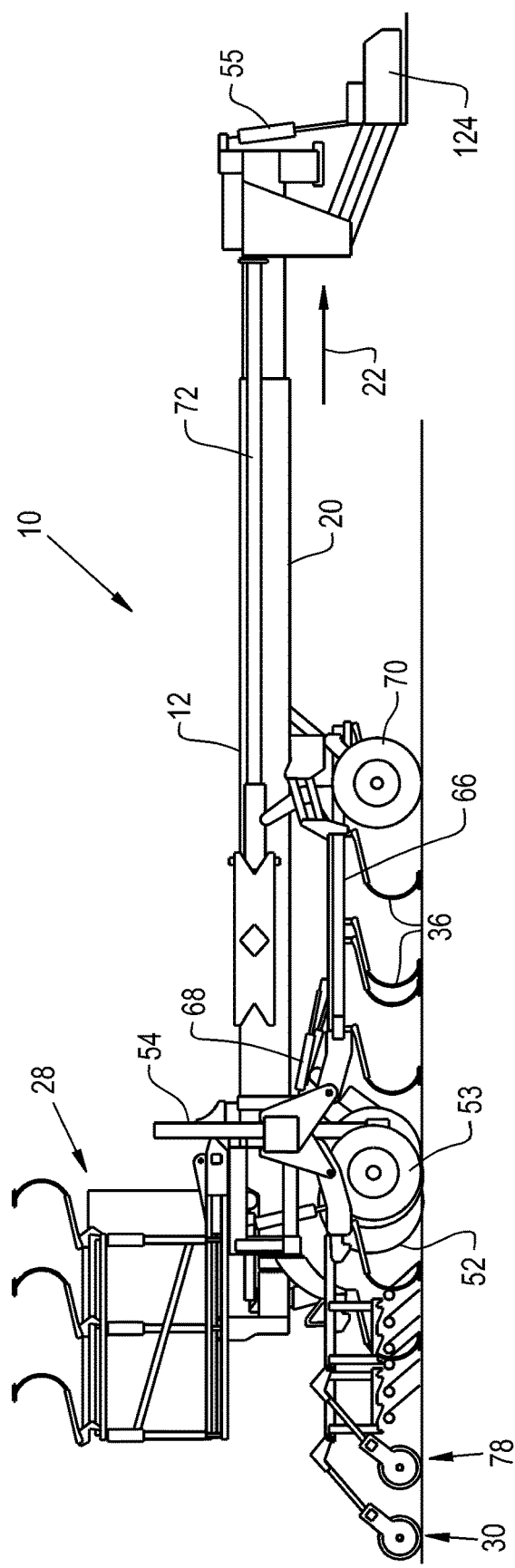
FIG. 4 is a side view of the agricultural tillage implement shown in FIGS. 1-3, with the main shank frame shown in the transport position, the main frame lowered, the main rear auxiliary implement lowered, and the wing front shank frames and wing section rear auxiliary implements in their generally horizontal positions.
Figure 5:
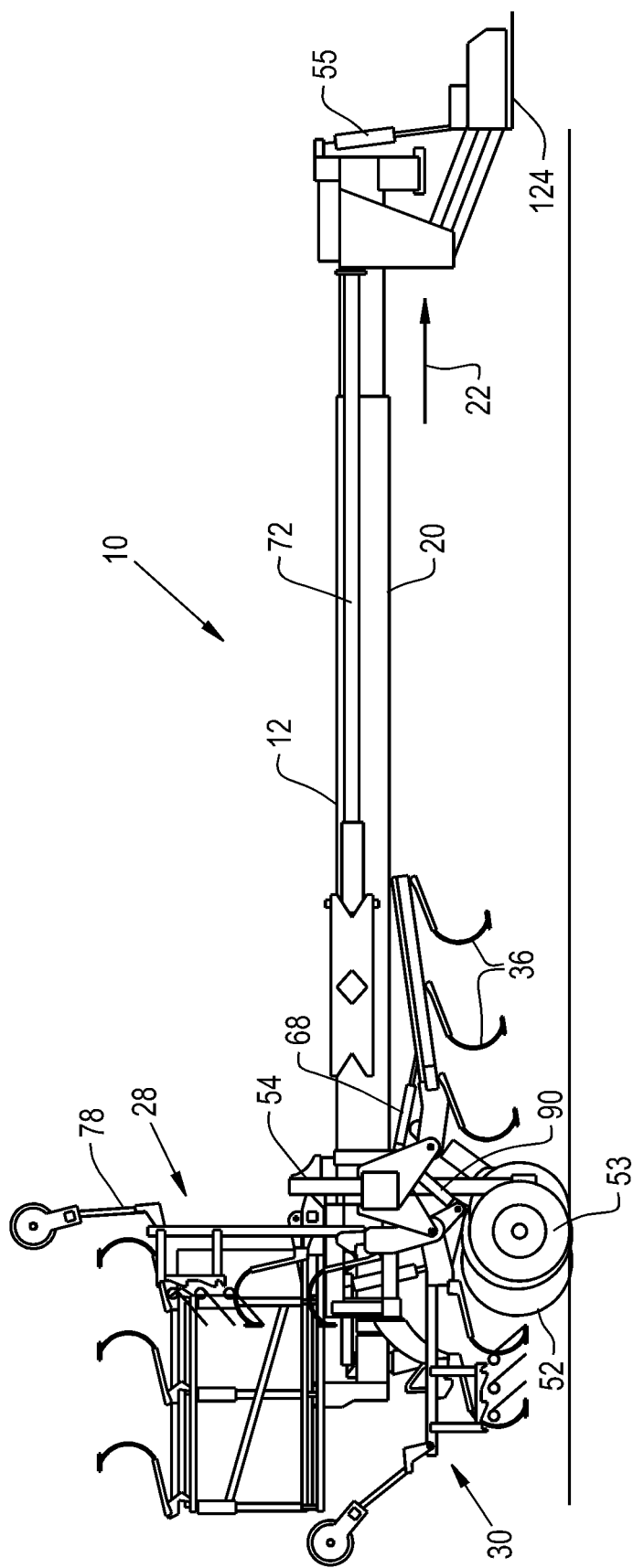
FIG. 5 is a side view of the agricultural tillage implement shown in FIGS. 1-4, with the main shank frame in the transport position, the main frame lifted, the main rear auxiliary implement raised, and the wing section rear auxiliary implements in their generally vertical positions.

Right wing front shank frame hydraulic cylinders 938A, 938B, and 938C, and left wing front shank frame hydraulic cylinders 940A, 940B, and 940C represent the hydraulic cylinders 68 shown in FIGS. 1, 4, and 5. Right wing rear auxiliary implement hydraulic cylinders 942A, 942B, and 942C, and left wing rear auxiliary implement hydraulic cylinders 944A, 944B, and 944C represent the hydraulic cylinders 90 shown in FIG. 5. The hydraulic flow and pressure then returns from the tillage implement hydraulic system 900 by way of second solenoid operated normally closed two way poppet valve 922. By way of the hydraulic arrangement shown in FIG. 7, the tillage implement hydraulic system 900 functions to coordinate the motions of the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa.

Each of the first main shank frame solenoid operated normally closed two position one way valve 910, the second main shank frame solenoid operated normally closed two position one way valve 912, the first solenoid operated normally closed two way poppet valve 920, and the second solenoid operated normally closed two way poppet valve 922 may be connected to a controller 946. The controller 946 may be operable to selectively coordinate the main shank frame hydraulic cylinder 928 and the right wing front shank frame hydraulic cylinders 938A, 938B, and 938C, the left wing front shank frame hydraulic cylinders 940A, 940B, and 940C the right wing rear auxiliary implement hydraulic cylinders 942A, 942B, and 942C, and the left wing rear auxiliary implement hydraulic cylinders 944A, 944B, and 944C, to function as described previously.

Figure 8:
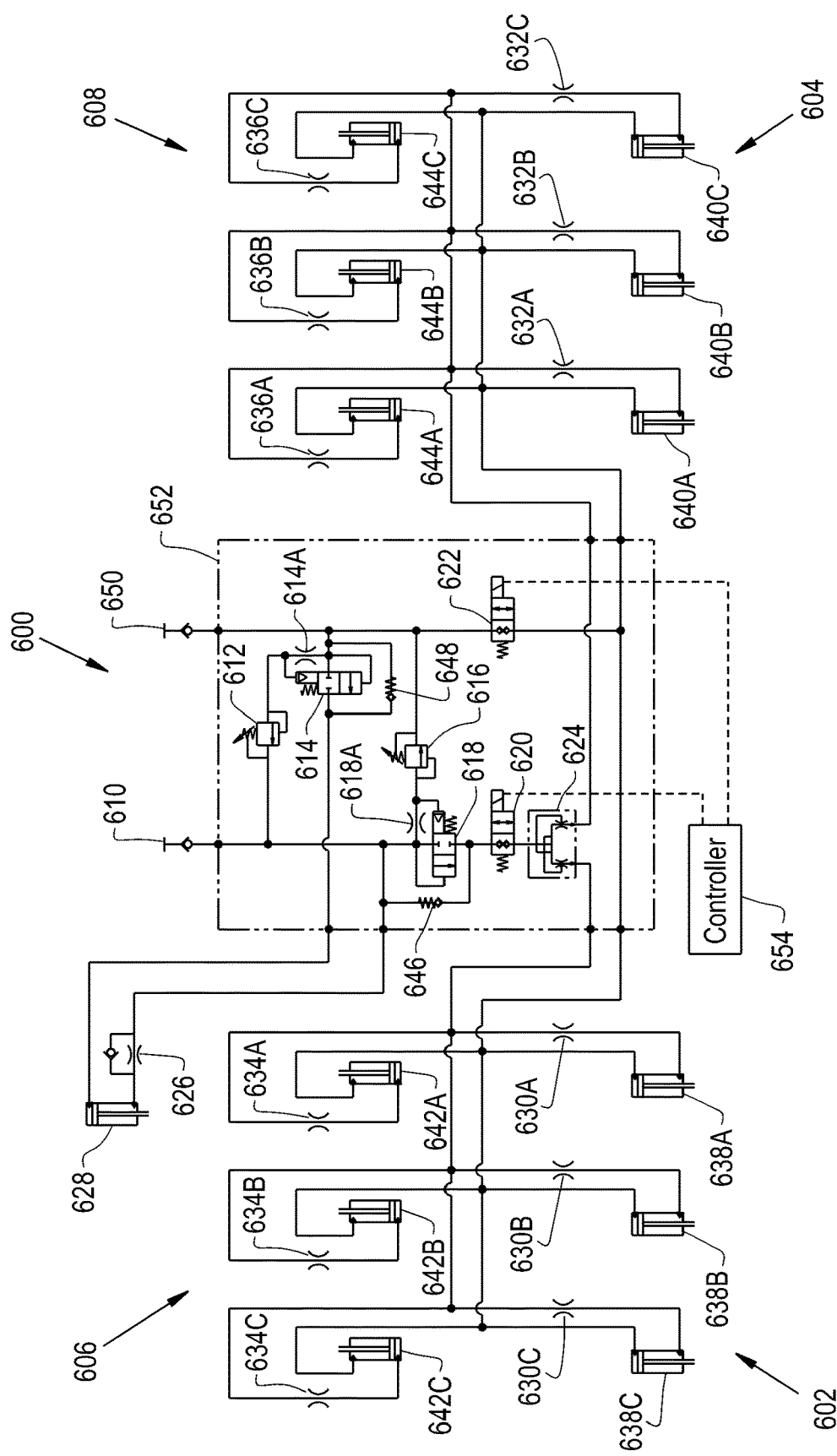
FIG. 8 is a schematic illustration of a tillage implement hydraulic system according to an embodiment of the present invention.

Turning now to FIG. 8, a schematic illustration of another exemplary tillage implement hydraulic system 600 upon which an embodiment of the present invention may be used is shown. The tillage implement hydraulic system 600 includes a right wing front shank frame hydraulic subsystem 602, a left wing front shank frame hydraulic subsystem 604, a right wing rear auxiliary implement hydraulic subsystem 606, and a left wing rear auxiliary implement hydraulic subsystem 608. When transitioning from the operating configuration to the transport configuration, hydraulic pressure and flow is admitted to the tillage implement hydraulic system 600, whereupon the hydraulic pressure and flow passes through a first check valve 610 upon entering manifold 652.

Part of the hydraulic pressure and flow then proceeds to main shank frame hydraulic cylinder 628 by way of main shank frame hydraulic flow control valve 626. Thereafter, this part of the hydraulic pressure and flow passes back into the manifold 652, then passes through a first spring biased vent to open directional blocking valve 614 in parallel with third check valve 648, and returns from the tillage implement hydraulic system 600 by way of fourth check valve 650. When transitioning from the transport configuration to the operating configuration, the hydraulic pressure and flow are reversed, with the first spring biased vent to open directional blocking valve 614 being piloted by hydraulic pressure taken from the tillage implement hydraulic system 600 immediately after fourth check valve 650 by way of a hydraulic flow restrictor 614A. Hydraulic pressure piloting the first spring biased vent to open directional blocking valve 614 is limited by a first hydraulic pressure control valve 612. The hydraulic flow then returns from the tillage implement hydraulic system 600 by way of first check valve 610.

When transitioning from the operating configuration to the transport configuration, another part of the hydraulic pressure and flow, along with that which proceeds to the main shank frame hydraulic cylinder 628, then proceeds to 50/50 hydraulic flow divider and combiner 624 by way of second spring biased vent to open directional blocking valve 618 in parallel with second check valve 646 and by way of first solenoid operated normally closed two way poppet valve 620. The second spring biased vent to open directional blocking valve 618 is piloted by hydraulic pressure taken from the tillage implement hydraulic system 600 immediately after first check valve 610 by way of a hydraulic flow restrictor 618A. Hydraulic pressure piloting the second spring biased vent to open directional blocking valve 618 is limited by a second hydraulic pressure control valve 616.

Hydraulic flow and pressure proceeding from the hydraulic flow divider and combiner 624, having been divided between hydraulic flow and pressure going to the right wing front shank frame hydraulic subsystem 602 and right wing rear auxiliary implement hydraulic subsystem 606, and that going to the left wing front shank frame hydraulic subsystem 604 and left wing rear auxiliary implement hydraulic subsystem 608, then passes through right wing front shank frame hydraulic flow restrictors 630A, 630B, 630C, and right wing rear auxiliary implement hydraulic flow restrictors 634A, 634B, 634C, and through left wing front shank frame hydraulic flow restrictors 632A, 632B, 632C, and left wing rear auxiliary implement hydraulic flow restrictors 636A, 636B, 636C, respectively. The hydraulic flow and pressure is then admitted into right wing front shank frame hydraulic cylinders 638A, 638B, 638C, and right wing rear auxiliary implement hydraulic cylinders 642A, 642B, 642C, and into left wing front shank frame hydraulic cylinders 640A, 640B, 640C, and left wing rear auxiliary implement hydraulic cylinders 644A, 644B, 644C, respectively.

Right wing front shank frame hydraulic cylinders 638A, 638B, and 638C, and left wing front shank frame hydraulic cylinders 640A, 640B, and 640C represent the hydraulic cylinders 68 shown in FIGS. 1, 4, and 5. Right wing rear auxiliary implement hydraulic cylinders 642A, 642B, and 642C, and left wing rear auxiliary implement hydraulic cylinders 644A, 644B, and 644C represent the hydraulic cylinders 90 shown in FIG. 5. The hydraulic flow and pressure then returns from the tillage implement hydraulic system 600 by way of manifold 652, second solenoid operated normally closed two way poppet valve 622, and fourth check valve 650. By way of the hydraulic arrangement shown in FIG. 8, the tillage implement hydraulic system 600 functions to coordinate the motions of the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa. A controller 654 connected to the first solenoid operated normally closed two way poppet valve 620 and to the second solenoid operated normally closed two way poppet valve 622 may be operable to selectively coordinate the main shank frame hydraulic cylinder 628 and the right wing front shank frame hydraulic cylinders 638A, 638B, and 638C, the left wing front shank frame hydraulic cylinders 640A, 640B, and 640C the right wing rear auxiliary implement hydraulic cylinders 642A, 642B, and 642C, and the left wing rear auxiliary implement hydraulic cylinders 644A, 644B, and 644C, to function as described previously.

Figure 9:
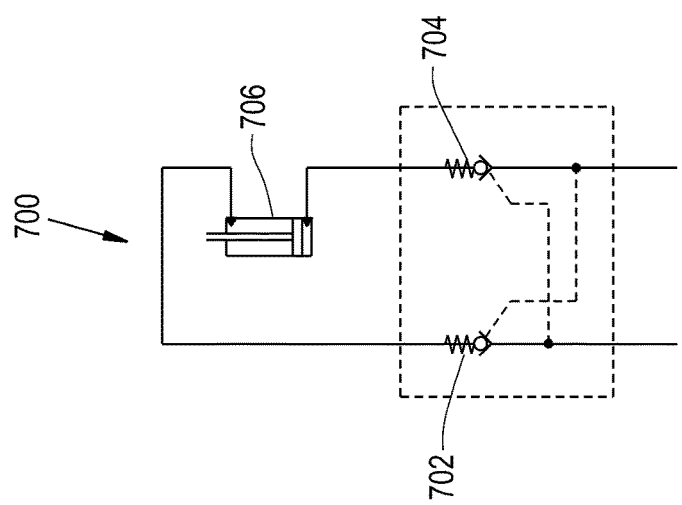
FIG. 9 is a schematic illustration of a tillage implement hydraulic system according to another embodiment of the present invention.

Turning now to FIG. 9, a schematic illustration of a hitch lock hydraulic system 700 upon which an embodiment of the present invention may be used, along with being used with either of the tillage implement hydraulic systems 600 or 900, is shown. Hydraulic pressure and flow is admitted to the hitch lock hydraulic system 700, whereupon the hydraulic pressure and flow passes through a first pilot to open check valve 702, and then proceeds to the hitch lock cylinder 706. Hydraulic flow then exists the hitch lock hydraulic system 700 by way of second pilot to open check valve 704. The first pilot to open check valve 702 receives pilot pressure from hydraulic pressure and flow exiting the hitch lock hydraulic system 700, and the second pilot to open check valve 704 receives pilot pressure from hydraulic pressure and flow entering the hitch lock hydraulic system 700. Although illustrated as separate pilot to open check valves 702, 704, a dual pilot to open check valve may be used. Hitch lock cylinder 706 corresponds to the hitch lock cylinder 126 shown in FIGS. 1 and 2.

Figure 10:
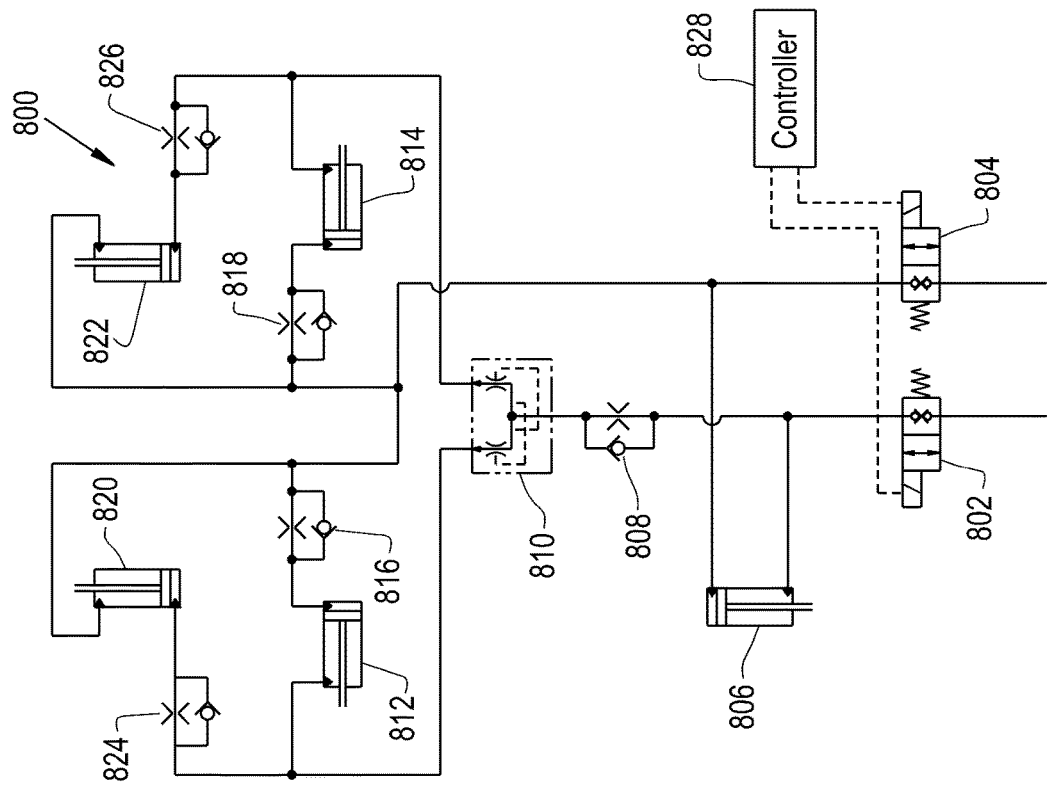
FIG. 10 is a schematic illustration of a tillage implement hydraulic system according to another embodiment of the present invention.

Turning now to FIG. 10, a schematic illustration of a main fold, pivoting swing arm, and pull hitch hydraulic system 800 upon which an embodiment of the present invention may be used, along with being used with either of the tillage implement hydraulic systems 600, 900, and/or 700, is shown. Hydraulic pressure and flow is admitted to the main fold, pivoting swing arm, and pull hitch hydraulic system 800, whereupon the hydraulic pressure and flow passes through a first solenoid operated normally closed two way poppet valve 802. Part of the hydraulic pressure and flow then proceeds to the pull hitch hydraulic cylinder 806, which represents hydraulic cylinder 55 in FIGS. 1-5. Hydraulic flow from the pull hitch hydraulic cylinder 806 then exits the main fold, pivoting swing arm, and pull hitch hydraulic system 800 by way of a second solenoid operated normally closed two way poppet valve 804.

Another part of the hydraulic pressure and flow proceeds to a 50/50 wing fold hydraulic flow divider and combiner 810 by way of a first hydraulic flow control valve 808. One divided part of the hydraulic flow and pressure proceeding from the hydraulic flow divider and combiner 810 is then admitted into right pivoting swing arm hydraulic cylinder 812, which represents pivoting swing arm hydraulic cylinder 110 in FIG. 6, and, in parallel, into right main fold hydraulic cylinder 820, which represents right main fold hydraulic cylinder 116B in FIGS. 1, 3, and 6, by way of right main fold hydraulic flow control valve 824. The other divided part of the hydraulic flow and pressure proceeding from the hydraulic flow divider and combiner 810 is then admitted into left pivoting swing arm hydraulic cylinder 814, which represents the pivoting swing arm hydraulic cylinder opposite pivoting swing arm hydraulic cylinder 110 in FIG. 6, and, in parallel, into left main fold hydraulic cylinder 822, which represents the left main fold hydraulic cylinder 116A in FIGS. 1, 3, and 6, by way of left main fold hydraulic flow control valve 826. Hydraulic flow proceeding from right pivoting swing arm hydraulic cylinder 812 by way of right pivoting swing arm hydraulic flow control valve 816, from left pivoting swing arm hydraulic cylinder 814 by way of left pivoting swing arm hydraulic flow control valve 818, from right main fold hydraulic cylinder 820, and from left main fold hydraulic cylinder 822, then recombines and exits the main fold, pivoting swing arm, and pull hitch hydraulic system 800 by way of the second solenoid operated normally closed two way poppet valve 804.

Pull hitch hydraulic cylinder 806, right pivoting swing arm hydraulic cylinder 812, left pivoting swing arm hydraulic cylinder 814, left main fold hydraulic cylinder 822, and right main fold hydraulic cylinder 820 represent pull hitch hydraulic cylinder 55, right and left pivoting swing arm hydraulic cylinders 110, left main fold hydraulic cylinder 116A, and right main fold hydraulic cylinder 116B, respectively, shown variously in FIGS. 1 through 6. The hitch lock hydraulic system 700 and main fold, pivoting swing arm, and pull hitch hydraulic system 800, in combination with tillage implement hydraulic system 600 or 900, functions to coordinate the motions of the telescoping hitch lock cylinder 126, the pull hitch 124, the draft linkage assemblies 200, the forward folding wing sections 14A, 14B, 16A, 16B, 18A, and 18B, the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa. This is accomplished by way of the hydraulic arrangements shown in FIGS. 9 and 10, in combination with either of the hydraulic arrangements shown in FIG. 7 or 8. A controller 828 connected to first solenoid operated normally closed two way poppet valve 802 and to second solenoid operated normally closed two way poppet valve 804 may be operable to selectively coordinate the pull hitch hydraulic cylinder 806, the right pivoting swing arm hydraulic cylinder 812, the left pivoting swing arm hydraulic cylinder 814, the right main fold hydraulic cylinder 820, and the left main fold hydraulic cylinder 822 with the other hydraulic cylinders of the agricultural tillage implement, as described previously.

Figure 11:
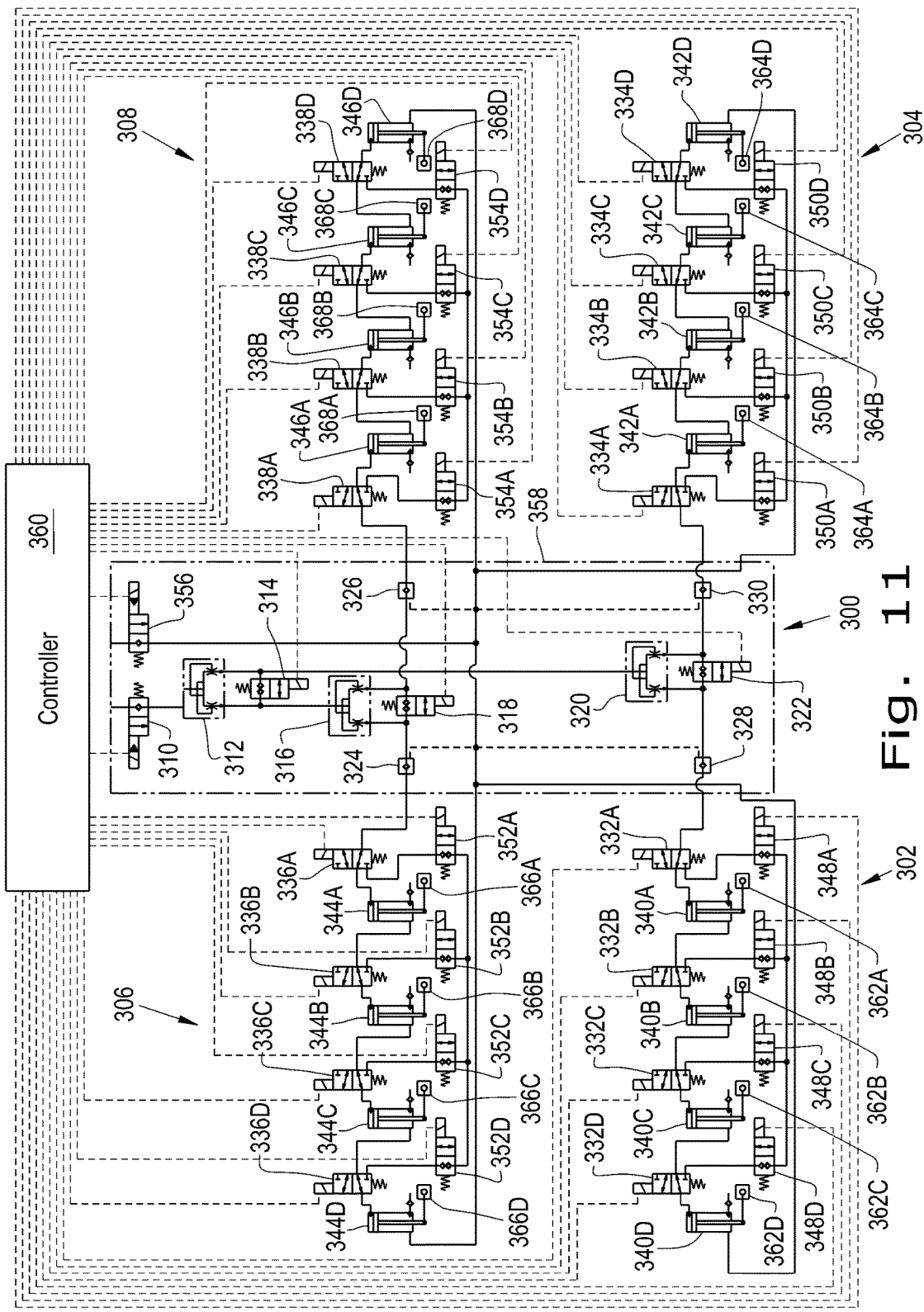
FIG. 11 is a schematic illustration of a tillage implement hydraulic system according to another embodiment of the present invention.

Turning now to FIG. 11, a schematic illustration of a tillage implement hydraulic system 300 upon which an embodiment of the present invention may be used, along with being used with tillage implement hydraulic systems 700, 800, and 600 or 900, is shown. The tillage implement hydraulic system 300 includes a right wing front gauge wheel hydraulic subsystem 302, a left wing front gauge wheel hydraulic subsystem 304, a right wing rear lift wheel hydraulic subsystem 306, and a left wing rear lift wheel hydraulic subsystem 308. Hydraulic pressure and flow is selectively admitted to the tillage implement hydraulic system 300 by a first solenoid operated normally closed directional control check valve with manual override 310, whereupon the hydraulic pressure and flow proceeds to a first hydraulic flow divider and combiner 312, which splits the hydraulic flow between the rear lift wheel hydraulic subsystems 306, 308, and the front gauge wheel hydraulic subsystems 302, 304, respectively. A first solenoid operated normally closed two way poppet bypass valve 314 interconnects the hydraulic flow proceeding to the rear lift wheel hydraulic subsystems 306, 308, and to the front gauge wheel hydraulic subsystems 302, 304, subsequent to its division by the first hydraulic flow divider and combiner 312, which first solenoid operated normally closed two way poppet bypass valve 314 may selectively rejoin the flow proceeding from the first hydraulic flow divider and combiner 312 for use in one or the other of the rear lift wheel hydraulic subsystems 306, 308, or the front gauge wheel hydraulic subsystems 302, 304, according to need. In this way, actuation of hydraulic cylinders within the rear lift wheel hydraulic subsystems 306, 308, and within the front gauge wheel hydraulic subsystems 302, 304 may be accomplished in coordinated fashion by use of the first hydraulic flow divider and combiner 312, or may be accomplished selectively by rejoining the flow proceeding from the first hydraulic flow divider and combiner 312 using the first solenoid operated normally closed two way poppet bypass valve 314.

The hydraulic flow proceeding to the rear lift wheel hydraulic subsystems 306, 308, is then further split in a second hydraulic flow divider and combiner 316 between the right wing rear lift wheel hydraulic subsystem 306 and the left wing rear lift wheel hydraulic subsystem 308. A second solenoid operated normally closed two way poppet bypass valve 318 interconnects the hydraulic flow proceeding to the right wing rear lift wheel hydraulic subsystem 306 and to the left wing rear lift wheel hydraulic subsystem 308, subsequent to its division by the second hydraulic flow divider and combiner 316, which second solenoid operated normally closed two way poppet bypass valve 318 may selectively rejoin the flow proceeding from the second hydraulic flow divider and combiner 316 for use in one or the other of the right wing rear lift wheel hydraulic subsystem 306 or the left wing rear lift wheel hydraulic subsystem 308, according to need. In this way, actuation of hydraulic cylinders within the right wing rear lift wheel hydraulic subsystem 306 and within the left wing rear lift wheel hydraulic subsystem 308 may be accomplished in coordinated fashion by use of the second hydraulic flow divider and combiner 316, or may be accomplished selectively by rejoining the flow proceeding from the second hydraulic flow divider and combiner 316 using the second solenoid operated normally closed two way poppet bypass valve 318.

The hydraulic flow proceeding to the front gauge wheel hydraulic subsystems 302, 304, is then further split in a third hydraulic flow divider and combiner 320 between the right wing front gauge wheel hydraulic subsystem 302 and the left wing front gauge wheel hydraulic subsystem 304. A third solenoid operated normally closed two way poppet bypass valve 322 interconnects the hydraulic flow proceeding to the right wing front gauge wheel hydraulic subsystem 302 and the left wing front gauge wheel hydraulic subsystem 304, subsequent to its division by the third hydraulic flow divider and combiner 320, which third solenoid operated normally closed two way poppet bypass valve 322 may selectively rejoin the flow proceeding from the third hydraulic flow divider and combiner 320 for use in one or the other of the right wing front gauge wheel hydraulic subsystem 302 or the left wing front gauge wheel hydraulic subsystem 304, according to need. In this way, actuation of hydraulic cylinders within the right wing front gauge wheel hydraulic subsystem 302 and within the right wing front gauge wheel hydraulic subsystem 304 may be accomplished in coordinated fashion by use of the third hydraulic flow divider and combiner 320, or may be accomplished selectively by rejoining the flow proceeding from the third hydraulic flow divider and combiner 320 using the third solenoid operated normally closed two way poppet bypass valve 322.

Hydraulic flow and pressure proceeding from the second hydraulic flow divider and combiner 316 and/or the second solenoid operated normally closed two way poppet bypass valve 318 then passes through a first pilot operated check valve 324 or a second pilot operated check valve 326 before proceeding to the right wing rear lift wheel hydraulic subsystem 306 or to the left wing rear lift wheel hydraulic subsystem 308, respectively. Hydraulic flow and pressure proceeding from the third hydraulic flow divider and combiner 320 and/or the third solenoid operated normally closed two way poppet bypass valve 322 then passes through a third pilot operated check valve 328 or a fourth pilot operated check valve 330 before proceeding to the right wing front gauge wheel hydraulic subsystem 302 or the left wing front gauge wheel hydraulic subsystem 304, respectively.

Each of the first solenoid operated normally closed directional control check valve with manual override 310, the first hydraulic flow divider and combiner 312, the first solenoid operated normally closed two way poppet bypass valve 314, the second hydraulic flow divider and combiner 316, the second solenoid operated normally closed two way poppet bypass valve 318, the third hydraulic flow divider and combiner 320, the third solenoid operated normally closed two way poppet bypass valve 322, the first pilot operated check valve 324, the second pilot operated check valve 326, the third pilot operated check valve 328, and the fourth pilot operated check valve 330 may be contained within a manifold 358.

The right wing front gauge wheel hydraulic subsystem 302 has at least one right wing front gauge wheel hydraulic cylinder 340, four being illustrated in the embodiment of the tillage implement hydraulic system 300 shown in FIG. 11, as a non-limiting example, each of which is selectively supplied with hydraulic flow and pressure using a right wing front gauge wheel hydraulic cylinder three way solenoid valve 332. Right wing front gauge wheel hydraulic cylinder 340A may correspond to hydraulic cylinder 62 actuating the gauge wheel assembly 56 on the forward right corner of the main shank frame 28 shown in FIG. 1. Right wing front gauge wheel hydraulic cylinders 340B, 340C, and 340D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Right wing front gauge wheel hydraulic cylinders 340A, 340B, 340C, and 340D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve 332A shown in FIG. 11 is configured to normally apply hydraulic flow and pressure received from the third pilot operated check valve 328 to the right wing front gauge wheel hydraulic cylinder 340A, and upon energization to divert the hydraulic flow and pressure to a right wing front gauge wheel bypass valve 348A. Each of the subsequent right wing front gauge wheel hydraulic cylinder three way solenoid valves 332B, 332C, 332D is configured to normally apply hydraulic flow and pressure received from the previous right wing front gauge wheel hydraulic cylinders 340A, 340B, 340C, respectively, to its own right wing front gauge wheel hydraulic cylinder 340B, 340C, 340D, respectively. Upon energization, each of the subsequent right wing front gauge wheel hydraulic cylinder three way solenoid valves 332B, 332C, 332D is configured to apply hydraulic flow and pressure received from right wing front gauge wheel bypass valve 348A via respective right wing front gauge wheel bypass valve 348B, 348C, 348D, respectively, to its own right wing front gauge wheel hydraulic cylinder 340B, 340C, 340D, respectively.

In this way, the actuation of the right wing front gauge wheel hydraulic cylinders 340A, 340B, 340C, and 340D may be coordinated by leaving the right wing front gauge wheel hydraulic cylinder three way solenoid valves 332A, 332B, 332C, and 332D de-energized so that displacement of each of right wing front gauge wheel hydraulic cylinders 340A, 340B, and 340C forces hydraulic fluid into each of subsequent right wing front gauge wheel hydraulic cylinders 340B, 340C, and 340D, respectively, resulting in coordinated motion. When it is desired to bypass adjustment of right wing front gauge wheel hydraulic cylinder 340A, right wing front gauge wheel hydraulic cylinder three way solenoid valves 332A and 332B are energized, along with right wing front gauge wheel bypass valves 348A and 348B, thereby bypassing right wing front gauge wheel hydraulic cylinder 340A and actuating remaining right wing front gauge wheel hydraulic cylinders 340B, 340C, and 340D. Similarly, if it is desired to bypass adjustment of right wing front gauge wheel hydraulic cylinders 340A and 340B, right wing front gauge wheel hydraulic cylinder three way solenoid valves 332A and 332C are energized, along with right wing front gauge wheel bypass valves 348A and 348C, thereby bypassing right wing front gauge wheel hydraulic cylinders 340A and 340B and actuating remaining right wing front gauge wheel hydraulic cylinders 340C and 340D. Similarly, if it is desired to bypass adjustment of right wing front gauge wheel hydraulic cylinders 340A, 340B, and 340C, right wing front gauge wheel hydraulic cylinder three way solenoid valves 332A and 332D are energized, along with right wing front gauge wheel bypass valves 348A and 348D, thereby bypassing right wing front gauge wheel hydraulic cylinders 340A, 340B, and 340C, and actuating remaining right wing front gauge wheel hydraulic cylinder 340D.

Similarly, the left wing front gauge wheel hydraulic subsystem 304 has at least one left wing front gauge wheel hydraulic cylinder 342, four being illustrated in the embodiment of the tillage implement hydraulic system 300 shown in FIG. 11, as a non-limiting example, each of which is selectively supplied with hydraulic flow and pressure using a left wing front gauge wheel hydraulic cylinder three way solenoid valve 334. Left wing front gauge wheel hydraulic cylinder 342A may correspond to hydraulic cylinder 62 actuating the gauge wheel assembly 56 on the forward left corner of the main shank frame 28 shown in FIG. 1. Left wing front gauge wheel hydraulic cylinders 342B, 342C, and 342D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Left wing front gauge wheel hydraulic cylinders 342A, 342B, 342C, and 342D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve 334A shown in FIG. 11 is configured to normally apply hydraulic flow and pressure received from the fourth pilot operated check valve 330 to the left wing front gauge wheel hydraulic cylinder 342A, and upon energization to divert the hydraulic flow and pressure to a left wing front gauge wheel bypass valve 350A. Each of the subsequent left wing front gauge wheel hydraulic cylinder three way solenoid valves 334B, 334C, 334D is configured to normally apply hydraulic flow and pressure received from the previous left wing front gauge wheel hydraulic cylinders 342A, 342B, 342C, respectively, to its own left wing front gauge wheel hydraulic cylinder 342B, 342C, 342D, respectively. Upon energization, each of the subsequent left wing front gauge wheel hydraulic cylinder three way solenoid valves 334B, 334C, 334D is configured to apply hydraulic flow and pressure received from left wing front gauge wheel bypass valve 350A via respective left wing front gauge wheel bypass valve 350B, 350C, 350D, respectively, to its own left wing front gauge wheel hydraulic cylinder 342B, 342C, 342D, respectively.

In this way, the actuation of the left wing front gauge wheel hydraulic cylinders 342A, 342B, 342C, and 342D may be coordinated by leaving the left wing front gauge wheel hydraulic cylinder three way solenoid valves 334A, 334B, 334C, and 334D de-energized so that displacement of each of left wing front gauge wheel hydraulic cylinders 342A, 342B, and 342C forces hydraulic fluid into each of subsequent left wing front gauge wheel hydraulic cylinders 342B, 342C, and 342D, respectively, resulting in coordinated motion. When it is desired to bypass adjustment of left wing front gauge wheel hydraulic cylinder 342A, left wing front gauge wheel hydraulic cylinder three way solenoid valves 334A and 334B are energized, along with left wing front gauge wheel bypass valves 350A and 350B, thereby bypassing left wing front gauge wheel hydraulic cylinder 342A and actuating remaining left wing front gauge wheel hydraulic cylinders 342B, 342C, and 342D. Similarly, if it is desired to bypass adjustment of left wing front gauge wheel hydraulic cylinders 342A and 342B, left wing front gauge wheel hydraulic cylinder three way solenoid valves 334A and 334C are energized, along with left wing front gauge wheel bypass valves 350A and 350C, thereby bypassing left wing front gauge wheel hydraulic cylinders 342A and 342B and actuating remaining left wing front gauge wheel hydraulic cylinders 342C and 342D. Similarly, if it is desired to bypass adjustment of left wing front gauge wheel hydraulic cylinders 342A, 342B, and 342C, left wing front gauge wheel hydraulic cylinder three way solenoid valves 334A and 334D are energized, along with left wing front gauge wheel bypass valves 350A and 350D, thereby bypassing left wing front gauge wheel hydraulic cylinders 342A, 342B, and 342C, and actuating remaining left wing front gauge wheel hydraulic cylinder 342D.

Similarly, the right wing rear lift wheel hydraulic subsystem 306 has at least one right wing rear lift wheel hydraulic cylinder 344, four being illustrated in the embodiment of the tillage implement hydraulic system shown in FIG. 11, as a non-limiting example, each of which is selectively supplied with hydraulic flow and pressure using a right wing rear lift wheel hydraulic cylinder three way solenoid valve 336. Right wing rear lift wheel hydraulic cylinder 344A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 344B, 344C, and 344D may correspond to hydraulic cylinders 60 actuating wing lift wheels 53 on right inner wing section 14B, right middle wing section 16B, and right outer wing section 18B, respectively, shown in FIG. 1. Alternately, each of the right wing rear lift wheel hydraulic cylinders 344A, 344B, 344C, and 344D may correspond to hydraulic cylinders 60 actuating lift wheels 53 on right wing sections 14B, 16B, 18B. Right wing rear lift wheel hydraulic cylinders 344A, 344B, 344C, and 344D are used to control the depth of the cultivator shanks 36 attached to the rear auxiliary implements 30 and 78.

The first right wing rear lift wheel hydraulic cylinder three way solenoid valve 336A shown in FIG. 11 is configured to normally apply hydraulic flow and pressure received from the first pilot operated check valve 324 to the right wing rear lift wheel hydraulic cylinder 344A, and upon energization to divert the hydraulic flow and pressure to a right wing rear lift wheel bypass valve 352A. Each of the subsequent right wing rear lift wheel hydraulic cylinder three way solenoid valves 336B, 336C, 336D is configured to normally apply hydraulic flow and pressure received from the previous right wing rear lift wheel hydraulic cylinders 344A, 344B, 344C, respectively, to its own right wing rear lift wheel hydraulic cylinders 344B, 344C, 344D, respectively. Upon energization, each of the subsequent right wing rear lift wheel hydraulic cylinder three way solenoid valves 336B, 336C, 336D is configured to apply hydraulic flow and pressure received from right wing rear lift wheel bypass valve 352A via respective right wing rear lift wheel bypass valve 352B, 352C, 352D, respectively, to its own right wing rear lift wheel hydraulic cylinders 344B, 344C, 344D, respectively.

In this way, the actuation of the right wing rear lift wheel hydraulic cylinders 344A, 344B, 344C, and 344D may be coordinated by leaving the right wing rear lift wheel hydraulic cylinder three way solenoid valves 336A, 336B, 336C, and 336D de-energized so that displacement of each of right wing rear lift wheel hydraulic cylinders 344A, 344B, and 344C forces hydraulic fluid into each of subsequent right wing rear lift wheel hydraulic cylinders 344B, 344C, and 344D, respectively, resulting in coordinated motion. When it is desired to bypass adjustment of right wing rear lift wheel hydraulic cylinder 344A, right wing rear lift wheel hydraulic cylinder three way solenoid valves 336A and 336B are energized, along with right wing rear lift wheel bypass valves 352A and 352B, thereby bypassing right wing rear lift wheel hydraulic cylinder 344A and actuating remaining right wing rear lift wheel hydraulic cylinders 344B, 344C, and 344D. Similarly if it is desired to bypass adjustment of right wing rear lift wheel hydraulic cylinders 344A and 344B, right wing rear lift wheel hydraulic cylinder three way solenoid valves 336A and 336C are energized, along with right wing rear lift wheel bypass valves 352A and 352C, thereby bypassing right wing rear lift wheel hydraulic cylinders 344A and 344B and actuating remaining right wing rear lift wheel hydraulic cylinders 344C and 344D. Similarly if it is desired to bypass adjustment of right wing rear lift wheel hydraulic cylinders 344A, 344B, and 344C, right wing rear lift wheel hydraulic cylinder three way solenoid valves 336A and 336D are energized, along with right wing rear lift wheel bypass valves 352A and 352D, thereby bypassing right wing rear lift wheel hydraulic cylinders 344A, 344B, and 344C, and actuating remaining right wing rear lift wheel hydraulic cylinder 344D.

Similarly, the left wing rear lift wheel hydraulic subsystem 308 has at least one left wing rear lift wheel hydraulic cylinder 346, four being illustrated in the embodiment of the tillage implement hydraulic system shown in FIG. 11, as a non-limiting example, each of which is selectively supplied with hydraulic flow and pressure using a left wing rear lift wheel hydraulic cylinder three way solenoid valve 338. Left wing rear lift wheel hydraulic cylinder 346A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 346B, 346C, and 346D may correspond to hydraulic cylinders 60 actuating wing lift wheels 53 on left inner wing section 14A, left middle wing section 16A, and left outer wing section 18A, respectively, shown in FIG. 1. Left wing rear lift wheel hydraulic cylinders 346A, 346B, 346C, and 346D are used to control the depth of the cultivator shanks 36 attached to the rear auxiliary implements 30 and 78.

The first left wing rear lift wheel hydraulic cylinder three way solenoid valve 338A shown in FIG. 11 is configured to normally apply hydraulic flow and pressure received from the second pilot operated check valve 326 to the left wing rear lift wheel hydraulic cylinder 346A, and upon energization to divert the hydraulic flow and pressure to a left wing rear lift wheel bypass valve 354A. Each of the subsequent left wing rear lift wheel hydraulic cylinder three way solenoid valves 338B, 338C, 338D is configured to normally apply hydraulic flow and pressure received from the previous left wing rear lift wheel hydraulic cylinders 346A, 346B, 346C, respectively, to its own left wing rear lift wheel hydraulic cylinders 346B, 346C, 346D, respectively. Upon energization, each of the subsequent left wing rear lift wheel hydraulic cylinder three way solenoid valves 338B, 338C, 338D is configured to apply hydraulic flow and pressure received from left wing rear lift wheel bypass valve 354A via respective left wing rear lift wheel bypass valve 354B, 354C, 354D, respectively, to its own left wing rear lift wheel hydraulic cylinders 346B, 346C, 346D, respectively.

In this way, the actuation of the left wing rear lift wheel hydraulic cylinders 346A, 346B, 346C, and 346D may be coordinated by leaving the left wing rear lift wheel hydraulic cylinder three way solenoid valves 338A, 338B, 338C, and 338D de-energized so that displacement of each of left wing rear lift wheel hydraulic cylinders 346A, 346B, and 346C forces hydraulic fluid into each of subsequent left wing rear lift wheel hydraulic cylinders 346B, 346C, and 346D, respectively, resulting in coordinated motion. When it is desired to bypass adjustment of left wing rear lift wheel hydraulic cylinder 346A, left wing rear lift wheel hydraulic cylinder three way solenoid valves 338A and 338B are energized, along with left wing rear lift wheel bypass valves 354A and 354B, thereby bypassing left wing rear lift wheel hydraulic cylinder 346A and actuating remaining left wing rear lift wheel hydraulic cylinders 346B, 346C, and 346D. Similarly, if it is desired to bypass adjustment of left wing rear lift wheel hydraulic cylinders 346A and 346B, left wing rear lift wheel hydraulic cylinder three way solenoid valves 338A and 338C are energized, along with left wing rear lift wheel bypass valves 354A and 354C, thereby bypassing left wing rear lift wheel hydraulic cylinders 346A and 346B and actuating remaining left wing rear lift wheel hydraulic cylinders 346C and 346D. Similarly, if it is desired to bypass adjustment of left wing rear lift wheel hydraulic cylinders 346A, 346B, and 346C, left wing rear lift wheel hydraulic cylinder three way solenoid valves 338A and 338D are energized, along with left wing rear lift wheel bypass valves 354A and 354D, thereby bypassing left wing rear lift wheel hydraulic cylinders 346A, 346B, and 346C, and actuating remaining left wing rear lift wheel hydraulic cylinder 346D.

Subsequent to right wing front gauge wheel hydraulic cylinder 340D, left wing front gauge wheel hydraulic cylinder 342D, right wing rear lift wheel hydraulic cylinder 344D, and left wing rear lift wheel hydraulic cylinder 346D, the hydraulic flow returns from tillage implement hydraulic system 300 via a second solenoid operated normally closed directional control check valve with manual override 356, which may also be contained within the manifold 358.

Each of the first solenoid operated normally closed directional control check valve with manual override 310, the first solenoid operated normally closed two way poppet bypass valve 314, the second solenoid operated normally closed two way poppet bypass valve 318, the third solenoid operated normally closed two way poppet bypass valve 322, the right wing front gauge wheel hydraulic cylinder three way solenoid valves 332A, 332B, 332C, and 332D, the left wing front gauge hydraulic cylinder three way solenoid valves 334A, 334B, 334C, and 334D, the right wing rear lift wheel hydraulic cylinder three way solenoid valves 336A, 336B, 336C, and 336D, the left wing rear lift wheel hydraulic cylinder three way solenoid valves 338A, 338B, 338C, and 338D, the right wing front gauge wheel bypass valves 348A, 348B, 348C, and 348D, the left wing front gauge wheel bypass valves 350A, 350B, 350C, and 350D, the right wing rear lift wheel bypass valves 352A, 352B, 352C, and 352D, the left wing rear lift wheel bypass valves 354A, 354B, 354C, and 354D, and the second solenoid operated normally closed directional control check valve with manual override 356 may be connected to a controller 360.

The controller 360 may be operable to selectively coordinate the hydraulic cylinders of the right wing front gauge wheel hydraulic subsystem 302, the left wing front gauge wheel hydraulic subsystem 304, the right wing rear lift wheel hydraulic subsystem 306, and the left wing rear lift wheel hydraulic subsystem 308 using the first solenoid operated normally closed two way poppet bypass valve 314, the second solenoid operated normally closed two way poppet bypass valve 318, and the third solenoid operated normally closed two way poppet bypass valve 322, to function as described previously.

The controller 360 may be further operable to selectively coordinate the right wing front gauge wheel hydraulic cylinders 340A, 340B, 340C, and 340D using the right wing front gauge wheel hydraulic cylinder three way solenoid valves 332A, 332B, 332C, and 332D, and the right wing front gauge wheel bypass valves 348A, 348B, 348C, and 348D, as described previously. The controller 360 may be further operable to selectively coordinate the left wing front gauge wheel hydraulic cylinders 342A, 342B, 342C, and 342D using the left wing front gauge hydraulic cylinder three way solenoid valves 334A, 334B, 334C, and 334D, and the left wing front gauge wheel bypass valves 350A, 350B, 350C, and 350D, as described previously. The controller 360 may be further operable to selectively coordinate the right wing rear lift wheel hydraulic cylinders 344A, 344B, 344C, and 344D using the right wing rear lift wheel hydraulic cylinder three way solenoid valves 336A, 336B, 336C, and 336D, and the right wing rear lift wheel bypass valves 352A, 352B, 352C, and 352D, as described previously. The controller 360 may be further operable to selectively coordinate the left wing rear lift wheel hydraulic cylinders 346A, 346B, 346C, and 346D using the left wing rear lift wheel hydraulic cylinder three way solenoid valves 338A, 338B, 338C, and 338D, and the left wing rear lift wheel bypass valves 354A, 354B, 354C, and 354D, as described previously.

Each of the right wing front gauge wheel hydraulic cylinders 340A, 340B, 340C, and 340D may be provided with a right wing front gauge wheel hydraulic cylinder displacement detecting device 362A, 362B, 362C, and 362D, respectively. The right wing front gauge wheel hydraulic cylinder displacement detecting devices 362A, 362B, 362C, and 362D may each be connected to the controller 360 (connection not shown for simplicity), and provide signals proportional to the displacement of the right wing front gauge wheel hydraulic cylinders 340A, 340B, 340C, 340D. Each of the left wing front gauge wheel hydraulic cylinders 342A, 342B, 342C, and 342D may be provided with a left wing front gauge wheel hydraulic cylinder displacement detecting device 364A, 364B, 364C, and 364D, respectively. The left wing front gauge wheel hydraulic cylinder displacement detecting devices 364A, 364B, 364C, and 364D may each be connected to the controller 360 (connection not shown for simplicity), and provide signals proportional to the displacement of the left wing front gauge wheel hydraulic cylinders 342A, 342B, 342C, and 342D.

Each of the right wing rear lift wheel hydraulic cylinders 344A, 344B, 344C, and 344D may be provided with a right wing rear lift wheel hydraulic cylinder displacement detecting device 366A, 366B, 366C, and 366D, respectively. The right wing rear lift wheel hydraulic cylinder displacement detecting devices 366A, 366B, 366C, and 366D may each be connected to the controller 360 (connection not shown for simplicity), and provide signals proportional to the displacement of the right wing rear lift wheel hydraulic cylinders 344A, 344B, 344C, and 344D. Each of the left wing rear lift wheel hydraulic cylinders 346A, 346B, 346C, and 346D may be provided with a left wing rear lift wheel hydraulic cylinder displacement detecting device 368A, 368B, 368C, and 368D, respectively. The left wing rear lift wheel hydraulic cylinder displacement detecting device 368A, 368B, 368C, and 368D may each be connected to the controller 360 (connection not shown for simplicity), and provide signals proportional to the displacement of the left wing rear lift wheel hydraulic cylinders 346A, 346B, 346C, and 346D.

A rheostat type of sensor is shown in FIG. 11, although any kind of sensor producing an output proportional to sensed displacement may be used. The controller 360 may calibrate the right wing front gauge wheel hydraulic cylinders 340A, 340B, 340C, and 340D, the left wing front gauge wheel hydraulic cylinders 342A, 342B, 342C, and 342D, the right wing rear lift wheel hydraulic cylinders 344A, 344B, 344C, and 344D, and the left wing rear lift wheel hydraulic cylinders 346A, 346B, 346C, and 346D by first extending each to its maximum length. Individual readings are then taken from the hydraulic cylinder displacement detecting devices 362A, 362B, 362C, 362D, 364A, 364B, 364C, 364D, 366A, 366B, 366C, 366D, 368A, 368B, 368C, and 368D. The agricultural tillage implement 10 is then lowered so that the tools, in this embodiment the cultivator shanks 36, just touch the level surface. Once this condition is achieved, individual readings are again taken from the hydraulic cylinder displacement detecting devices 362A, 362B, 362C, 362D, 364A, 364B, 364C, 364D, 366A, 366B, 366C, 366D, 368A, 368B, 368C, and 368D. These displacement signals may then be stored in the controller 360, and provide the synchronized set point for the displacement detecting devices 362A, 362B, 362C, 362D, 364A, 364B, 364C, 364D, 366A, 366B, 366C, 366D, 368A, 368B, 368C, and 368D.

Periodically during the operation of the agricultural tillage implement 10, the readings of the hydraulic cylinder displacement detecting devices 362A, 362B, 362C, 362D, 364A, 364B, 364C, 364D, 366A, 366B, 366C, 366D, 368A, 368B, 368C, and 368D may be determined and, if they deviate from the set point initially established, the controller 360 corrects the appropriate hydraulic cylinder 340A, 340B, 340C, 340D, 342A, 342B, 342C, 342D, 344A, 344B, 344C, 344D, 346A, 346B, 346C, or 346D to achieve the intended set point. This may be done independently of other hydraulic cylinders using the methods described previously. The agricultural tillage implement 10 is then able to provide accurate depth of penetration of the tools, in this embodiment the cultivator shanks 36.

Figure 12:
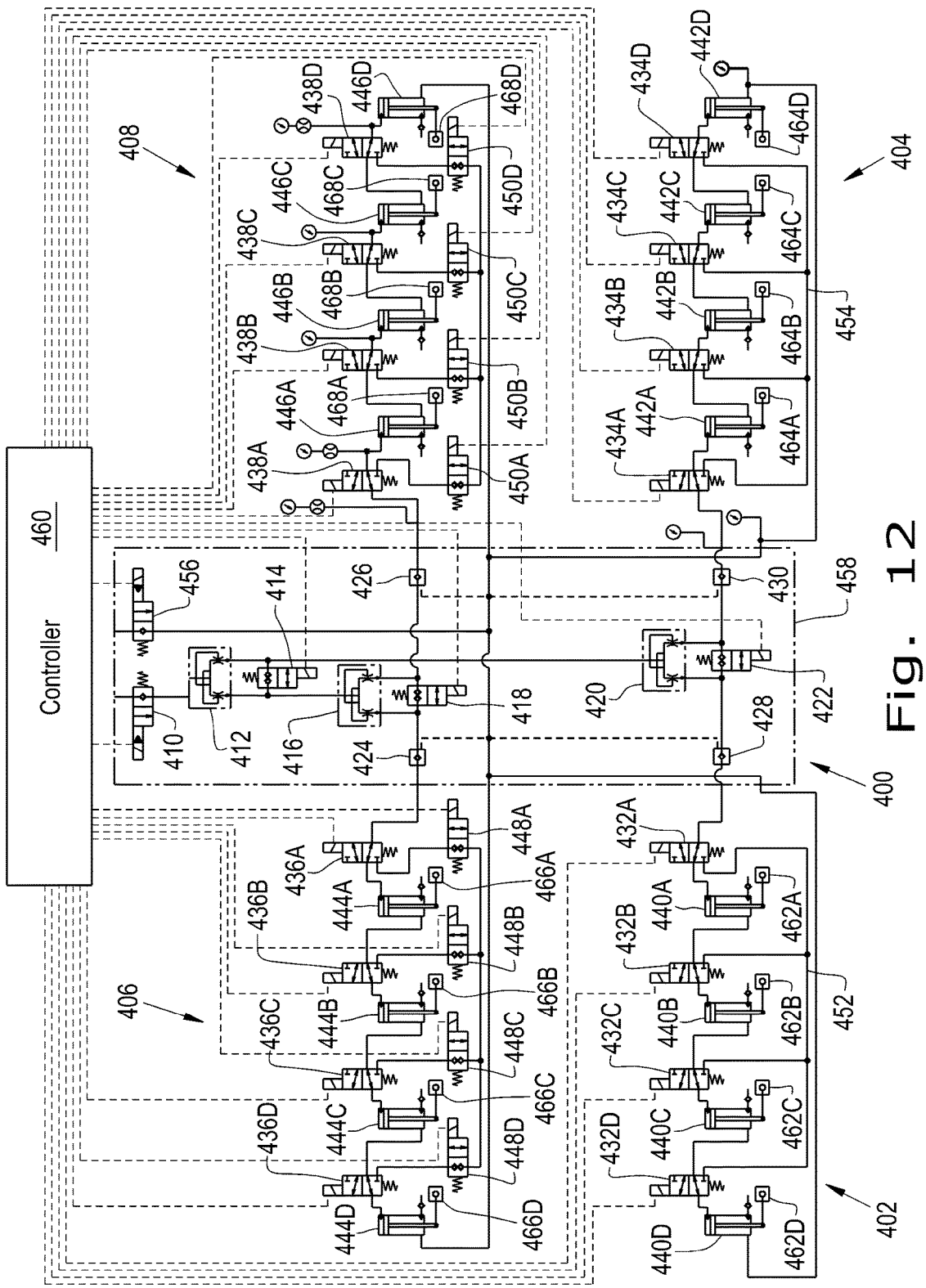
FIG. 12 is a schematic illustration of a tillage implement hydraulic system according to another embodiment of the present invention.

Turning now to FIG. 12, a schematic illustration of a tillage implement hydraulic system 400 upon which an embodiment of the present invention may be used, along with being used with tillage implement hydraulic systems 700, 800, 600 or 900, and 300, is shown. The tillage implement hydraulic system 400 includes a right wing front gauge wheel hydraulic subsystem 402, a left wing front gauge wheel hydraulic subsystem 404, a right wing rear lift wheel hydraulic subsystem 406, and a left wing rear lift wheel hydraulic subsystem 408. Hydraulic pressure and flow is selectively admitted to the tillage implement hydraulic system 400 by a first solenoid operated normally closed directional control check valve with manual override 410, whereupon the hydraulic pressure and flow proceeds to a first hydraulic flow divider and combiner 412, which splits the hydraulic flow between the rear lift wheel hydraulic subsystems 406, 408, and the front gauge wheel hydraulic subsystems 402, 404, respectively. A first solenoid operated normally closed two way poppet bypass valve 414 interconnects the hydraulic flow proceeding to the rear lift wheel hydraulic subsystems 406, 408, and to the front gauge wheel hydraulic subsystems 402, 404, subsequent to its division by the first hydraulic flow divider and combiner 412, which first solenoid operated normally closed two way poppet bypass valve 414 may selectively rejoin the flow proceeding from the first hydraulic flow divider and combiner 412 for use in one or the other of the rear lift wheel hydraulic subsystems 406, 408, or the front gauge wheel hydraulic subsystems 402, 404, according to need. In this way, actuation of hydraulic cylinders within the rear lift wheel hydraulic subsystems 406, 408, and within the front gauge wheel hydraulic subsystems 402, 404 may be accomplished in coordinated fashion by use of the first hydraulic flow divider and combiner 412, or may be accomplished selectively by rejoining the flow proceeding from the first hydraulic flow divider and combiner 412 using the first solenoid operated normally closed two way poppet bypass valve 414.

The hydraulic flow proceeding to the rear lift wheel hydraulic subsystems 406, 408, is then further split in a second hydraulic flow divider and combiner 416, which splits the hydraulic flow between the right wing rear lift wheel hydraulic subsystem 406 and the left wing rear lift wheel hydraulic subsystem 408. A second solenoid operated normally closed two way poppet bypass valve 418 interconnects the hydraulic flow proceeding to the right wing rear lift wheel hydraulic subsystem 406 and to the left wing rear lift wheel hydraulic subsystem 408, subsequent to its division by the second hydraulic flow divider and combiner 416, which second solenoid operated normally closed two way poppet bypass valve 418 may selectively rejoin the flow proceeding from the second hydraulic flow divider and combiner 416 for use in one or the other of the right wing rear lift wheel hydraulic subsystem 406 or the left wing rear lift wheel hydraulic subsystem 408, according to need. In this way, actuation of hydraulic cylinders within the right wing rear lift wheel hydraulic subsystem 406 and within the left wing rear lift wheel hydraulic subsystem 408 may be accomplished in coordinated fashion by use of the second hydraulic flow divider and combiner 416, or may be accomplished selectively by rejoining the flow proceeding from the second hydraulic flow divider and combiner 416 using the second solenoid operated normally closed two way poppet bypass valve 418.

The hydraulic flow proceeding to the front gauge wheel hydraulic subsystems 402, 404, is then further split in a third hydraulic flow divider and combiner 420, which splits the hydraulic flow between the right wing front gauge wheel hydraulic subsystem 402 and the left wing front gauge wheel hydraulic subsystem 404. A third solenoid operated normally closed two way poppet bypass valve 422 interconnects the hydraulic flow proceeding to the right wing front gauge wheel hydraulic subsystem 402 and the left wing front gauge wheel hydraulic subsystem 404, subsequent to its division by the third hydraulic flow divider and combiner 420, which third solenoid operated normally closed two way poppet bypass valve 422 may selectively rejoin the flow proceeding from the third hydraulic flow divider and combiner 420 for use in one or the other of the right wing front gauge wheel hydraulic subsystem 402 or the left wing front gauge wheel hydraulic subsystem 404, according to need. In this way, actuation of hydraulic cylinders within the right wing front gauge wheel hydraulic subsystem 402 and within the right wing front gauge wheel hydraulic subsystem 404 may be accomplished in coordinated fashion by use of the third hydraulic flow divider and combiner 420, or may be accomplished selectively by rejoining the flow proceeding from the third hydraulic flow divider and combiner 420 using the third solenoid operated normally closed two way poppet bypass valve 422.

Hydraulic flow and pressure proceeding from the second hydraulic flow divider and combiner 416 and/or the second solenoid operated normally closed two way poppet bypass valve 418 then passes through a first pilot operated check valve 424 or a second pilot operated check valve 426 before proceeding to the right wing rear lift wheel hydraulic subsystem 406 or to the left wing rear lift wheel hydraulic subsystem 408, respectively. Hydraulic flow and pressure proceeding from the third hydraulic flow divider and combiner 420 and/or the third solenoid operated normally closed two way poppet bypass valve 422 then passes through a third pilot operated check valve 428 or a fourth pilot operated check valve 430 before proceeding to the right wing front gauge wheel hydraulic subsystem 402 or the left wing front gauge wheel hydraulic subsystem 404, respectively.

Each of the first solenoid operated normally closed directional control check valve with manual override 410, the first hydraulic flow divider and combiner 412, the first solenoid operated normally closed two way poppet bypass valve 414, the second hydraulic flow divider and combiner 416, the second solenoid operated normally closed two way poppet bypass valve 418, the third hydraulic flow divider and combiner 420, the third solenoid operated normally closed two way poppet bypass valve 422, the first pilot operated check valve 424, the second pilot operated check valve 426, the third pilot operated check valve 428, and the fourth pilot operated check valve 430 may be contained within a manifold 458.

The right wing front gauge wheel hydraulic subsystem 402 has at least one right wing front gauge wheel hydraulic cylinder 440, four being illustrated in the embodiment of the tillage implement hydraulic system 400 shown in FIG. 12, as a non-limiting example, each of which is selectively supplied with hydraulic flow and pressure using a right wing front gauge wheel hydraulic cylinder three way solenoid valve with internal check valve 432. Right wing front gauge wheel hydraulic cylinder 440A may correspond to hydraulic cylinder 62 actuating the gauge wheel assembly 56 on the forward right corner of the main shank frame 28 shown in FIG. 1. Right wing front gauge wheel hydraulic cylinders 440B, 440C, and 440D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Right wing front gauge wheel hydraulic cylinders 440A, 440B, 440C, and 440D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve with internal check valve 432A shown in FIG. 12 is configured to normally apply hydraulic flow and pressure received from the third pilot operated check valve 428 to the right wing front gauge wheel hydraulic cylinder 440A, and upon energization to divert the hydraulic flow and pressure to a right wing front gauge wheel bypass circuit 452. Each of the subsequent right wing front gauge wheel hydraulic cylinder three way solenoid valves with internal check valve 432B, 432C, 432D is configured to normally apply hydraulic flow and pressure received from the previous right wing front gauge wheel hydraulic cylinders 440A, 440B, 440C, respectively, to its own right wing front gauge wheel hydraulic cylinder 440B, 440C, 440D, respectively. Upon energization, each of the subsequent right wing front gauge wheel hydraulic cylinder three way solenoid valves with internal check valves 432B, 432C, 432D is configured to apply hydraulic flow and pressure received from right wing front gauge wheel bypass circuit 452 to its own right wing front gauge wheel hydraulic cylinder 440B, 440C, 440D, respectively.

In this way, the actuation of the right wing front gauge wheel hydraulic cylinders 440A, 440B, 440C, and 440D may be coordinated by leaving the right wing front gauge wheel hydraulic cylinder three way solenoid valves 432A, 432B, 432C, and 432D de-energized so that displacement of each of right wing front gauge wheel hydraulic cylinders 440A, 440B, and 440C forces hydraulic fluid into each of subsequent right wing front gauge wheel hydraulic cylinders 440B, 440C, and 440D, respectively, resulting in coordinated motion. When it is desired to bypass adjustment of right wing front gauge wheel hydraulic cylinder 440A, right wing front gauge wheel hydraulic cylinder three way solenoid valves 432A and 432B are energized, thereby bypassing right wing front gauge wheel hydraulic cylinder 440A and actuating remaining right wing front gauge wheel hydraulic cylinders 440B, 440C, and 440D. Similarly, if it is desired to bypass adjustment of right wing front gauge wheel hydraulic cylinders 440A and 440B, right wing front gauge wheel hydraulic cylinder three way solenoid valves 432A and 432C are energized, thereby bypassing right wing front gauge wheel hydraulic cylinders 440A and 440B, and actuating remaining right wing front gauge wheel hydraulic cylinders 440C and 440D. If it is desired to bypass adjustment of right wing front gauge wheel hydraulic cylinders 440A, 440B, and 440C, right wing front gauge wheel hydraulic cylinder three way solenoid valves 432A and 432D are energized, thereby bypassing right wing front gauge wheel hydraulic cylinders 440A, 440B, and 440C, and actuating remaining right wing front gauge wheel hydraulic cylinder 440D.

Similarly, the left wing front gauge wheel hydraulic subsystem 404 has at least one left wing front gauge wheel hydraulic cylinder 442, four being illustrated in the embodiment of the tillage implement hydraulic system 400 shown in FIG. 12, as a non-limiting example, each of which is selectively supplied with hydraulic flow and pressure using a left wing front gauge wheel hydraulic cylinder three way solenoid valve with internal check valve 434. Left wing front gauge wheel hydraulic cylinder 442A may correspond to hydraulic cylinder 62 actuating the gauge wheel assembly 56 on the forward left corner of the main shank frame 28 shown in FIG. 1. Left wing front gauge wheel hydraulic cylinders 442B, 442C, and 442D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Left wing front gauge wheel hydraulic cylinders 442A, 442B, 442C, and 442D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve with internal check valve 434A is configured to normally apply hydraulic flow and pressure received from the fourth pilot operated check valve 430 to the left wing front gauge wheel hydraulic cylinder 442A, and upon energization to divert the hydraulic flow and pressure to a left wing front gauge wheel bypass circuit 454. Each of the subsequent left wing front gauge wheel hydraulic cylinder three way solenoid valves with internal check valves 434B, 434C, 434D is configured to normally apply hydraulic flow and pressure received from the previous left wing front gauge wheel hydraulic cylinders 442A, 442B, 442C, respectively, to its own left wing front gauge wheel hydraulic cylinder 442B, 442C, 442D, respectively. Upon energization, each of the subsequent left wing front gauge wheel hydraulic cylinder three way solenoid valves with internal check valves 434B, 434C, 434D is configured to apply hydraulic flow and pressure received from left wing front gauge wheel bypass circuit 454 to its own left wing front gauge wheel hydraulic cylinder 442B, 442C, 442D, respectively.

In this way, the actuation of the left wing front gauge wheel hydraulic cylinders 442A, 442B, 442C, and 442D may be coordinated by leaving the left wing front gauge wheel hydraulic cylinder three way solenoid valves 434A, 434B, 434C, and 434D de-energized so that displacement of each of left wing front gauge wheel hydraulic cylinders 442A, 442B, and 442C forces hydraulic fluid into each of subsequent left wing front gauge wheel hydraulic cylinders 442B, 442C, and 442D, respectively, resulting in coordinated motion. When it is desired to bypass adjustment of left wing front gauge wheel hydraulic cylinder 442A, left wing front gauge wheel hydraulic cylinder three way solenoid valves 434A and 434B are energized, thereby bypassing left wing front gauge wheel hydraulic cylinder 442A and actuating remaining left wing front gauge wheel hydraulic cylinders 442B, 442C, and 442D. Similarly, if it is desired to bypass adjustment of left wing front gauge wheel hydraulic cylinders 442A and 442B, left wing front gauge wheel hydraulic cylinder three way solenoid valves 434A and 434C are energized, thereby bypassing left wing front gauge wheel hydraulic cylinders 442A and 442B, and actuating remaining left wing front gauge wheel hydraulic cylinders 442C and 442D. If it is desired to bypass adjustment of left wing front gauge wheel hydraulic cylinders 442A, 442B, and 442C, left wing front gauge wheel hydraulic cylinder three way solenoid valves 434A and 434D are energized, thereby bypassing left wing front gauge wheel hydraulic cylinders 442A, 442B, and 442C, and actuating remaining left wing front gauge wheel hydraulic cylinder 442D.

Similarly, the right wing rear lift wheel hydraulic subsystem 406 has at least one right wing rear lift wheel hydraulic cylinder 444, four being illustrated in the embodiment of the tillage implement hydraulic system 400 shown in FIG. 12, as a non-limiting example, each of which is selectively supplied with hydraulic flow and pressure using a right wing rear lift wheel hydraulic cylinder three way solenoid valve 436. Right wing rear lift wheel hydraulic cylinder 444A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 444B, 444C, and 444D may correspond to hydraulic cylinders 60 actuating wing lift wheels 53 on right inner wing section 14B, right middle wing section 16B, and right outer wing section 18B, respectively, shown in FIG. 1. Right wing rear lift wheel hydraulic cylinders 444A, 444B, 444C, and 444D are used to control the depth of the cultivator shanks 36 attached to the rear auxiliary implements 30 and 78.

The first right wing rear lift wheel hydraulic cylinder three way solenoid valve 436A shown in FIG. 12 is configured to normally apply hydraulic flow and pressure received from the first pilot operated check valve 424 to the right wing rear lift wheel hydraulic cylinder 444A, and upon energization to divert the hydraulic flow and pressure to a right wing rear lift wheel bypass valve 448A. Each of the subsequent right wing rear lift wheel hydraulic cylinder three way solenoid valves 436B, 436C, 436D is configured to normally apply hydraulic flow and pressure received from the previous right wing rear lift wheel hydraulic cylinders 444A, 444B, 444C, respectively, to its own right wing rear lift wheel hydraulic cylinders 444B, 444C, 444D, respectively. Upon energization, each of the subsequent right wing rear lift wheel hydraulic cylinder three way solenoid valves 436B, 436C, 436D is configured to apply hydraulic flow and pressure received from right wing rear lift wheel bypass valve 448A via respective right wing rear lift wheel bypass valve 448B, 448C, 448D, respectively, to its own right wing rear lift wheel hydraulic cylinders 444B, 444C, 444D, respectively.

In this way, the actuation of the right wing rear lift wheel hydraulic cylinders 444A, 444B, 444C, and 444D may be coordinated by leaving the right wing rear lift wheel hydraulic cylinder three way solenoid valves 436A, 436B, 436C, and 436D de-energized so that displacement of each of right wing rear lift wheel hydraulic cylinders 444A, 444B, and 444C forces hydraulic fluid into each of subsequent right wing rear lift wheel hydraulic cylinders 444B, 444C, and 444D, respectively, resulting in coordinated motion. When it is desired to bypass adjustment of right wing rear lift wheel hydraulic cylinder 444A, right wing rear lift wheel hydraulic cylinder three way solenoid valves 436A and 436B are energized, along with right wing rear lift wheel bypass valves 448A and 448B, thereby bypassing right wing rear lift wheel hydraulic cylinder 444A and actuating remaining right wing rear lift wheel hydraulic cylinders 444B, 444C, and 444D. Similarly if it is desired to bypass adjustment of right wing rear lift wheel hydraulic cylinders 444A and 444B, right wing rear lift wheel hydraulic cylinder three way solenoid valves 436A and 436C are energized, along with right wing rear lift wheel bypass valves 448A and 448C, thereby bypassing right wing rear lift wheel hydraulic cylinders 444A and 444B and actuating remaining right wing rear lift wheel hydraulic cylinders 444C and 444D. Similarly if it is desired to bypass adjustment of right wing rear lift wheel hydraulic cylinders 444A, 444B, and 444C, right wing rear lift wheel hydraulic cylinder three way solenoid valves 436A and 436D are energized, along with right wing rear lift wheel bypass valves 448A and 448D, thereby bypassing right wing rear lift wheel hydraulic cylinders 444A, 444B, and 444C, and actuating remaining right wing rear lift wheel hydraulic cylinder 444D. Additionally, the right wing rear lift wheel bypass valves 448A, 448B, 448C, and 448D may assist in limiting leakage from right wing rear lift wheel hydraulic cylinder three way solenoid valves 436A, 436B, 436C, and 436D.

Similarly, the left wing rear lift wheel hydraulic subsystem 408 has at least one left wing rear lift wheel hydraulic cylinder 446, four being illustrated in the embodiment of the tillage implement hydraulic system 400 shown in FIG. 12, as a non-limiting example, each of which is selectively supplied with hydraulic flow and pressure using a left wing rear lift wheel hydraulic cylinder three way solenoid valve 438. Left wing rear lift wheel hydraulic cylinder 446A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 446B, 446C, and 446D may correspond to hydraulic cylinders 60 actuating wing lift wheels 53 on left inner wing section 14A, left middle wing section 16A, and left outer wing section 18A, respectively, shown in FIG. 1. Left wing rear lift wheel hydraulic cylinders 446A, 446B, 446C, and 446D are used to control the depth of the cultivator shanks 36 attached to the rear auxiliary implements 30 and 78.

The first left wing rear lift wheel hydraulic cylinder three way solenoid valve 438A shown in FIG. 12 is configured to normally apply hydraulic flow and pressure received from the second pilot operated check valve 426 to the left wing rear lift wheel hydraulic cylinder 446A, and upon energization to divert the hydraulic flow and pressure to a left wing rear lift wheel bypass valve 450A. Each of the subsequent left wing rear lift wheel hydraulic cylinder three way solenoid valves 438B, 438C, 438D is configured to normally apply hydraulic flow and pressure received from the previous left wing rear lift wheel hydraulic cylinders 446A, 446B, 446C, respectively, to its own left wing rear lift wheel hydraulic cylinders 446B, 446C, 446D, respectively. Upon energization, each of the subsequent left wing rear lift wheel hydraulic cylinder three way solenoid valves 438B, 438C, 438D is configured to apply hydraulic flow and pressure received from left wing rear lift wheel bypass valve 450A via respective left wing rear lift wheel bypass valve 450B, 450C, 450D, respectively, to its own left wing rear lift wheel hydraulic cylinders 446B, 446C, 446D, respectively.

In this way, the actuation of the left wing rear lift wheel hydraulic cylinders 446A, 446B, 446C, and 446D may be coordinated by leaving the left wing rear lift wheel hydraulic cylinder three way solenoid valves 438A, 438B, 438C, and 438D de-energized so that displacement of each of left wing rear lift wheel hydraulic cylinders 446A, 446B, and 446C forces hydraulic fluid into each of subsequent left wing rear lift wheel hydraulic cylinders 446B, 446C, and 446D, respectively, resulting in coordinated motion. When it is desired to bypass adjustment of left wing rear lift wheel hydraulic cylinder 446A, left wing rear lift wheel hydraulic cylinder three way solenoid valves 438A and 438B are energized, along with left wing rear lift wheel bypass valves 450A and 450B, thereby bypassing left wing rear lift wheel hydraulic cylinder 446A and actuating remaining left wing rear lift wheel hydraulic cylinders 446B, 446C, and 446D. Similarly, if it is desired to bypass adjustment of left wing rear lift wheel hydraulic cylinders 446A and 446B, left wing rear lift wheel hydraulic cylinder three way solenoid valves 438A and 438C are energized, along with left wing rear lift wheel bypass valves 450A and 450C, thereby bypassing left wing rear lift wheel hydraulic cylinders 446A and 446B and actuating remaining left wing rear lift wheel hydraulic cylinders 446C and 446D. Similarly, if it is desired to bypass adjustment of left wing rear lift wheel hydraulic cylinders 446A, 446B, and 446C, left wing rear lift wheel hydraulic cylinder three way solenoid valves 438A and 438D are energized, along with left wing rear lift wheel bypass valves 450A and 450D, thereby bypassing left wing rear lift wheel hydraulic cylinders 446A, 446B, and 446C, and actuating remaining left wing rear lift wheel hydraulic cylinder 446D.

Subsequent to right wing front gauge wheel hydraulic cylinder 440D, left wing front gauge wheel hydraulic cylinder 442D, right wing rear lift wheel hydraulic cylinder 444D, and left wing rear lift wheel hydraulic cylinder 446D, the hydraulic flow returns from tillage implement hydraulic system 400 via a second solenoid operated normally closed directional control check valve with manual override 456, which may be within manifold 458.

Each of the first solenoid operated normally closed directional control check valve with manual override 410, the first solenoid operated normally closed two way poppet bypass valve 414, the second solenoid operated normally closed two way poppet bypass valve 418, the third solenoid operated normally closed two way poppet bypass valve 422, the right wing front gauge wheel hydraulic cylinder three way solenoid valves 432A, 432B, 432C, and 432D, the left wing front gauge hydraulic cylinder three way solenoid valves 434A, 434B, 434C, and 434D, the right wing rear lift wheel hydraulic cylinder three way solenoid valves 436A, 436B, 436C, and 436D, the left wing rear lift wheel hydraulic cylinder three way solenoid valves 438A, 438B, 438C, and 438D, the right wing rear lift wheel bypass valves 448A, 448B, 448C, and 448D, the left wing rear lift wheel bypass valves 450A, 450B, 450C, and 450D, and the second solenoid operated normally closed directional control check valve with manual override 456 may be connected to a controller 460.

The controller 460 may be operable to selectively coordinate the hydraulic cylinders of the right wing front gauge wheel hydraulic subsystem 402, the left wing front gauge wheel hydraulic subsystem 404, the right wing rear lift wheel hydraulic subsystem 406, and the left wing rear lift wheel hydraulic subsystem 408 using the first solenoid operated normally closed two way poppet bypass valve 414, the second solenoid operated normally closed two way poppet bypass valve 418, and the third solenoid operated normally closed two way poppet bypass valve 422, to function as described previously.

The controller 460 may further be operable to selectively coordinate the right wing front gauge wheel hydraulic cylinders 440A, 440B, 440C, and 440D using the right wing front gauge wheel hydraulic cylinder three way solenoid valves 432A, 432B, 432C, and 432D, as described previously. The controller 460 may further be operable to selectively coordinate the left wing front gauge wheel hydraulic cylinders 442A, 442B, 442C, and 442D using the left wing front gauge hydraulic cylinder three way solenoid valves 434A, 434B, 434C, and 434D, as described previously. The controller 460 may further be operable to selectively coordinate the right wing rear lift wheel hydraulic cylinders 444A, 444B, 444C, and 444D using the right wing rear lift wheel hydraulic cylinder three way solenoid valves 436A, 436B, 436C, and 436D, and the right wing rear lift wheel bypass valves 448A, 448B, 448C, and 448D, as described previously. The controller 460 may further be operable to selectively coordinate the left wing rear lift wheel hydraulic cylinders 446A, 446B, 446C, and 446D using the left wing rear lift wheel hydraulic cylinder three way solenoid valves 438A, 438B, 438C, and 438D, and the left wing rear lift wheel bypass valves 450A, 450B, 450C, and 450D, as described previously.

Each of the right wing front gauge wheel hydraulic cylinders 440A, 440B, 440C, and 440D may be provided with a right wing front gauge wheel hydraulic cylinder displacement detecting device 462A, 462B, 462C, and 462D, respectively. The right wing front gauge wheel hydraulic cylinder displacement detecting devices 462A, 462B, 462C, and 462D may each be connected to the controller 460 (connection not shown for simplicity), and provide signals proportional to the displacement of the right wing front gauge wheel hydraulic cylinders 440A, 440B, 440C, 440D. Each of the left wing front gauge wheel hydraulic cylinders 442A, 442B, 442C, and 442D may be provided with a left wing front gauge wheel hydraulic cylinder displacement detecting device 464A, 464B, 464C, and 464D, respectively. The left wing front gauge wheel hydraulic cylinder displacement detecting devices 464A, 464B, 464C, and 464D may each be connected to the controller 460 (connection not shown for simplicity), and provide signals proportional to the displacement of the left wing front gauge wheel hydraulic cylinders 442A, 442B, 442C, and 442D.

Each of the right wing rear lift wheel hydraulic cylinders 444A, 444B, 444C, and 444D may be provided with a right wing rear lift wheel hydraulic cylinder displacement detecting device 466A, 466B, 466C, and 466D, respectively. The right wing rear lift wheel hydraulic cylinder displacement detecting devices 466A, 466B, 466C, and 466D may each be connected to the controller 460 (connection not shown for simplicity), and provide signals proportional to the displacement of the right wing rear lift wheel hydraulic cylinders 444A, 444B, 444C, and 444D. Each of the left wing rear lift wheel hydraulic cylinders 446A, 446B, 446C, and 446D may be provided with a left wing rear lift wheel hydraulic cylinder displacement detecting device 468A, 468B, 468C, and 468D, respectively. The left wing rear lift wheel hydraulic cylinder displacement detecting device 468A, 468B, 468C, and 468D may each be connected to the controller 460 (connection not shown for simplicity), and provide signals proportional to the displacement of the left wing rear lift wheel hydraulic cylinders 446A, 446B, 446C, and 446D.

A rheostat type of sensor is shown in FIG. 12, although any kind of sensor producing an output proportional to sensed displacement and/or rate of change of displacement may be used. The controller 460 may again calibrate the right wing front gauge wheel hydraulic cylinders 440A, 440B, 440C, and 440D, the left wing front gauge wheel hydraulic cylinders 442A, 442B, 442C, and 442D, the right wing rear lift wheel hydraulic cylinders 444A, 444B, 444C, and 444D, and the left wing rear lift wheel hydraulic cylinders 446A, 446B, 446C, and 446D by first extending each to its maximum length, similar to the controller 360 in FIG. 11. Individual readings are then taken from the hydraulic cylinder displacement detecting devices 462A, 462B, 462C, 462D, 464A, 464B, 464C, 464D, 466A, 466B, 466C, 466D, 468A, 468B, 468C, and 468D. The agricultural tillage implement 10 is then lowered so that the tools, in this embodiment the cultivator shanks 36, just touch the level surface. Once this condition is achieved, individual readings are again taken from the hydraulic cylinder displacement detecting devices 462A, 462B, 462C, 462D, 464A, 464B, 464C, 464D, 466A, 466B, 466C, 466D, 468A, 468B, 468C, and 468D. These displacement signals may then be stored in the controller 460, and provide the synchronized set point for the displacement detecting devices 462A, 462B, 462C, 462D, 464A, 464B, 464C, 464D, 466A, 466B, 466C, 466D, 468A, 468B, 468C, and 468D.

As with the controller 360, the controller 460 may periodically during the operation of the agricultural tillage implement 10, take the readings of the hydraulic cylinder displacement detecting devices 462A, 462B, 462C, 462D, 464A, 464B, 464C, 464D, 466A, 466B, 466C, 466D, 468A, 468B, 468C, and 468D and, if they deviate from the set point initially established, the controller 460 corrects the appropriate hydraulic cylinder 440A, 440B, 440C, 440D, 442A, 442B, 442C, 442D, 444A, 444B, 444C, 444D, 446A, 446B, 446C, or 446D to achieve the intended set point. This may be done independently of other hydraulic cylinders using the methods described previously. The agricultural tillage implement 10 is then able to provide accurate depth of penetration of the tools, in this embodiment the cultivator shanks 36.

Figure 13:
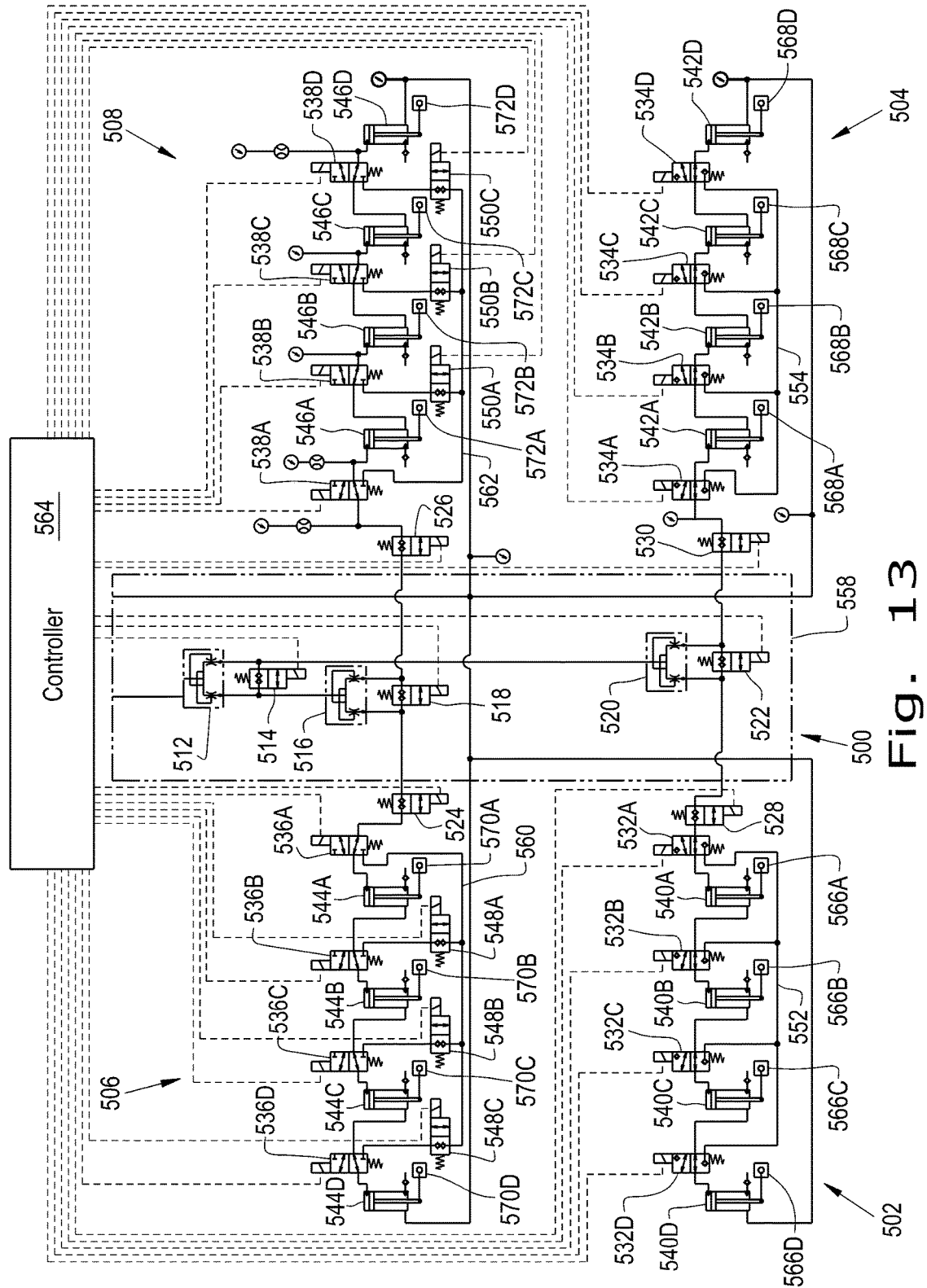
FIG. 13 is a schematic illustration of a tillage implement hydraulic system according to another embodiment of the present invention.

Turning now to FIG. 13, a schematic illustration of a tillage implement hydraulic system 500 upon which an embodiment of the present invention may be used, along with being used with tillage implement hydraulic systems 700, 800, 600 or 900, and 300 or 400, is shown. The tillage implement hydraulic system 500 includes a right wing front gauge wheel hydraulic subsystem 502, a left wing front gauge wheel hydraulic subsystem 504, a right wing rear lift wheel hydraulic subsystem 506, and a left wing rear lift wheel hydraulic subsystem 508. Hydraulic pressure and flow is admitted to the tillage implement hydraulic system 500, whereupon the hydraulic pressure and flow proceeds to a first hydraulic flow divider and combiner 512, which splits the hydraulic flow between the rear lift wheel hydraulic subsystems 506, 508, and the front gauge wheel hydraulic subsystems 502, 504, respectively. A first solenoid operated normally closed two way poppet bypass valve 514 interconnects the hydraulic flow proceeding to the rear lift wheel hydraulic subsystems 506, 508, and to the gauge wheel hydraulic subsystems 502, 504, subsequent to its division by the first hydraulic flow divider and combiner 512, which first solenoid operated normally closed two way poppet bypass valve 514 may selectively rejoin the flow proceeding from the first hydraulic flow divider and combiner 512 for use in one or the other of the rear lift wheel hydraulic subsystems 506, 508, or the front gauge wheel hydraulic subsystems 502, 504, according to need. In this way, actuation of hydraulic cylinders within the rear lift wheel hydraulic subsystems 506, 508, and within the front gauge wheel hydraulic subsystems 502, 504 may be accomplished in coordinated fashion by use of the first hydraulic flow divider and combiner 512, or may be accomplished selectively by rejoining the flow proceeding from the first hydraulic flow divider and combiner 512 using the first solenoid operated normally closed two way poppet bypass valve 514, and then selectively actuating one or more of first solenoid operated normally closed two way poppet valve 524, second solenoid operated normally closed two way poppet valve 526, third solenoid operated normally closed two way poppet valve 528, or fourth solenoid operated normally closed two way poppet valve 530.

The hydraulic flow proceeding to the rear lift wheel hydraulic subsystems 506, 508, is then further split in a second hydraulic flow divider and combiner 516, which splits the hydraulic flow between the right wing rear lift wheel hydraulic subsystem 506 and the left wing rear lift wheel hydraulic subsystem 508. A second solenoid operated normally closed two way poppet bypass valve 518 interconnects the hydraulic flow proceeding to the right wing rear lift wheel hydraulic subsystem 506 and to the left wing rear lift wheel hydraulic subsystem 508, subsequent to its division by the second hydraulic flow divider and combiner 516, which second solenoid operated normally closed two way poppet bypass valve 518 may selectively rejoin the flow proceeding from the second hydraulic flow divider and combiner 516 for use in one or the other of the right wing rear lift wheel hydraulic subsystem 506 or the left wing rear lift wheel hydraulic subsystem 508, according to need. In this way, actuation of hydraulic cylinders within the right wing rear lift wheel hydraulic subsystem 506 and within the left wing rear lift wheel hydraulic subsystem 508 may be accomplished in coordinated fashion by use of the second hydraulic flow divider and combiner 516, or may be accomplished selectively by rejoining the flow proceeding from the second hydraulic flow divider and combiner 516 using the second solenoid operated normally closed two way poppet bypass valve 518, and then selectively actuating one or more of first solenoid operated normally closed two way poppet valve 524 or second solenoid operated normally closed two way poppet valve 526.

The hydraulic flow proceeding to the front gauge wheel hydraulic subsystems 502, 504, is then further split in a third hydraulic flow divider and combiner 520, which splits the hydraulic flow between the right wing front gauge wheel hydraulic subsystem 502 and the left wing front gauge wheel hydraulic subsystem 504. A third solenoid operated normally closed two way poppet bypass valve 522 interconnects the hydraulic flow proceeding to the right wing front gauge wheel hydraulic subsystem 502 and the left wing front gauge wheel hydraulic subsystem 504, subsequent to its division by the third hydraulic flow divider and combiner 520, which third solenoid operated normally closed two way poppet bypass valve 522 may selectively rejoin the flow proceeding from the third hydraulic flow divider and combiner 520 for use in one or the other of the right wing front gauge wheel hydraulic subsystem 502 or the left wing front gauge wheel hydraulic subsystem 504, according to need. In this way, actuation of hydraulic cylinders within the right wing front gauge wheel hydraulic subsystem 502 and within the right wing front gauge wheel hydraulic subsystem 504 may be accomplished in coordinated fashion by use of the third hydraulic flow divider and combiner 520, or may be accomplished selectively by rejoining the flow proceeding from the third hydraulic flow divider and combiner 520 using the third solenoid operated normally closed two way poppet bypass valve 522, and then selectively actuating one or more of third solenoid operated normally closed two way poppet valve 528 or fourth solenoid operated normally closed two way poppet valve 530.

Hydraulic flow and pressure proceeding from the second hydraulic flow divider and combiner 516 and/or the second solenoid operated normally closed two way poppet bypass valve 518 then passes through a first solenoid operated normally closed two way poppet valve 524 or a second solenoid operated normally closed two way poppet valve 526 before proceeding to the right wing rear lift wheel hydraulic subsystem 506 or to the left wing rear lift wheel hydraulic subsystem 508, respectively. Hydraulic flow and pressure proceeding from the third hydraulic flow divider and combiner 520 and/or the third solenoid operated normally closed two way poppet bypass valve 522 then passes through a third solenoid operated normally closed two way poppet valve 528 or a fourth solenoid operated normally closed two way poppet bypass valve 530 before proceeding to the right wing front gauge wheel hydraulic subsystem 502 or the left wing front gauge wheel hydraulic subsystem 504, respectively.

Each of the first hydraulic flow divider and combiner 512, the first solenoid operated normally closed two way poppet bypass valve 514, the second hydraulic flow divider and combiner 516, the second solenoid operated normally closed two way poppet bypass valve 518, the third hydraulic flow divider and combiner 520, and the third solenoid operated normally closed two way poppet bypass valve 522 may be contained within a manifold 558.

The right wing front gauge wheel hydraulic subsystem 502 has at least one right wing front gauge wheel hydraulic cylinder 540, four being illustrated in the embodiment of the tillage implement hydraulic system 500 shown in FIG. 13, as a non-limiting example, each of which is selectively supplied with hydraulic flow and pressure using a right wing front gauge wheel hydraulic cylinder three way solenoid valve with internal check valve 532. Right wing front gauge wheel hydraulic cylinder 540A may correspond to hydraulic cylinder 62 actuating the gauge wheel assembly 56 on the forward right corner of the main shank frame 28 shown in FIG. 1. Right wing front gauge wheel hydraulic cylinders 540B, 540C, and 540D may correspond to hydraulic cylinders 64 actuating the gauge wheel assemblies 70 on right inner wing front shank frame 66B, right middle wing front shank frame 66D, and right outer wing front shank frame 66F, respectively, shown in FIG. 1. Right wing front gauge wheel hydraulic cylinders 540A, 540B, 540C, and 540D are used to control the depth of the cultivator shanks 36 on the main shank frame 28, right inner wing front shank frame 66B, right middle wing front shank frame 66D, and right outer wing front shank frame 66F.

The first right wing front gauge wheel hydraulic cylinder three way solenoid valve with internal check valve 532A shown in FIG. 13 is configured to normally apply hydraulic flow and pressure received from the third solenoid operated normally closed two way poppet valve 528 to the right wing front gauge wheel hydraulic cylinder 540A, and upon energization to divert the hydraulic flow and pressure to a right wing front gauge wheel bypass circuit 552. Each of the subsequent right wing front gauge wheel hydraulic cylinder three way solenoid valves with internal check valve 532B, 532C, 532D is configured to normally apply hydraulic flow and pressure received from the previous right wing front gauge wheel hydraulic cylinders 540A, 540B, 540C, respectively, to its own right wing front gauge wheel hydraulic cylinder 540B, 540C, 540D, respectively. Upon energization, each of the subsequent right wing front gauge wheel hydraulic cylinder three way solenoid valves with internal check valves 532B, 532C, 532D is configured to apply hydraulic flow and pressure received from right wing front gauge wheel bypass circuit 552 to its own right wing front gauge wheel hydraulic cylinder 540B, 540C, 540D, respectively.

In this way, the actuation of the right wing front gauge wheel hydraulic cylinders 540A, 540B, 540C, and 540D may be coordinated by leaving the right wing front gauge wheel hydraulic cylinder three way solenoid valves 532A, 532B, 532C, and 532D de-energized so that displacement of each of right wing front gauge wheel hydraulic cylinders 540A, 540B, and 540C forces hydraulic fluid into each of subsequent right wing front gauge wheel hydraulic cylinders 540B, 540C, and 540D, respectively, resulting in coordinated motion. When it is desired to bypass adjustment of right wing front gauge wheel hydraulic cylinder 540B, right wing front gauge wheel hydraulic cylinder three way solenoid valves 532A and 532B are energized, thereby bypassing right wing front gauge wheel hydraulic cylinder 540A and actuating remaining right wing front gauge wheel hydraulic cylinders 540B, 540C, and 540D. Similarly, if it is desired to bypass adjustment of right wing front gauge wheel hydraulic cylinders 540A and 540B, right wing front gauge wheel hydraulic cylinder three way solenoid valves 532A and 532C are energized, thereby bypassing right wing front gauge wheel hydraulic cylinders 540A and 540B, and actuating remaining right wing front gauge wheel hydraulic cylinders 540C and 540D. If it is desired to bypass adjustment of right wing front gauge wheel hydraulic cylinders 540A, 540B, and 540C, right wing front gauge wheel hydraulic cylinder three way solenoid valves 532A and 532D are energized, thereby bypassing right wing front gauge wheel hydraulic cylinders 540A, 540B, and 540C, and actuating remaining right wing front gauge wheel hydraulic cylinder 540D.

Similarly, the left wing front gauge wheel hydraulic subsystem 504 has at least one left wing front gauge wheel hydraulic cylinder 542, four being illustrated in the embodiment of the tillage implement hydraulic system 500 shown in FIG. 13, as a non-limiting example, each of which is selectively supplied with hydraulic flow and pressure using a left wing front gauge wheel hydraulic cylinder three way solenoid valve with internal check valve 534. Left wing front gauge wheel hydraulic cylinder 542A may correspond to hydraulic cylinder 62 actuating the gauge wheel assembly 56 on the forward left corner of the main shank frame 28 shown in FIG. 1. Left wing front gauge wheel hydraulic cylinders 542B, 542C, and 542D may correspond to hydraulic cylinders 64 actuating the gauge wheel assemblies 70 on left inner wing front shank frame 66A, left middle wing front shank frame 66C, and left outer wing front shank frame 66E, respectively, shown in FIG. 1. Left wing front gauge wheel hydraulic cylinders 542A, 542B, 542C, and 542D are used to control the depth of the cultivator shanks 36 on the main shank frame 28, right inner wing front shank frame 66B, right middle wing front shank frame 66D, and right outer wing front shank frame 66F.

The first left wing front gauge wheel hydraulic cylinder three way solenoid valve with internal check valve 534A shown in FIG. 13 is configured to normally apply hydraulic flow and pressure received from the fourth solenoid operated normally closed two way poppet valve 530 to the left wing front gauge wheel hydraulic cylinder 542A, and upon energization to divert the hydraulic flow and pressure to a left wing front gauge wheel bypass circuit 554. Each of the subsequent left wing front gauge wheel hydraulic cylinder three way solenoid valves with internal check valves 534B, 534C, 534D is configured to normally apply hydraulic flow and pressure received from the previous left wing front gauge wheel hydraulic cylinders 542A, 542B, 542C, respectively, to its own left wing front gauge wheel hydraulic cylinder 542B, 542C, 542D, respectively. Upon energization, each of the subsequent left wing front gauge wheel hydraulic cylinder three way solenoid valves with internal check valves 534B, 534C, 534D is configured to apply hydraulic flow and pressure received from left wing front gauge wheel bypass circuit 554 to its own left wing front gauge wheel hydraulic cylinder 542B, 542C, 542D, respectively.

In this way, the actuation of the left wing front gauge wheel hydraulic cylinders 542A, 542B, 542C, and 542D may be coordinated by leaving the left wing front gauge wheel hydraulic cylinder three way solenoid valves 534A, 534B, 534C, and 534D de-energized so that displacement of each of left wing front gauge wheel hydraulic cylinders 542A, 542B, and 542C forces hydraulic fluid into each of subsequent left wing front gauge wheel hydraulic cylinders 542B, 542C, and 542D, respectively, resulting in coordinated motion. When it is desired to bypass adjustment of left wing front gauge wheel hydraulic cylinder 542A, left wing front gauge wheel hydraulic cylinder three way solenoid valves 534A and 534B are energized, thereby bypassing left wing front gauge wheel hydraulic cylinder 542A and actuating remaining left wing front gauge wheel hydraulic cylinders 542B, 542C, and 542D. Similarly, if it is desired to bypass adjustment of left wing front gauge wheel hydraulic cylinders 542A and 542B, left wing front gauge wheel hydraulic cylinder three way solenoid valves 534A and 534C are energized, thereby bypassing left wing front gauge wheel hydraulic cylinders 542A and 542B, and actuating remaining left wing front gauge wheel hydraulic cylinders 542C and 542D. If it is desired to bypass adjustment of left wing front gauge wheel hydraulic cylinders 542A, 542B, and 542C, left wing front gauge wheel hydraulic cylinder three way solenoid valves 534A and 534D are energized, thereby bypassing left wing front gauge wheel hydraulic cylinders 542A, 542B, and 542C, and actuating remaining left wing front gauge wheel hydraulic cylinder 542D.

Similarly, the right wing rear lift wheel hydraulic subsystem 506 has at least one right wing rear lift wheel hydraulic cylinder 544, four being illustrated in the embodiment of the tillage implement hydraulic system 500 shown in FIG. 13, as a non-limiting example, each of which is selectively supplied with hydraulic flow and pressure using a right wing rear lift wheel hydraulic cylinder three way solenoid valve 536. Right wing rear lift wheel hydraulic cylinder 544A may correspond to a right hand hydraulic cylinder 54 actuating the rear lift wheels 52 on an embodiment wherein there are at least two such hydraulic cylinders 54 actuating the rear lift wheels 52 independently. Right wing rear lift wheel hydraulic cylinders 544B, 544C, and 544D may correspond to hydraulic cylinders 60 actuating wing lift wheels 53 on right inner wing section 14B, right middle wing section 16B, and right outer wing section 18B, respectively, shown in FIG. 1. Right wing rear lift wheel hydraulic cylinders 544A, 544B, 544C, and 544D are used to control the depth of the cultivator shanks 36 attached to the rear auxiliary implements 30 and 78.

The first right wing rear lift wheel hydraulic cylinder three way solenoid valve 536A shown in FIG. 13 is configured to normally apply hydraulic flow and pressure received from the first solenoid operated normally closed two way poppet valve 524 to the right wing rear lift wheel hydraulic cylinder 544A, and upon energization to divert the hydraulic flow and pressure to a right wing rear lift wheel bypass circuit 560. Each of the subsequent right wing rear lift wheel hydraulic cylinder three way solenoid valves 536B, 536C, 536D is configured to normally apply hydraulic flow and pressure received from the previous right wing rear lift wheel hydraulic cylinders 544A, 544B, 544C, respectively, to its own right wing rear lift wheel hydraulic cylinders 544B, 544C, 544D, respectively. Upon energization, each of the subsequent right wing rear lift wheel hydraulic cylinder three way solenoid valves 536B, 536C, 536D is configured to apply hydraulic flow and pressure received from right wing rear lift wheel bypass circuit 560 via respective right wing rear lift wheel bypass valve 548A, 548B, 548C, respectively, to its own right wing rear lift wheel hydraulic cylinders 544B, 544C, 544D, respectively.

In this way, the actuation of the right wing rear lift wheel hydraulic cylinders 544A, 544B, 544C, and 544D may be coordinated by leaving the right wing rear lift wheel hydraulic cylinder three way solenoid valves 536A, 536B, 536C, and 536D de-energized so that displacement of each of right wing rear lift wheel hydraulic cylinders 544A, 544B, and 544C forces hydraulic fluid into each of subsequent right wing rear lift wheel hydraulic cylinders 544B, 544C, and 544D, respectively, resulting in coordinated motion. When it is desired to bypass adjustment of right wing rear lift wheel hydraulic cylinder 544A, right wing rear lift wheel hydraulic cylinder three way solenoid valves 536A and 536B are energized, along with right wing rear lift wheel bypass valve 548A, thereby bypassing right wing rear lift wheel hydraulic cylinder 544A and actuating remaining right wing rear lift wheel hydraulic cylinders 544B, 544C, and 544D. Similarly if it is desired to bypass adjustment of right wing rear lift wheel hydraulic cylinders 544A and 544B, right wing rear lift wheel hydraulic cylinder three way solenoid valves 536A and 536C are energized, along with right wing rear lift wheel bypass valve 548B, thereby bypassing right wing rear lift wheel hydraulic cylinders 544A and 544B and actuating remaining right wing rear lift wheel hydraulic cylinders 544C and 544D. Similarly if it is desired to bypass adjustment of right wing rear lift wheel hydraulic cylinders 544A, 544B, and 544C, right wing rear lift wheel hydraulic cylinder three way solenoid valves 536A and 536D are energized, along with right wing rear lift wheel bypass valve 548C, thereby bypassing right wing rear lift wheel hydraulic cylinders 544A, 544B, and 544C, and actuating remaining right wing rear lift wheel hydraulic cylinder 544D.

Similarly, the left wing rear lift wheel hydraulic subsystem 508 has at least one left wing rear lift wheel hydraulic cylinder 546, four being illustrated in the embodiment of the tillage implement hydraulic system 500 shown in FIG. 13, as a non-limiting example, each of which is selectively supplied with hydraulic flow and pressure using a left wing rear lift wheel hydraulic cylinder three way solenoid valve 538. Left wing rear lift wheel hydraulic cylinder 546A may correspond to a left hand hydraulic cylinder 54 actuating the rear lift wheels 52 on an embodiment wherein there are at least two such hydraulic cylinders 54 actuating the rear lift wheels 52 independently. Left wing rear lift wheel hydraulic cylinders 546B, 546C, and 546D may correspond to hydraulic cylinders 60 actuating wing lift wheels 53 on left inner wing section 14A, left middle wing section 16A, and left outer wing section 18A, respectively, shown in FIG. 1. Left wing rear lift wheel hydraulic cylinders 546A, 546B, 546C, and 546D are used to control the depth of the cultivator shanks 36 attached to the rear auxiliary implements 30 and 78.

The first left wing rear lift wheel hydraulic cylinder three way solenoid valve 538A shown in FIG. 13 is configured to normally apply hydraulic flow and pressure received from the second solenoid operated normally closed two way poppet valve 526 to the left wing rear lift wheel hydraulic cylinder 546A, and upon energization to divert the hydraulic flow and pressure to a left wing rear lift wheel bypass circuit 562. Each of the subsequent left wing rear lift wheel hydraulic cylinder three way solenoid valves 538B, 538C, 538D is configured to normally apply hydraulic flow and pressure received from the previous left wing rear lift wheel hydraulic cylinders 546A, 546B, 546C, respectively, to its own left wing rear lift wheel hydraulic cylinders 546B, 546C, 546D, respectively. Upon energization, each of the subsequent left wing rear lift wheel hydraulic cylinder three way solenoid valves 538B, 538C, 538D is configured to apply hydraulic flow and pressure received from left wing rear lift wheel bypass circuit 562 via respective left wing rear lift wheel bypass valve 550A, 550B, 550B, respectively, to its own left wing rear lift wheel hydraulic cylinders 546B, 546C, 546D, respectively.

In this way, the actuation of the left wing rear lift wheel hydraulic cylinders 546A, 546B, 546C, and 546D may be coordinated by leaving the left wing rear lift wheel hydraulic cylinder three way solenoid valves 538A, 538B, 538C, and 538D de-energized so that displacement of each of left wing rear lift wheel hydraulic cylinders 546A, 546B, and 546C forces hydraulic fluid into each of subsequent left wing rear lift wheel hydraulic cylinders 546B, 546C, and 546D, respectively, resulting in coordinated motion. When it is desired to bypass adjustment of left wing rear lift wheel hydraulic cylinder 546A, left wing rear lift wheel hydraulic cylinder three way solenoid valves 538A and 538B are energized, along with left wing rear lift wheel bypass valve 550A, thereby bypassing left wing rear lift wheel hydraulic cylinder 546A and actuating remaining left wing rear lift wheel hydraulic cylinders 546B, 546C, and 546D. Similarly, if it is desired to bypass adjustment of left wing rear lift wheel hydraulic cylinders 546A and 546B, left wing rear lift wheel hydraulic cylinder three way solenoid valves 538A and 538C are energized, along with left wing rear lift wheel bypass valves 550B, thereby bypassing left wing rear lift wheel hydraulic cylinders 546A and 546B and actuating remaining left wing rear lift wheel hydraulic cylinders 546C and 546D. Similarly, if it is desired to bypass adjustment of left wing rear lift wheel hydraulic cylinders 546A, 546B, and 546C, left wing rear lift wheel hydraulic cylinder three way solenoid valves 538A and 538D are energized, along with left wing rear lift wheel bypass valve 550C, thereby bypassing left wing rear lift wheel hydraulic cylinders 546A, 546B, and 546C, and actuating remaining left wing rear lift wheel hydraulic cylinder 546D.

Subsequent to right wing front gauge wheel hydraulic cylinder 540D, left wing front gauge wheel hydraulic cylinder 542D, right wing rear lift wheel hydraulic cylinder 544D, and left wing rear lift wheel hydraulic cylinder 546D, the hydraulic flow returns from tillage implement hydraulic system 500 via manifold 558.

Each of the first solenoid operated normally closed two way poppet bypass valve 514, the second solenoid operated normally closed two way poppet bypass valve 518, the third solenoid operated normally closed two way poppet bypass valve 522, the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530, the right wing front gauge wheel hydraulic cylinder three way solenoid valves 532A, 532B, 532C, and 532D, the left wing front gauge hydraulic cylinder three way solenoid valves 534A, 534B, 534C, and 534D, the right wing rear lift wheel hydraulic cylinder three way solenoid valves 536A, 536B, 536C, and 536D, the left wing rear lift wheel hydraulic cylinder three way solenoid valves 538A, 538B, 538C, and 538D, the right wing rear lift wheel bypass valves 548A, 548B, and 548C, and the left wing rear lift wheel bypass valves 550A, 550B, and 550C, may be connected to a controller 564.

The controller 564 may be operable to selectively coordinate the hydraulic cylinders of the right wing front gauge wheel hydraulic subsystem 502, the left wing front gauge wheel hydraulic subsystem 504, the right wing rear lift wheel hydraulic subsystem 506, and the left wing rear lift wheel hydraulic subsystem 508 using the first solenoid operated normally closed two way poppet bypass valve 514, the second solenoid operated normally closed two way poppet bypass valve 518, the third solenoid operated normally closed two way poppet bypass valve 522, the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530, to function as described previously.

The controller 564 may further be operable to selectively coordinate the right wing front gauge wheel hydraulic cylinders 540A, 540B, 540C, and 540D using the right wing front gauge wheel hydraulic cylinder three way solenoid valves 532A, 532B, 532C, and 532D, as described previously. The controller 564 may further be operable to selectively coordinate the left wing front gauge wheel hydraulic cylinders 542A, 542B, 542C, and 542D using the left wing front gauge hydraulic cylinder three way solenoid valves 534A, 534B, 534C, and 534D, as described previously. The controller 564 may further be operable to selectively coordinate the right wing rear lift wheel hydraulic cylinders 544A, 544B, 544C, and 544D using the right wing rear lift wheel hydraulic cylinder three way solenoid valves 536A, 536B, 536C, and 536D, and the right wing rear lift wheel bypass valves 548A, 548B, and 548C, as described previously. The controller 564 may further be operable to selectively coordinate the left wing rear lift wheel hydraulic cylinders 546A, 546B, 546C, and 546D using the left wing rear lift wheel hydraulic cylinder three way solenoid valves 538A, 538B, 538C, and 538D, and the left wing rear lift wheel bypass valves 550A, 550B, and 550C, as described previously.

Each of the right wing front gauge wheel hydraulic cylinders 540A, 540B, 540C, and 540D may be provided with a right wing front gauge wheel hydraulic cylinder displacement detecting device 566A, 566B, 566C, and 566D, respectively. The right wing front gauge wheel hydraulic cylinder displacement detecting devices 566A, 566B, 566C, and 566D may each be connected to the controller 564 (connection not shown for simplicity), and provide signals proportional to the displacement of the right wing front gauge wheel hydraulic cylinders 540A, 540B, 540C, 540D. Each of the left wing front gauge wheel hydraulic cylinders 542A, 542B, 542C, and 542D may be provided with a left wing front gauge wheel hydraulic cylinder displacement detecting device 568A, 568B, 568C, and 568D, respectively. The left wing front gauge wheel hydraulic cylinder displacement detecting devices 568A, 568B, 568C, and 568D may each be connected to the controller 564 (connection not shown for simplicity), and provide signals proportional to the displacement of the left wing front gauge wheel hydraulic cylinders 542A, 542B, 542C, and 542D.

Each of the right wing rear lift wheel hydraulic cylinders 544A, 544B, 544C, and 544D may be provided with a right wing rear lift wheel hydraulic cylinder displacement detecting device 570A, 570B, 570C, and 570D, respectively. The right wing rear lift wheel hydraulic cylinder displacement detecting devices 570A, 570B, 570C, and 570D may each be connected to the controller 564 (connection not shown for simplicity), and provide signals proportional to the displacement of the right wing rear lift wheel hydraulic cylinders 544A, 544B, 544C, and 544D. Each of the left wing rear lift wheel hydraulic cylinders 546A, 546B, 456C, and 456D may be provided with a left wing rear lift wheel hydraulic cylinder displacement detecting device 572A, 572B, 572C, and 572D, respectively. The left wing rear lift wheel hydraulic cylinder displacement detecting device 572A, 572B, 572C, and 572D may each be connected to the controller 564 (connection not shown for simplicity), and provide signals proportional to the displacement of the left wing rear lift wheel hydraulic cylinders 546A, 546B, 546C, and 546D.

A rheostat type of sensor is shown in FIG. 13, although any kind of sensor producing an output proportional to sensed displacement and/or rate of change of displacement may be used. The controller 564 may again calibrate the right wing front gauge wheel hydraulic cylinders 540A, 540B, 540C, and 540D, the left wing front gauge wheel hydraulic cylinders 542A, 542B, 542C, and 542D, the right wing rear lift wheel hydraulic cylinders 544A, 544B, 544C, and 544D, and the left wing rear lift wheel hydraulic cylinders 546A, 546B, 546C, and 546D by first extending each to its maximum length, similar to the controllers 360 and 460 in FIGS. 11 and 12. Individual readings are then taken from the hydraulic cylinder displacement detecting devices 566A, 566B, 566C, 566D, 568A, 568B, 568C, 568D, 570A, 570B, 570C, 570D, 572A, 572B, 572C, and 572D. The agricultural tillage implement 10 is then lowered so that the tools, in this embodiment the cultivator shanks 36, just touch the level surface. Once this condition is achieved, individual readings are again taken from the hydraulic cylinder displacement detecting devices 566A, 566B, 566C, 566D, 568A, 568B, 568C, 568D, 570A, 570B, 570C, 570D, 572A, 572B, 572C, and 572D. These displacement signals may then be stored in the controller 564, and provide the synchronized set point for the displacement detecting devices 566A, 566B, 566C, 566D, 568A, 568B, 568C, 568D, 570A, 570B, 570C, 570D, 572A, 572B, 572C, and 572D.

As with the controllers 360 and 460, the controller 564 may periodically during the operation of the agricultural tillage implement 10, take the readings of the hydraulic cylinder displacement detecting devices 566A, 566B, 566C, 566D, 568A, 568B, 568C, 568D, 570A, 570B, 570C, 570D, 572A, 572B, 572C, and 572D and, if they deviate from the set point initially established, the controller 564 corrects the appropriate hydraulic cylinder 540A, 540B, 540C, 540D, 542A, 542B, 542C, 542D, 544A, 544B, 544C, 544D, 546A, 546B, 546C, or 546D to achieve the intended set point. This may be done independently of other hydraulic cylinders using the methods described previously. The agricultural tillage implement 10 is then able to provide accurate depth of penetration of the tools, in this embodiment the cultivator shanks 36.

Figure 14:
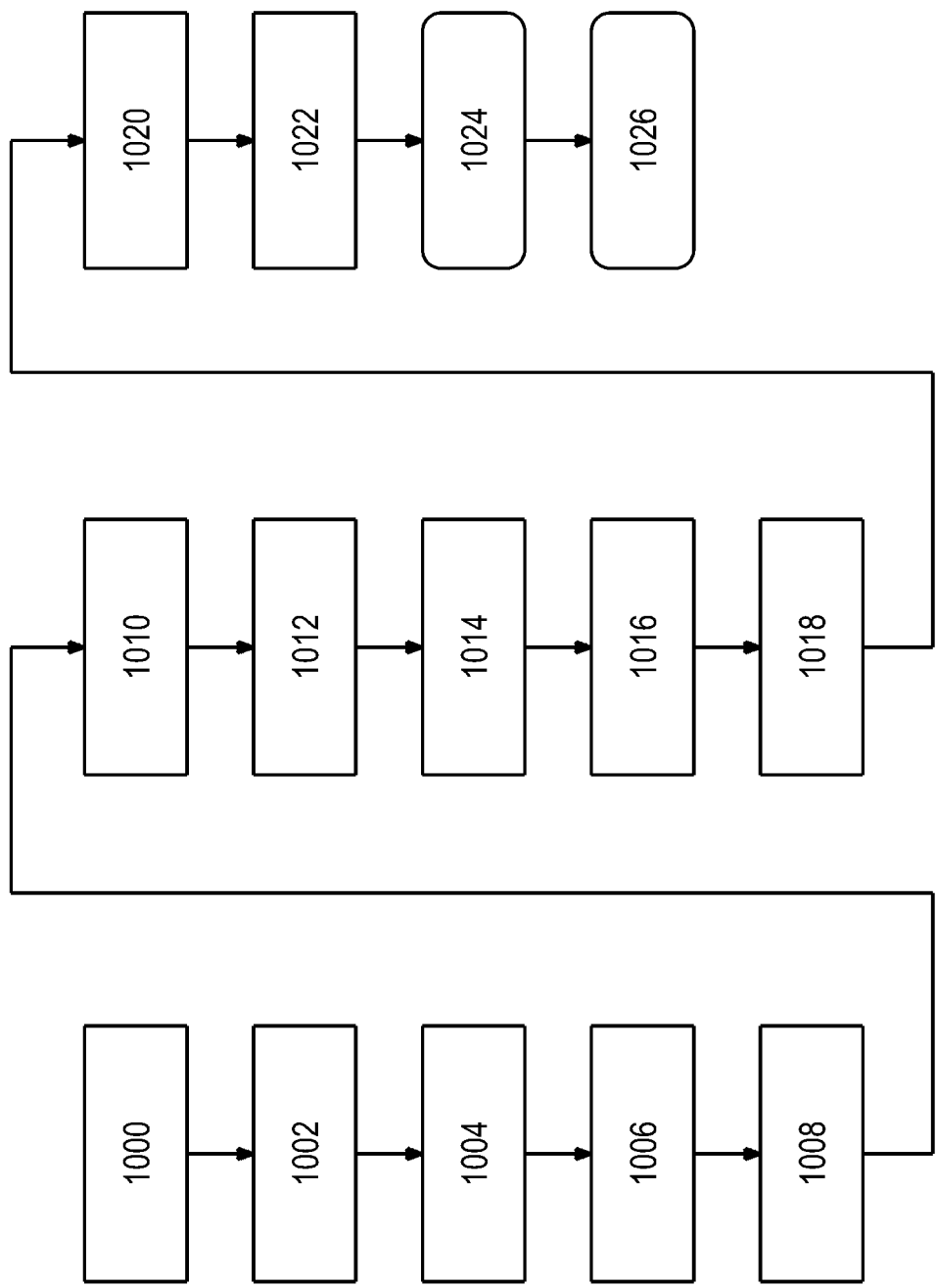
FIG. 14 is a flow chart showing a series of steps taken in the functioning of an embodiment of the present invention.

Turning now to FIG. 14, a system or method according to an embodiment of the present invention includes a series of steps of activating certain valves, pressurizing or depressurizing certain hydraulic circuits, and/or actuating certain hydraulic cylinders of tillage implement hydraulic systems 700, 800, 600 or 900, and 300, 400, or 500, in order to bleed air from these hydraulic systems under the control of controllers 946, 654, 828, 360, 460, and/or 564 is shown. Controllers 946, 654, 828, 360, 460, and/or 564 may be part of a single implement controller, or may be separate individual controllers operating cooperatively. Software within these controllers, or within the single implement controller, may prompt an operator to select by way of an in-cab screen a series of individual steps by which the process of bleeding air from the hydraulic systems proceeds from step to step. That is to say, the implement controller or controllers may indicate which valves should be activated or deactivated, which hydraulic circuits should be pressurized or depressurized, and/or which hydraulic cylinders should be actuated in which direction, in the proper sequence in order to successfully and efficiently bleed the air from the hydraulic systems. Alternatively, the implement controller or controllers may perform the steps in sequence upon the operator selecting a single "purge" function. Still alternately, the implement controller or controllers may prompt the operator to authorize a group of steps to be taken, according to the section of the implement hydraulic system to be involved. This allows the operator to avoid activating or deactivating the wrong valves, pressurizing or depressurizing the wrong hydraulic circuits, or actuating the wrong hydraulic cylinders at the wrong time during the process of bleeding air from the hydraulic systems, and ensures a consistent bleed sequence every time the process is performed.

As a non-limiting example, the computer controlled hydraulic bleed sequence may involve the following steps:

In a first step 1000, raise the agricultural tillage implement 10 by extending each of the rear lift wheels 52, the gauge wheel assemblies 56, the toolbar lift wheels 53, and the gauge wheel assemblies 70, using the hydraulic cylinders 54, the hydraulic cylinders 62, the hydraulic cylinders 60, and the hydraulic cylinders 64, respectfully, until they expose their re-phasing ports. The re-phasing ports are ports in the cylinder that are exposed beyond a certain stroke, and operate to release hydraulic pressure in the cylinders beyond that point.

For the tillage implement hydraulic system 300 shown in FIG. 11, this may be done by activating the first solenoid operated normally closed directional control check valve with manual override 310.

For the tillage implement hydraulic system 400 shown in FIG. 12, this may be done by activating the first solenoid operated normally closed directional control check valve with manual override 410.

For the tillage implement hydraulic system 500 shown in FIG. 13, this may be done by activating the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530.

In a second step 1002, lower the agricultural tillage implement 10 by retracting each of the rear lift wheels 52, the gauge wheel assemblies 56, the toolbar lift wheels 53, and the gauge wheel assemblies 70, using the hydraulic cylinders 54, the hydraulic cylinders 62, the hydraulic cylinders 60, and the hydraulic cylinders 64, respectfully.

For the tillage implement hydraulic system 300 shown in FIG. 11, this may be done by activating the second solenoid operated normally closed directional control check valve with manual override 356.

For the tillage implement hydraulic system 400 shown in FIG. 12, this may be done by activating the second solenoid operated normally closed directional control check valve with manual override 456.

For the tillage implement hydraulic system 500 shown in FIG. 13, this may be done by reversing the hydraulic flow to the system and activating the first solenoid operated normally closed two way poppet valve 524, the second solenoid operated normally closed two way poppet valve 526, the third solenoid operated normally closed two way poppet valve 528, and the fourth solenoid operated normally closed two way poppet valve 530.

In a third step 1004, begin purging the front gauge wheel bypass circuits of air.

For the tillage implement hydraulic system 300 shown in FIG. 11, this may be done by activating first solenoid operated normally closed directional control check valve with manual override 310, first right wing front gauge wheel hydraulic cylinder three way solenoid valve 332A and first right wing front gauge wheel bypass valve 348A, first left wing front gauge wheel hydraulic cylinder three way solenoid valve 334A and first left wing front gauge wheel bypass valve 350A, and first solenoid operated normally closed two way poppet bypass valve 314.

For the tillage implement hydraulic system 400 shown in FIG. 12, this may be done by activating first solenoid operated normally closed directional control check valve with manual override 410, first right wing front gauge wheel hydraulic cylinder three way solenoid valve with internal check valve 432A, first left wing front gauge wheel hydraulic cylinder three way solenoid valve with internal check valve 434A, and first solenoid operated normally closed two way poppet bypass valve 414.

For the tillage implement hydraulic system 500 shown in FIG. 13, this may be done by activating first solenoid operated normally closed two way poppet bypass valve 514, third solenoid operated normally closed two way poppet valve 528 and first right wing front gauge wheel hydraulic cylinder three way solenoid valve with internal check valve 532A, and fourth solenoid operated normally closed two way poppet valve 530 and first left wing front gauge wheel hydraulic cylinder three way solenoid valve with internal check valve 534A.

In a fourth step 1006, begin purging the wing rear lift wheel bypass circuits between the hydraulic cylinders 54 of the rear lift wheels 52 and the hydraulic cylinders 60 of the inner set of toolbar lift wheels 53 of air while continuing to purge the front gauge wheel bypass circuits of air. In doing so, it is only necessary to extend these cylinders by two or three inches.

For the tillage implement hydraulic system 300 shown in FIG. 11, this may be done by activating or keeping active first solenoid operated normally closed directional control check valve with manual override 310, first right wing front gauge wheel hydraulic cylinder three way solenoid valve 332A and first right wing front gauge wheel bypass valve 348A, first left wing front gauge wheel hydraulic cylinder three way solenoid valve 334A and first left wing front gauge wheel bypass valve 350A, first solenoid operated normally closed two way poppet bypass valve 314, first right wing rear lift wheel hydraulic cylinder three way solenoid valve 336A and first right wing rear lift wheel bypass valve 352A, second right wing rear lift wheel hydraulic cylinder three way solenoid valve 336B and second right wing rear lift wheel bypass valve 352B, first left wing rear lift wheel hydraulic cylinder three way solenoid valve 338A and first left wing rear lift wheel bypass valve 354A, and second left wing rear lift wheel hydraulic cylinder three way solenoid valve 338B and second left wing rear lift wheel bypass valve 354B

For the tillage implement hydraulic system 400 shown in FIG. 12, this may be done by activating or keeping active first solenoid operated normally closed directional control check valve with manual override 410, first right wing front gauge wheel hydraulic cylinder three way solenoid valve with internal check valve 432A, first left wing front gauge wheel hydraulic cylinder three way solenoid valve with internal check valve 434A, first solenoid operated normally closed two way poppet bypass valve 414, first right wing rear lift wheel hydraulic cylinder three way solenoid valve 436A and first right wing rear lift wheel bypass valve 448A, second right wing rear lift wheel hydraulic cylinder three way solenoid valve 436B and second right wing rear lift wheel bypass valve 448B, first left wing rear lift wheel hydraulic cylinder three way solenoid valve 438A and first left wing rear lift wheel bypass valve 450A, and second left wing rear lift wheel hydraulic cylinder three way solenoid valve 438B and second left wing rear lift wheel bypass valve 450B.

For the tillage implement hydraulic system 500 shown in FIG. 13, this may be done by activating or keeping active third solenoid operated normally closed two way poppet valve 528 and first right wing front gauge wheel hydraulic cylinder three way solenoid valve with internal check valve 532A, fourth solenoid operated normally closed two way poppet valve 530 and first left wing front gauge wheel hydraulic cylinder three way solenoid valve with internal check valve 534A, first solenoid operated normally closed two way poppet bypass valve 514, first solenoid operated normally closed two way poppet valve 524 and first right wing rear lift wheel hydraulic cylinder three way solenoid valve 536A, second right wing rear lift wheel hydraulic cylinder three way solenoid valve 536B and first right wing rear lift wheel bypass valve 548A, second solenoid operated normally closed two way poppet valve 526 and first left wing rear lift wheel hydraulic cylinder three way solenoid valve 538A, and second left wing rear lift wheel hydraulic cylinder three way solenoid valve 538B and first left wing rear lift wheel bypass valve 550A

In a fifth step 1008, purge the wing rear lift wheel bypass circuits between the hydraulic cylinders 54 of the rear lift wheels 52 and the hydraulic cylinders 60 of the middle set of toolbar lift wheels 53 of air while continuing to purge the front gauge wheel bypass circuits of air. Again, in doing so, it is only necessary to extend these cylinders by two or three inches.

For the tillage implement hydraulic system 300 shown in FIG. 11, this may be done by activating or keeping active first solenoid operated normally closed directional control check valve with manual override 310, first right wing front gauge wheel hydraulic cylinder three way solenoid valve 332A and first right wing front gauge wheel bypass valve 348A, first left wing front gauge wheel hydraulic cylinder three way solenoid valve 334A and first left wing front gauge wheel bypass valve 350A, first solenoid operated normally closed two way poppet bypass valve 314, first right wing rear lift wheel hydraulic cylinder three way solenoid valve 336A and first right wing rear lift wheel bypass valve 352A, third right wing rear lift wheel hydraulic cylinder three way solenoid valve 336C and third right wing rear lift wheel bypass valve 352C, first left wing rear lift wheel hydraulic cylinder three way solenoid valve 338A and first left wing rear lift wheel bypass valve 354A, and third left wing rear lift wheel hydraulic cylinder three way solenoid valve 338C and third left wing rear lift wheel bypass valve 354C.

For the tillage implement hydraulic system 400 shown in FIG. 12, this may be done by activating or keeping active first solenoid operated normally closed directional control check valve with manual override 410, first right wing front gauge wheel hydraulic cylinder three way solenoid valve with internal check valve 432A, first left wing front gauge wheel hydraulic cylinder three way solenoid valve with internal check valve 434A, first solenoid operated normally closed two way poppet bypass valve 414, first right wing rear lift wheel hydraulic cylinder three way solenoid valve 436A and first right wing rear lift wheel bypass valve 448A, third right wing rear lift wheel hydraulic cylinder three way solenoid valve 436C and third right wing rear lift wheel bypass valve 448C, first left wing rear lift wheel hydraulic cylinder three way solenoid valve 438A and first left wing rear lift wheel bypass valve 450A, and third left wing rear lift wheel hydraulic cylinder three way solenoid valve 438C and third left wing rear lift wheel bypass valve 450C For the tillage implement hydraulic system 500 shown in FIG. 13, this may be done by activating or keeping active third solenoid operated normally closed two way poppet valve 528 and first right wing front gauge wheel hydraulic cylinder three way solenoid valve with internal check valve 532A, fourth solenoid operated normally closed two way poppet valve 530 and first left wing front gauge wheel hydraulic cylinder three way solenoid valve with internal check valve 534A, first solenoid operated normally closed two way poppet bypass valve 514, first solenoid operated normally closed two way poppet valve 524 and first right wing rear lift wheel hydraulic cylinder three way solenoid valve 536A, third right wing rear lift wheel hydraulic cylinder three way solenoid valve 536C and second right wing rear lift wheel bypass valve 548B, second solenoid operated normally closed two way poppet valve 526 and first left wing rear lift wheel hydraulic cylinder three way solenoid valve 538A, and third left wing rear lift wheel hydraulic cylinder three way solenoid valve 538C and second left wing rear lift wheel bypass valve 550B.

In a sixth step 1010, purge the wing rear lift wheel bypass circuits between the hydraulic cylinders 54 of the rear lift wheels 52 and the hydraulic cylinders 60 of the outer set of toolbar lift wheels 53 of air while continuing to purge the front gauge wheel bypass circuits of air. Again, in doing so, it is only necessary to extend these cylinders by two or three inches.

For the tillage implement hydraulic system 300 shown in FIG. 11, this may be done by activating or keeping active first solenoid operated normally closed directional control check valve with manual override 310, first right wing front gauge wheel hydraulic cylinder three way solenoid valve 332A and first right wing front gauge wheel bypass valve 348A, first left wing front gauge wheel hydraulic cylinder three way solenoid valve 334A and first left wing front gauge wheel bypass valve 350A, first solenoid operated normally closed two way poppet bypass valve 314, first right wing rear lift wheel hydraulic cylinder three way solenoid valve 336A and first right wing rear lift wheel bypass valve 352A, fourth right wing rear lift wheel hydraulic cylinder three way solenoid valve 336D and fourth right wing rear lift wheel bypass valve 352D, first left wing rear lift wheel hydraulic cylinder three way solenoid valve 338A and first left wing rear lift wheel bypass valve 354A, and fourth left wing rear lift wheel hydraulic cylinder three way solenoid valve 338D and fourth left wing rear lift wheel bypass valve 354D For the tillage implement hydraulic system 400 shown in FIG. 12, this may be done by activating or keeping active first solenoid operated normally closed directional control check valve with manual override 410, first right wing front gauge wheel hydraulic cylinder three way solenoid valve with internal check valve 432A, first left wing front gauge wheel hydraulic cylinder three way solenoid valve with internal check valve 434A, first solenoid operated normally closed two way poppet bypass valve 414, first right wing rear lift wheel hydraulic cylinder three way solenoid valve 436A and first right wing rear lift wheel bypass valve 448A, fourth right wing rear lift wheel hydraulic cylinder three way solenoid valve 436D and fourth right wing rear lift wheel bypass valve 448D, first left wing rear lift wheel hydraulic cylinder three way solenoid valve 438A and first left wing rear lift wheel bypass valve 450A, and fourth left wing rear lift wheel hydraulic cylinder three way solenoid valve 438D and fourth left wing rear lift wheel bypass valve 450D For the tillage implement hydraulic system 500 shown in FIG. 13, this may be done by activating or keeping active third solenoid operated normally closed two way poppet valve 528 and first right wing front gauge wheel hydraulic cylinder three way solenoid valve with internal check valve 532A, fourth solenoid operated normally closed two way poppet valve 530 and first left wing front gauge wheel hydraulic cylinder three way solenoid valve with internal check valve 534A, first solenoid operated normally closed two way poppet bypass valve 514, first solenoid operated normally closed two way poppet valve 524 and first right wing rear lift wheel hydraulic cylinder three way solenoid valve 536A, fourth right wing rear lift wheel hydraulic cylinder three way solenoid valve 536D and third right wing rear lift wheel bypass valve 548C, second solenoid operated normally closed two way poppet valve 526 and first left wing rear lift wheel hydraulic cylinder three way solenoid valve 538A, and fourth left wing rear lift wheel hydraulic cylinder three way solenoid valve 538D and third left wing rear lift wheel bypass valve 550C In a seventh step 1012, finish purging the front gauge wheel bypass circuits of air. In doing so, it is only necessary to extend the hydraulic cylinders 62 of the gauge wheel assemblies 56 and the hydraulic cylinders 64 of the gauge wheel assemblies 70 by two or three inches.

For the tillage implement hydraulic system 300 shown in FIG. 11, this may be done by activating or keeping active first solenoid operated normally closed directional control check valve with manual override 310, first right wing rear lift wheel hydraulic cylinder three way solenoid valve 336A and first right wing rear lift wheel bypass valve 352A, first left wing rear lift wheel hydraulic cylinder three way solenoid valve 338A and first left wing rear lift wheel bypass valve 354A, first solenoid operated normally closed two way poppet bypass valve 314, first right wing front gauge wheel hydraulic cylinder three way solenoid valve 332A and first right wing front gauge wheel bypass valve 348A, fourth right wing front gauge wheel hydraulic cylinder three way solenoid valve 332D and fourth right wing front gauge wheel bypass valve 348D, first left wing front gauge wheel hydraulic cylinder three way solenoid valve 334A and first left wing front gauge wheel bypass valve 350A, and fourth left wing front gauge wheel hydraulic cylinder three way solenoid valve 334D and fourth left wing front gauge wheel bypass valve 350D.

For the tillage implement hydraulic system 400 shown in FIG. 12, this may be done by activating or keeping active first solenoid operated normally closed directional control check valve with manual override 410, first left wing rear lift wheel hydraulic cylinder three way solenoid valve 438A and first left wing rear lift wheel bypass valve 450A, first right wing rear lift wheel hydraulic cylinder three way solenoid valve 436A and first right wing rear lift wheel bypass valve 448A, first solenoid operated normally closed two way poppet bypass valve 414, first right wing front gauge wheel hydraulic cylinder three way solenoid valve with internal check valve 432A, fourth right wing front gauge wheel hydraulic cylinder three way solenoid valve with internal check valve 432D, first left wing front gauge wheel hydraulic cylinder three way solenoid valve with internal check valve 434A, and fourth left wing front gauge wheel hydraulic cylinder three way solenoid valve with internal check valve 434D.

For the tillage implement hydraulic system 500 shown in FIG. 13, this may be done by activating or keeping active first solenoid operated normally closed two way poppet valve 524 and first right wing rear lift wheel hydraulic cylinder three way solenoid valve 536A, second solenoid operated normally closed two way poppet valve 526 and first left wing rear lift wheel hydraulic cylinder three way solenoid valve 538A, first solenoid operated normally closed two way poppet bypass valve 514, third solenoid operated normally closed two way poppet valve 528 and first right wing front gauge wheel hydraulic cylinder three way solenoid valve with internal check valve 532A, fourth right wing front gauge wheel hydraulic cylinder three way solenoid valve with internal check valve 532D, fourth solenoid operated normally closed two way poppet valve 530 and first left wing front gauge wheel hydraulic cylinder three way solenoid valve with internal check valve 534A, and fourth left wing front gauge wheel hydraulic cylinder three way solenoid valve with internal check valve 534D.

In an eighth step 1014, again raise the agricultural tillage implement 10 by extending each of the rear lift wheels 52, the gauge wheel assemblies 56, the toolbar lift wheels 53, and the gauge wheel assemblies 70, using the hydraulic cylinders 54, the hydraulic cylinders 62, the hydraulic cylinders 60, and the hydraulic cylinders 64, respectfully, until they expose their re-phasing ports. The same valves as used in the first step 1000 are used in the eighth step 1014.

The first through eighth steps 1000 through 1014 above may be performed by the implement controller or controllers in response to a single operator input or response, such as "Purge Raise/Lower System," or similar selection or prompt.

In a ninth step 1016, fold the main shank frame 28 over the tool bar 24 using the hydraulic cylinder 58 represented in FIGS. 7 and 8 as main shank frame hydraulic cylinders 928 and 628, respectively. For the tillage implement hydraulic system 900 shown in FIG. 7, this may be done by activating second main shank frame solenoid operated normally closed two position one way valve 912.

In a tenth step 1018, raise the wing front shank frames 66A through 66F using hydraulic cylinders 68 and the wing section rear auxiliary implements 78 using hydraulic cylinders 90. For the tillage implement hydraulic system 900 shown in FIG. 7, this may be done by activating first solenoid operated normally closed two way poppet valve 920 and second solenoid operated normally closed two way poppet valve 922.

For the tillage implement hydraulic system 600 shown in FIG. 8, ninth step 1016 and tenth step 1018 may be accomplished by simply pressurizing the hydraulic line entering the manifold 652 at first check valve 610.

In an eleventh step 1020, lower the wing front shank frames 66A through 66F using hydraulic cylinders 68 and the wing section rear auxiliary implements 78 using hydraulic cylinders 90. For the tillage implement hydraulic system 900 shown in FIG. 7, this may be done by activating first solenoid operated normally closed two way poppet valve 920 and second solenoid operated normally closed two way poppet valve 922

In a twelfth step 1022, unfold the main shank frame 28 from over the tool bar 24 using the hydraulic cylinder 58. For the tillage implement hydraulic system 900 shown in FIG. 7, this may be done by activating first main shank frame solenoid operated normally closed two position one way valve 910.

For the tillage implement hydraulic system 600 shown in FIG. 8, eleventh step 1020 and twelfth step 1022 may be accomplished by simply pressurizing the hydraulic line entering the manifold 652 at fourth check valve 650.

The ninth through twelfth steps 1016 through 1022 above may be performed by the implement controller or controllers in response to a single operator input or response, such as "Purge Shank Fold System," or similar selection or prompt.

In an optional thirteenth step 1024, cycle the hitch lock cylinder 706 shown in FIG. 9 back and forth by alternately pressurizing the hydraulic lines entering into first pilot to open check valve 702 and second pilot to open check valve 704.

In an optional fourteenth step 1026, activate first solenoid operated normally closed two way poppet valve 802 and second solenoid operated normally closed two way poppet valve 804. Alternately pressurize the hydraulic lines entering into first solenoid operated normally closed two way poppet valve 802 and second solenoid operated normally closed two way poppet valve 804 until the pull hitch hydraulic cylinder 806, the right pivoting swing arm hydraulic cylinder 812 and left pivoting swing arm hydraulic cylinder 814, and the right main fold hydraulic cylinder 820 and left main fold hydraulic cylinder 822 fully cycle in sequence.

The thirteenth and fourteenth steps 1024 and 1026 above may be performed by the implement controller or controllers in response to a single operator input or response, such as "Purge Wing Fold System," or similar selection or prompt.

The invention described above has been described as being used on an agricultural tillage implement. However, it is contemplated that the principles of the Computer Controlled Hydraulic Bleed Sequence may be used on any of a number of agricultural implements or machines, which are considered to be within the scope of the present invention. Therefore, while this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural machine or implement, comprising:
   a main frame section;
   at least one wing section;
   at least one first hydraulic subsystem including at least one main frame lift hydraulic cylinder for raising and lowering said main frame section, at least one wing section lift hydraulic cylinder for raising and lowering said at least one wing section, and at least one first bypass circuit bypassing at least one of said at least one main frame lift hydraulic cylinder and said at least one wing section lift hydraulic cylinder;
   at least one controller operably connected to at least one valve controlling hydraulic flow to at least one of said at least one main frame lift hydraulic cylinder, said at least one wing section lift hydraulic cylinder, and said at least one first bypass circuit, said at least one controller configured to bleed air from said at least one first hydraulic subsystem using the steps of:
      first, extending said at least one main frame lift hydraulic cylinder and said at least one wing section lift hydraulic cylinder;
      second, retracting said at least one main frame lift hydraulic cylinder and said at least one wing section lift hydraulic cylinder;
      third, bypassing at least one of said at least one main frame lift hydraulic cylinder and said at least one wing section lift hydraulic cylinder while extending at least one of said at least one main frame lift hydraulic cylinder and said at least one wing section lift hydraulic cylinder; and
      fourth, extending said at least one main frame lift hydraulic cylinder and said at least one wing section lift hydraulic cylinder.

2. The agricultural machine or implement of claim 1, wherein:
   said at least one main frame lift hydraulic cylinder and said at least one wing section lift hydraulic cylinder each being provided with at least one re-phasing port;
   said first step further including extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure; and
   said fourth step further including extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure.

3. The agricultural machine or implement of claim 2, further comprising:
   at least one main structure pivotally connected to said main frame section;
   at least one wing structure pivotally connected to said at least one wing section;
   at least one second hydraulic subsystem including at least one main structure gauge lift hydraulic cylinder for at least partially raising and lowering said at least one main structure, at least one wing structure gauge lift hydraulic cylinder for at least partially raising and lowering said at least one wing structure, and at least one second bypass circuit bypassing at least one of said at least one main structure gauge lift hydraulic cylinder and said at least one wing structure gauge lift hydraulic cylinder, each of said at least one main structure gauge lift hydraulic cylinder and said at least one wing structure gauge lift hydraulic cylinder being provided with at least one re-phasing port;
   said at least one controller being operably connected to at least one valve controlling hydraulic flow to at least one of said at least one main structure gauge lift hydraulic cylinder, said at least one wing structure gauge lift hydraulic cylinder, and said at least one second bypass circuit, said at least one controller configured to bleed air from said at least one second hydraulic subsystem using the steps of:
      first, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure;
      second, retracting said at least one main structure gauge lift hydraulic cylinder and said at least one wing structure gauge lift hydraulic cylinder;
      third, bypassing at least one of said at least one main structure gauge lift hydraulic cylinder and said at least one wing structure gauge lift hydraulic cylinder while extending at least one of said at least one main structure gauge lift hydraulic cylinder and said at least one wing structure gauge lift hydraulic cylinder; and
      fourth, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure.

4. The agricultural machine or implement of claim 3, wherein:
   said at least one wing section lift hydraulic cylinder further comprises at least two wing section lift hydraulic cylinders; and
   said third step of bleeding air from said first hydraulic subsystem further includes first bypassing said at least one main frame lift hydraulic cylinder, then bypassing said at least one main frame lift hydraulic cylinder and sequentially bypassing additional wing section lift hydraulic cylinders until each wing section lift hydraulic cylinder except one has been bypassed while extending the remainder of said at least one wing section lift hydraulic cylinders.

5. The agricultural machine or implement of claim 4, wherein:
   said at least one wing structure gauge lift hydraulic cylinder further comprises at least two wing structure gauge lift hydraulic cylinders; and
   said third step of bleeding air from said second hydraulic subsystem further includes first bypassing said at least one main structure gauge lift hydraulic cylinder, then bypassing said at least one main structure gauge lift hydraulic cylinder and sequentially bypassing additional wing structure gauge lift hydraulic cylinders until each wing structure gauge lift hydraulic cylinder except one has been bypassed while extending the remainder of said at least one wing structure gauge lift hydraulic cylinders.

6. The agricultural machine or implement of claim 5, further comprising:
at least one third hydraulic subsystem including at least one main structure fold hydraulic cylinder for folding said at least one main structure over said main frame section, and at least one wing structure fold hydraulic cylinder for folding said at least one wing structure against said at least one wing section;
said at least one controller being operably connected to at least one valve controlling hydraulic flow to at least one of said at least one main structure fold hydraulic cylinder and said at least one wing structure fold hydraulic cylinder, said at least one controller configured to bleed air from said at least one third hydraulic subsystem using the steps of:
first, folding said at least one main structure over said main frame section using said at least one main structure fold hydraulic cylinder;
second, folding said at least one wing structure against said at least one wing section using said at least one wing structure fold hydraulic cylinder;
third, unfolding said at least one wing structure from against said at least one wing section using said at least one wing structure fold hydraulic cylinder; and
fourth, unfolding said at least one main structure from over said main frame section using said at least one main structure fold hydraulic cylinder.

7. The agricultural machine or implement of claim 6, further comprising:
at least one of a hitch lock, a pull hitch capable of being raised and lowered, a diagonally angled draft tube and pivoting swing arm assembly, and at least one wing section pivotally connected to said main frame section;
at least one fourth hydraulic subsystem including at least one of a hitch lock cylinder connected to said hitch lock, a pull hitch hydraulic cylinder connected to said pull hitch capable of being raised and lowered, at least one pivoting swing arm hydraulic cylinder connected to said diagonally angled draft tube and pivoting swing arm assembly, and at least one main fold hydraulic cylinder connected to said at least one wing section pivotally connected to said main frame section;
said at least one controller being operably connected to at least one valve controlling hydraulic flow to at least one of said hitch lock cylinder, said pull hitch hydraulic cylinder, said at least one pivoting swing arm hydraulic cylinder, and said at least one main fold hydraulic cylinder, said at least one controller configured to bleed air from said at least one fourth hydraulic subsystem using the steps of:
first, releasing said hitch lock using said hitch lock cylinder;
second, raising said pull hitch using said pull hitch hydraulic cylinder;
third, pivoting inwards said diagonally angled draft tube and pivoting swing arm assembly using said at least one pivoting swing arm hydraulic cylinder;
fourth, folding inwards said at least one pivotally connected wing section against said main frame section using said at least one main fold hydraulic cylinder;
fifth, unfolding outwards said at least one pivotally connected wing section from against said main frame section using said at least one main fold hydraulic cylinder;
sixth, pivoting outwards said diagonally angled draft tube and pivoting swing arm assembly using said at least one pivoting swing arm hydraulic cylinder;
seventh, lowering said pull hitch using said pull hitch hydraulic cylinder; and
eighth, latching said hitch lock using said hitch lock cylinder.

8. The agricultural machine or implement of claim 6, wherein:
said at least one controller being further configured to receive operator input authorizing one of:
each of said first, second, third, and fourth steps of bleeding air from said at least one first hydraulic subsystem, each of said first, second, third, and fourth steps of bleeding air from said at least one second hydraulic subsystem, and each of said first, second, third, and fourth steps of bleeding air from said at least one third hydraulic subsystem, individually;
each of bleeding air from said at least one first hydraulic subsystem, bleeding air from said at least one second hydraulic subsystem, and bleeding air from said at least one third hydraulic subsystem, separately; and
bleeding air from said at least one first hydraulic subsystem, said at least one second hydraulic subsystem, and said at least one third hydraulic subsystem, automatically.

9. A hydraulic system of an agricultural machine or implement having a main frame section, at least one wing section, at least one main structure pivotally connected to the main frame section, and at least one wing structure pivotally connected to the at least one wing section, comprising:
at least one first hydraulic subsystem including at least one main frame lift hydraulic cylinder for raising and lowering the main frame section, at least one wing section lift hydraulic cylinder for raising and lowering the at least one wing section, and at least one first bypass circuit bypassing at least one of said at least one main frame lift hydraulic cylinder and said at least one wing section lift hydraulic cylinder;
at least one controller operably connected to at least one valve controlling hydraulic flow to at least one of said at least one main frame lift hydraulic cylinder, said at least one wing section lift hydraulic cylinder, and said at least one first bypass circuit, said at least one controller configured to bleed air from said at least one first hydraulic subsystem using the steps of:
first, extending said at least one main frame lift hydraulic cylinder and said at least one wing section lift hydraulic cylinder;
second, retracting said at least one main frame lift hydraulic cylinder and said at least one wing section lift hydraulic cylinder;
third, bypassing at least one of said at least one main frame lift hydraulic cylinder and said at least one wing section lift hydraulic cylinder while extending at least one of said at least one main frame lift hydraulic cylinder and said at least one wing section lift hydraulic cylinder; and
fourth, extending said at least one main frame lift hydraulic cylinder and said at least one wing section lift hydraulic cylinder.

10. The hydraulic system of claim 9, wherein:
said at least one main frame lift hydraulic cylinder and said at least one wing section lift hydraulic cylinder each being provided with at least one re-phasing port;

said first step further including extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure; and said fourth step further including extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure.

11. The hydraulic system of claim 10, further comprising:

at least one second hydraulic subsystem including at least one main structure gauge lift hydraulic cylinder for at least partially raising and lowering the at least one main structure, at least one wing structure gauge lift hydraulic cylinder for at least partially raising and lowering the at least one wing structure, and at least one second bypass circuit bypassing at least one of said at least one main structure gauge lift hydraulic cylinder and said at least one wing structure gauge lift hydraulic cylinder, each of said at least one main structure gauge lift hydraulic cylinder and said at least one wing structure gauge lift hydraulic cylinder being provided with at least one re-phasing port;

said at least one controller being operably connected to at least one valve controlling hydraulic flow to at least one of said at least one main structure gauge lift hydraulic cylinder, said at least one wing structure gauge lift hydraulic cylinder, and said at least one second bypass circuit, said at least one controller configured to bleed air from said at least one second hydraulic subsystem using the steps of:

first, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure;

second, retracting said at least one main structure gauge lift hydraulic cylinder and said at least one wing structure gauge lift hydraulic cylinder;

third, bypassing at least one of said at least one main structure gauge lift hydraulic cylinder and said at least one wing structure gauge lift hydraulic cylinder while extending at least one of said at least one main structure gauge lift hydraulic cylinder and said at least one wing structure gauge lift hydraulic cylinder; and fourth, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure.

12. The hydraulic system of claim 11, wherein:

said at least one wing section lift hydraulic cylinder further comprises at least two wing section lift hydraulic cylinders; and said third step of bleeding air from said first hydraulic subsystem further includes first bypassing said at least one main frame lift hydraulic cylinder, then bypassing said at least one main frame lift hydraulic cylinder and sequentially bypassing additional wing section lift hydraulic cylinders until each wing section lift hydraulic cylinder except one has been bypassed while extending the remainder of said at least one wing section lift hydraulic cylinders.

13. The hydraulic system of claim 12, wherein:

said at least one wing structure gauge lift hydraulic cylinder further comprises at least two wing structure gauge lift hydraulic cylinders; and said third step of bleeding air from said second hydraulic subsystem further includes first bypassing said at least one main structure gauge lift hydraulic cylinder, then bypassing said at least one main structure gauge lift hydraulic cylinder and sequentially bypassing additional wing structure gauge lift hydraulic cylinders until each wing structure gauge lift hydraulic cylinder except one has been bypassed while extending the remainder of said at least one wing structure gauge lift hydraulic cylinders.

14. The hydraulic system of claim 13, further comprising:

at least one third hydraulic subsystem including at least one main structure fold hydraulic cylinder for folding the at least one main structure over the main frame section, and at least one wing structure fold hydraulic cylinder for folding the at least one wing structure against the at least one wing section;

said at least one controller being operably connected to at least one valve controlling hydraulic flow to at least one of said at least one main structure fold hydraulic cylinder and said at least one wing structure fold hydraulic cylinder, said at least one controller configured to bleed air from said at least one third hydraulic subsystem using the steps of:

first, folding the at least one main structure over the main frame section using said at least one main structure fold hydraulic cylinder;

second, folding the at least one wing structure against the at least one wing section using said at least one wing structure fold hydraulic cylinder;

third, unfolding the at least one wing structure from against the at least one wing section using said at least one wing structure fold hydraulic cylinder; and fourth, unfolding the at least one main structure from over the main frame section using said at least one main structure fold hydraulic cylinder.

15. The hydraulic system of claim 14, further comprising:

at least one fourth hydraulic subsystem including at least one of a hitch lock cylinder connected to a hitch lock of the agricultural machine or implement, a pull hitch hydraulic cylinder connected to a pull hitch of the agricultural machine or implement capable of being raised and lowered, at least one pivoting swing arm hydraulic cylinder connected to a diagonally angled draft tube and pivoting swing arm assembly of the agricultural machine or implement, and at least one main fold hydraulic cylinder connected to at least one wing section that is pivotally connected to the main frame section of the agricultural machine or implement;

said at least one controller being operably connected to at least one valve controlling hydraulic flow to at least one of said hitch lock cylinder, said pull hitch hydraulic cylinder, said at least one pivoting swing arm hydraulic cylinder, and said at least one main fold hydraulic cylinder, said at least one controller configured to bleed air from said at least one fourth hydraulic subsystem using the steps of:

first, releasing said hitch lock using said hitch lock cylinder;

second, raising said pull hitch using said pull hitch hydraulic cylinder;

third, pivoting inwards said diagonally angled draft tube and pivoting swing arm assembly using said at least one pivoting swing arm hydraulic cylinder;

fourth, folding inwards said at least one pivotally connected wing section against said main frame section using said at least one main fold hydraulic cylinder;

fifth, unfolding outwards said at least one pivotally connected wing section from against said main frame section using said at least one main fold hydraulic cylinder;

sixth, pivoting outwards said diagonally angled draft tube and pivoting swing arm assembly using said at least one pivoting swing arm hydraulic cylinder;

seventh, lowering said pull hitch using said pull hitch hydraulic cylinder; and eighth, latching said hitch lock using said hitch lock cylinder.

16. The hydraulic system of claim 14, wherein:

said at least one controller being further configured to receive operator input authorizing one of:

each of said first, second, third, and fourth steps of bleeding air from said at least one first hydraulic subsystem, each of said first, second, third, and fourth steps of bleeding air from said at least one second hydraulic subsystem, and each of said first, second, third, and fourth steps of bleeding air from said at least one third hydraulic subsystem, individually;

each of bleeding air from said at least one first hydraulic subsystem, bleeding air from said at least one second hydraulic subsystem, and bleeding air from said at least one third hydraulic subsystem, separately; and bleeding air from said at least one first hydraulic subsystem, said at least one second hydraulic subsystem, and said at least one third hydraulic subsystem, automatically.

17. A method of bleeding air from a hydraulic system of an agricultural machine or implement having a main frame section, at least one wing section, at least one main structure pivotally connected to the main frame section, and at least one wing structure pivotally connected to the at least one wing section, comprising the steps of:

providing at least one first hydraulic subsystem including at least one main frame lift hydraulic cylinder for raising and lowering the main frame section, at least one wing section lift hydraulic cylinder for raising and lowering the at least one wing section, and at least one first bypass circuit bypassing at least one of said at least one main frame lift hydraulic cylinder and said at least one wing section lift hydraulic cylinder;

providing each of said at least one main frame lift hydraulic cylinder and said at least one wing section lift hydraulic cylinder with at least one re-phasing port;

operably connecting at least one controller to at least one valve controlling hydraulic flow to at least one of said at least one main frame lift hydraulic cylinder, said at least one wing section lift hydraulic cylinder, and said at least one first bypass circuit;

configuring said at least one controller to bleed air from said at least one first hydraulic subsystem using the sub-steps of:

first, extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure;

second, retracting said at least one main frame lift hydraulic cylinder and said at least one wing section lift hydraulic cylinder;

third, bypassing at least one of said at least one main frame lift hydraulic cylinder and said at least one wing section lift hydraulic cylinder while extending at least one of said at least one main frame lift hydraulic cylinder and said at least one wing section lift hydraulic cylinder; and fourth, extending said at least one main frame lift hydraulic cylinder and said at least one wing section lift hydraulic cylinder until each said at least one re-phasing port of each of said at least one main frame lift hydraulic cylinder and said at least one wing section lift hydraulic cylinder releases hydraulic pressure.

18. The method of claim 17, further comprising the steps of:

providing at least one second hydraulic subsystem including at least one main structure gauge lift hydraulic cylinder for at least partially raising and lowering the at least one main structure, at least one wing structure gauge lift hydraulic cylinder for at least partially raising and lowering the at least one wing structure, and at least one second bypass circuit bypassing at least one of said at least one main structure gauge lift hydraulic cylinder and said at least one wing structure gauge lift hydraulic cylinder;

providing each of said at least one main structure gauge lift hydraulic cylinder and said at least one wing structure gauge lift hydraulic cylinder with at least one re-phasing port;

operably connecting said at least one controller to at least one valve controlling hydraulic flow to at least one of said at least one main structure gauge lift hydraulic cylinder, said at least one wing structure gauge lift hydraulic cylinder, and said at least one second bypass circuit;

configuring said at least one controller to bleed air from said at least one second hydraulic subsystem using the steps of:

first, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure;

second, retracting said at least one main structure gauge lift hydraulic cylinder and said at least one wing structure gauge lift hydraulic cylinder;

third, bypassing at least one of said at least one main structure gauge lift hydraulic cylinder and said at least one wing structure gauge lift hydraulic cylinder while extending at least one of said at least one main structure gauge lift hydraulic cylinder and said at least one wing structure gauge lift hydraulic cylinder; and fourth, extending said at least one main structure gauge lift hydraulic cylinder and said at least one wing structure gauge lift hydraulic cylinder until said at least one re-phasing port of each of said at least one main structure gauge lift hydraulic cylinder and said at least one wing structure gauge lift hydraulic cylinder releases hydraulic pressure.

19. The method of claim 18, wherein:
said at least one wing section lift hydraulic cylinder further comprises at least two wing section lift hydraulic cylinders;
said at least one wing structure gauge lift hydraulic cylinder further comprises at least two wing structure gauge lift hydraulic cylinders;
said third step of bleeding air from said first hydraulic subsystem further includes first bypassing said at least one main frame lift hydraulic cylinder, then bypassing said at least one main frame lift hydraulic cylinder and sequentially bypassing additional wing section lift hydraulic cylinders until each wing section lift hydraulic cylinder except one has been bypassed while extending the remainder of said at least one wing section lift hydraulic cylinders; and
said third step of bleeding air from said second hydraulic subsystem further includes first bypassing said at least one main structure gauge lift hydraulic cylinder, then bypassing said at least one main structure gauge lift hydraulic cylinder and sequentially bypassing additional wing structure gauge lift hydraulic cylinders until each wing structure gauge lift hydraulic cylinder except one has been bypassed while extending the remainder of said at least one wing structure gauge lift hydraulic cylinders.

20. The method of claim 19, further comprising:
providing at least one third hydraulic subsystem including at least one main structure fold hydraulic cylinder for folding the at least one main structure over the main frame section, and at least one wing structure fold hydraulic cylinder for folding the at least one wing structure against the at least one wing section;
operably connecting said at least one controller to at least one valve controlling hydraulic flow to at least one of said at least one main structure fold hydraulic cylinder and said at least one wing structure fold hydraulic cylinder;
configuring said at least one controller to bleed air from said at least one third hydraulic subsystem using the steps of:
first, folding the at least one main structure over the main frame section using said at least one main structure fold hydraulic cylinder;
second, folding the at least one wing structure against the at least one wing section using said at least one wing structure fold hydraulic cylinder;
third, unfolding the at least one wing structure from against the at least one wing section using said at least one wing structure fold hydraulic cylinder; and
fourth, unfolding the at least one main structure from over the main frame section using said at least one main structure fold hydraulic cylinder.

\* \* \* \* \*